(12) United States Patent
Satou

(10) Patent No.: US 11,900,572 B2
(45) Date of Patent: Feb. 13, 2024

(54) TRANSMISSION DEVICE, RECEPTION DEVICE, AND TRANSMISSION SYSTEM

(71) Applicant: Sony Semiconductor Solutions Corporation, Kanagawa (JP)

(72) Inventor: Hirokazu Satou, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/911,335

(22) PCT Filed: Mar. 9, 2021

(86) PCT No.: PCT/JP2021/009096
§ 371 (c)(1),
(2) Date: Sep. 13, 2022

(87) PCT Pub. No.: WO2021/199944
PCT Pub. Date: Oct. 7, 2021

(65) Prior Publication Data
US 2023/0126368 A1    Apr. 27, 2023

(30) Foreign Application Priority Data
Mar. 31, 2020   (JP) .................. 2020-064353

(51) Int. Cl.
*G06T 5/00*   (2006.01)
*G06V 10/46*   (2022.01)

(52) U.S. Cl.
CPC ............. *G06T 5/006* (2013.01); *G06V 10/46* (2022.01)

(58) Field of Classification Search
CPC ...... G06T 5/006; G06V 10/46; H04N 25/443; H04N 25/61
See application file for complete search history.

(56) References Cited

U.S. PATENT DOCUMENTS

| 5,576,753 A | * | 11/1996 | Kataoka | ................. H04N 1/506 358/296 |
| 7,839,447 B2 | * | 11/2010 | Mizutani | ................. H04N 23/63 348/333.12 |

(Continued)

FOREIGN PATENT DOCUMENTS

| JP | H08321989 A | 12/1996 |
| JP | 2003143611 A | 5/2003 |

(Continued)

OTHER PUBLICATIONS

HVS—Aware ROI-based illumination and color restoration—2009 (Year: 2009).*

(Continued)

*Primary Examiner* — Nizar N Sivji
(74) *Attorney, Agent, or Firm* — Michael Best & Friedrich LLP

(57) ABSTRACT

An object is to implement shading correction processing of some regions of interest (ROIs) cut from a captured image. A transmission device includes: a processing unit that performs shading correction processing on image data of a region of interest (ROI) in a captured image on a basis of coordinate information of the ROI; and a transmission unit that sends the image data of the ROI subjected to the shading correction processing as payload data and sends ROI information as embedded data.

12 Claims, 17 Drawing Sheets

(56) References Cited

U.S. PATENT DOCUMENTS

| | | | | |
|---|---|---|---|---|
| 7,859,574 B1* | 12/2010 | Alvarez | ............... | H04N 19/132 348/222.1 |
| 2004/0101157 A1* | 5/2004 | Stach | ................... | G06T 1/0064 382/100 |
| 2006/0056712 A1* | 3/2006 | Endo | ............. | H04N 21/234336 382/232 |
| 2009/0322774 A1* | 12/2009 | Hosoi | ................ | H04N 21/4858 345/581 |
| 2010/0220928 A1* | 9/2010 | Iwabuchi | ............... | G06V 10/50 382/190 |
| 2013/0120620 A1* | 5/2013 | Hara | ..................... | H04N 25/61 348/251 |
| 2015/0030258 A1* | 1/2015 | Chen | ..................... | H04N 23/81 382/266 |
| 2020/0186841 A1 | 6/2020 | Yoshimochi et al. | | |
| 2020/0320323 A1* | 10/2020 | Reed | ..................... | G06T 1/0021 |
| 2022/0124292 A1* | 4/2022 | Paliy | ........................ | B41J 2/473 |

FOREIGN PATENT DOCUMENTS

| | | |
|---|---|---|
| JP | 2012209831 A | 10/2012 |
| JP | 2013164834 A | 8/2013 |
| JP | 2014039219 A | 2/2014 |
| JP | 2016201756 A | 12/2016 |
| WO | 2018/225449 A1 | 12/2018 |
| WO | WO-2018225449 A1 * | 12/2018 ....... H04N 21/23418 |

OTHER PUBLICATIONS

International Search Report (PCT/ISA/210), International Application No. PCT/JP2021/009096, dated Jun. 8, 2021.

* cited by examiner

```
FRAME HEADER REGION  R1
• FRAME NUMBER  F1
• NUMBER OF ROIS  4
• ROI INFORMATION
```

| REGION NUMBER  1 | REGION NUMBER  2 |
|---|---|
| PHYSICAL REGION LENGTH (XLa1,YLa1) | PHYSICAL REGION LENGTH (XLa2,YLa2) |
| RECTANGULAR OUTPUT REGION SIZE (XLb1,YLb1) | RECTANGULAR OUTPUT REGION SIZE (XLb2,YLb2) |
| PRIORITY  1 | PRIORITY  2 |
| EXPOSURE INFORMATION  h1 | EXPOSURE INFORMATION  h2 |
| GAIN INFORMATION  g1 | GAIN INFORMATION  g2 |
| AD WORD LENGTH  L1 | AD WORD LENGTH  L2 |
| IMAGE FORMAT  FM1 | IMAGE FORMAT  FM1 |
| REGION NUMBER  3 | REGION NUMBER  4 |
| PHYSICAL REGION LENGTH (XLa3,YLa3) | PHYSICAL REGION LENGTH (XLa4,YLa4) |
| RECTANGULAR OUTPUT REGION SIZE (XLb3,YLb3) | RECTANGULAR OUTPUT REGION SIZE (XLb4,YLb4) |
| PRIORITY  3 | PRIORITY  4 |
| EXPOSURE INFORMATION  h3 | EXPOSURE INFORMATION  h4 |
| GAIN INFORMATION  g3 | GAIN INFORMATION  g4 |
| AD WORD LENGTH  L3 | AD WORD LENGTH  L4 |
| IMAGE FORMAT  FM1 | IMAGE FORMAT  FM1 |

PACKET REGION  R2

112b

TRANSMISSION DEVICE, RECEPTION DEVICE, AND TRANSMISSION SYSTEM

TECHNICAL FIELD

The present disclosure relates to a transmission device, a reception device, and a transmission system.

BACKGROUND ART

In recent years, transmission of a large amount of massive data is increasing. A large load is likely to be applied to a transmission system, and in the worst case, there is a possibility that the transmission system is down and data transmission cannot be performed.

It is known that an object to be imaged is specified and only an image of a cut part of the specified object is transmitted instead of, for example, transmitting all captured images in order to prevent the transmission system from being down (for example, Patent Documents 1 to 4).

CITATION LIST

Patent Document

Patent Document 1: Japanese Patent Application Laid-Open No. 2016-201756
Patent Document 2: Japanese Patent Application Laid-Open No. 2014-39219
Patent Document 3: Japanese Patent Application Laid-Open No. 2013-164834
Patent Document 4: Japanese Patent Application Laid-Open No. 2012-209831

SUMMARY OF THE INVENTION

Problems to be Solved by the Invention

Shading correction processing in a case of transmitting some regions of interest (ROIs) cut from a captured image has not been studied at all.

An object of the present disclosure is to implement shading correction processing of some regions of interest (ROIs) cut from a captured image.

Solutions to Problems

A transmission device according to one aspect of the present disclosure includes: a processing unit that performs shading correction processing on image data of a region of interest (ROI) in a captured image on the basis of coordinate information of the ROI; and a transmission unit that sends the image data of the ROI subjected to the shading correction processing as payload data and sends ROI information as embedded data.

A reception device according to one aspect of the present disclosure includes: a reception unit that receives a transmission signal in which image data of a region of interest (ROI) cut from a predetermined captured image is included in payload data and ROI information corresponding to the ROI is included in embedded data; and a processing unit that performs shading correction processing on the image data of the ROI on the basis of coordinate information of the ROI extracted from the ROI information.

A transmission system according to one aspect of the present disclosure includes: a transmission device that includes a processing unit that performs shading correction processing on image data of a region of interest (ROI) in a captured image on the basis of coordinate information of the ROI, and a transmission unit that sends the image data of the ROI subjected to the shading correction processing as payload data and sends ROI information as embedded data; and a reception device that includes a reception unit that receives a transmission signal in which image data of an image included in the ROI is included in the payload data and the ROI information is included in the embedded data.

Furthermore, a transmission system according to another aspect of the present disclosure includes: a transmission device that sends image data of a region of interest (ROI) as payload data and sends ROI information as embedded data; and a reception device including a reception unit that receives a transmission signal in which image data of a region of interest (ROI) cut from a predetermined captured image is included in the payload data and the ROI information corresponding to the ROI is included in the embedded data, and a processing unit that performs shading correction processing on the image data of the ROI on the basis of coordinate information of the ROI extracted from the ROI information.

BRIEF DESCRIPTION OF DRAWINGS

FIG. 12 is a diagram illustrating a configuration example of transmission data in which position information of each ROI image is included in payload data of a long packet.

MODE FOR CARRYING OUT THE INVENTION

Hereinafter, modes for carrying out the present disclosure will be described in detail with reference to the drawings. The following description is a specific example of the present disclosure, and the present disclosure is not limited to the following aspects.

Hereinafter, a mode for carrying out the technology according to the present disclosure (hereinafter, referred to as "embodiment") will be described in the following order.

1. Underlying Technology 1 of Present Disclosure (Technology for Transmitting Some Regions of Interest (ROIs) (Having Rectangular Shape) Cut from Captured Image)

2. Underlying Technology 2 of Present Disclosure (Technology for Transmitting Some Regions of Interest (ROIs) (Having Non-Rectangular Shape) Cut from Captured Image)

3. Principle of Shading Correction Processing in Embodiment of Present Disclosure 4. Video Transmission Device, Video Reception Device, and Video Transmission System According to First Embodiment of Present Disclosure 5. Video Transmission Device, Video Reception Device, and Video Transmission System According to Second Embodiment of Present Disclosure 1. Underlying Technology 1 of Present Disclosure

[Configuration]

In recent years, in portable devices such as smartphones, camera devices, and the like, the capacity of handled image data has been increased, and there has been a demand for higher speed and lower power consumption for data transmission in the devices or between different devices. In order to meet such requirements, high-speed interface standards such as a C-PHY standard and a D-PHY standard set by the MIPI Alliance are being standardized as connection interfaces for portable devices and camera devices. The C-PHY standard and the D-PHY standard are interface standards of a physical layer (PHY) of a communication protocol. In addition, a display serial interface (DSI) for display of a portable device and a camera serial interface (CSI) for a camera device exist as higher protocol layers of the C-PHY standard and the D-PHY standard.

Figure 1:
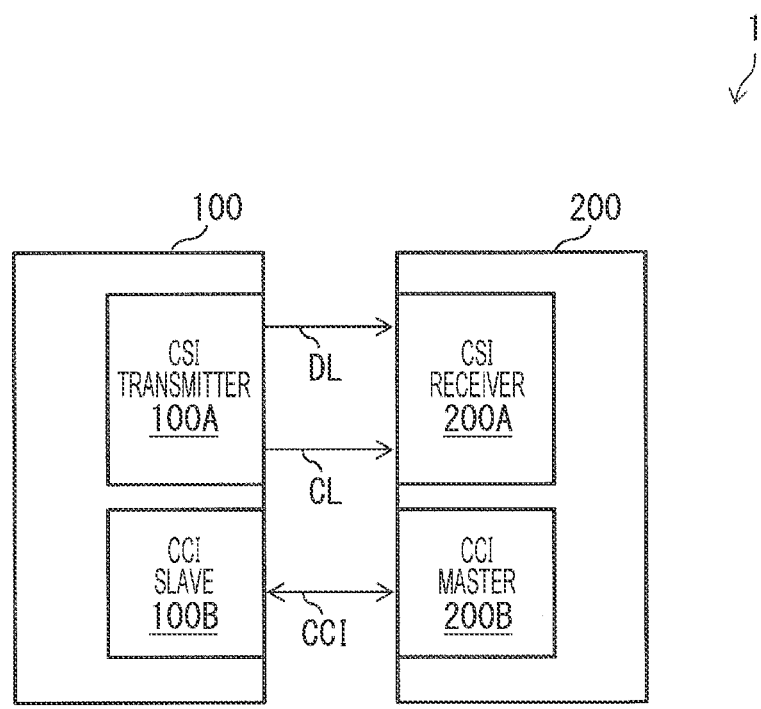
FIG. 1 is a diagram illustrating a schematic configuration example of a video transmission system.

A video transmission system 1 according to the underlying technology of the present disclosure is a system that can transmit and receive a signal according to various standards, and can transmit and receive a signal according to, for example, an MIPI CSI-2 standard, an MIPI CSI-3 standard, or an MIPI DSI standard. FIG. 1 illustrates an outline of the video transmission system 1 according to the underlying technology of the present disclosure. The video transmission system 1 is applied to transmission of a data signal, a clock signal, and a control signal, and includes a video transmission device 100 and a video reception device 200. The video transmission system 1 includes a data lane DL for transmitting a data signal such as image data, a clock lane CL for transmitting a clock signal, and a camera control interface CCI for transmitting a control signal across the video transmission device 100 and the video reception device 200. Although FIG. 1 illustrates an example in which one data lane DL is provided, a plurality of data lanes DL may be provided. The camera control interface CCI is a bidirectional control interface compatible with an inter-integrated circuit (I2C) standard.

The video transmission device 100 is a device that sends a signal according to the MIPI CSI-2 standard, the MIPI CSI-3 standard, or the MIPI DSI standard. A CSI transmitter 100A and a CCI slave 100B are provided. The video reception device 200 includes a CSI receiver 200A and a CCI master 200B. In the clock lane CL, a clock signal line connects between the CSI transmitter 100A and the CSI receiver 200A. In the data lane DL, a clock signal line connects between the CSI transmitter 100A and the CSI receiver 200A. In the camera control interface CCI, a control signal line connects between the CCI slave 100B and the CCI master 200B.

The CST transmitter 100A is, for example, a differential signal transmission circuit that generates a differential clock signal as a clock signal and outputs the differential clock signal to the clock signal line. The CSI transmitter 100A can be configured to be able to transmit not only the differential clock signal but also a single-ended signal or a three-phase signal. The CST transmitter 100A is also a differential signal transmission circuit that generates a differential data signal as a data signal and outputs the differential data signal to a data signal line. The CSI receiver 200A is a differential signal reception circuit that receives a differential clock signal as a clock signal via the clock signal line and performs predetermined processing on the received differential clock signal. The CSI receiver 200A is also a differential signal reception circuit that receives a differential data signal as a data signal via the data signal line and performs predetermined processing on the received differential data signal.

(Video Transmission Device 100)

Figure 2:
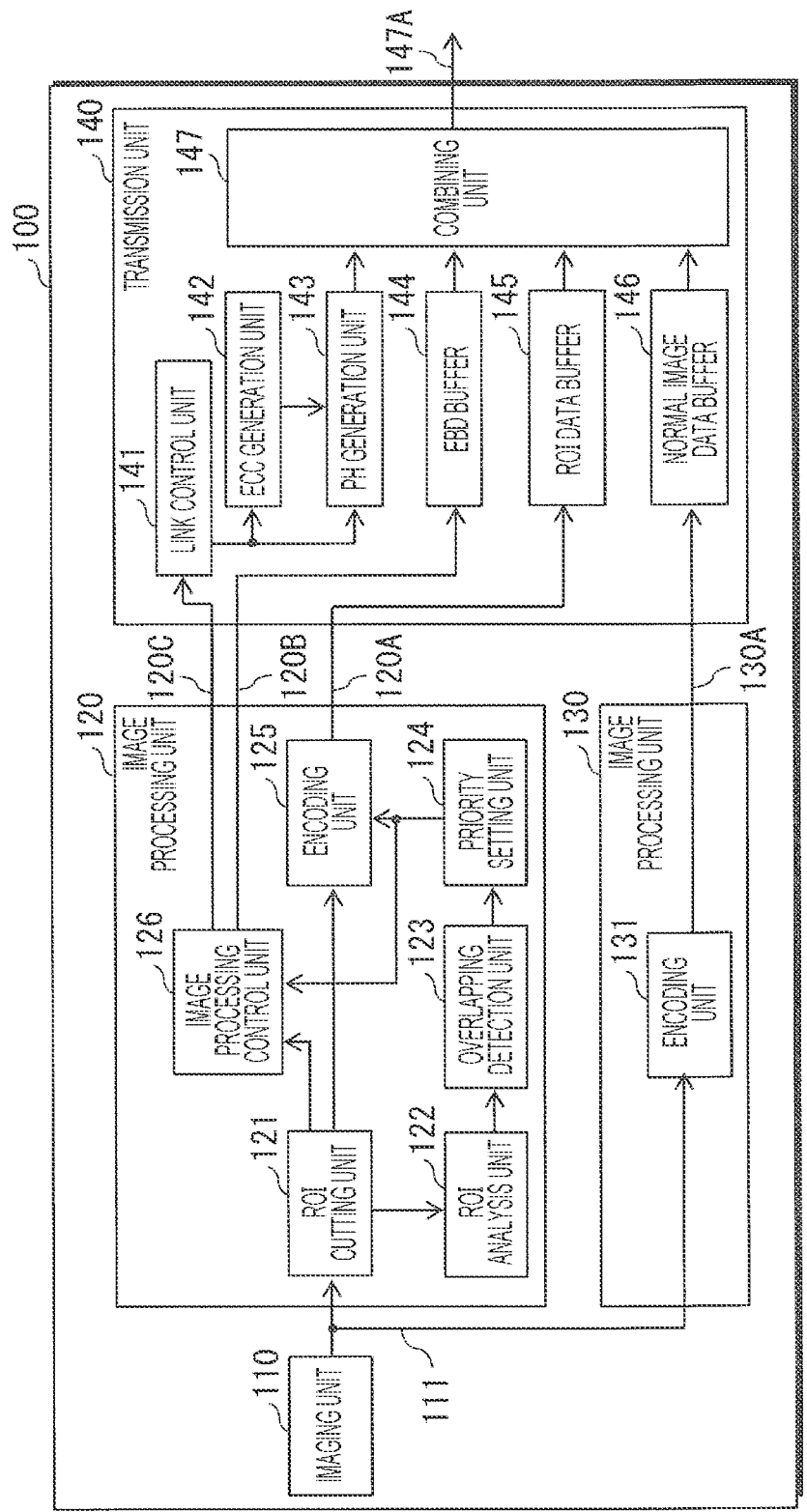
FIG. 2 is a diagram illustrating a schematic configuration example of a video transmission device of FIG. 1.
Figure 3:
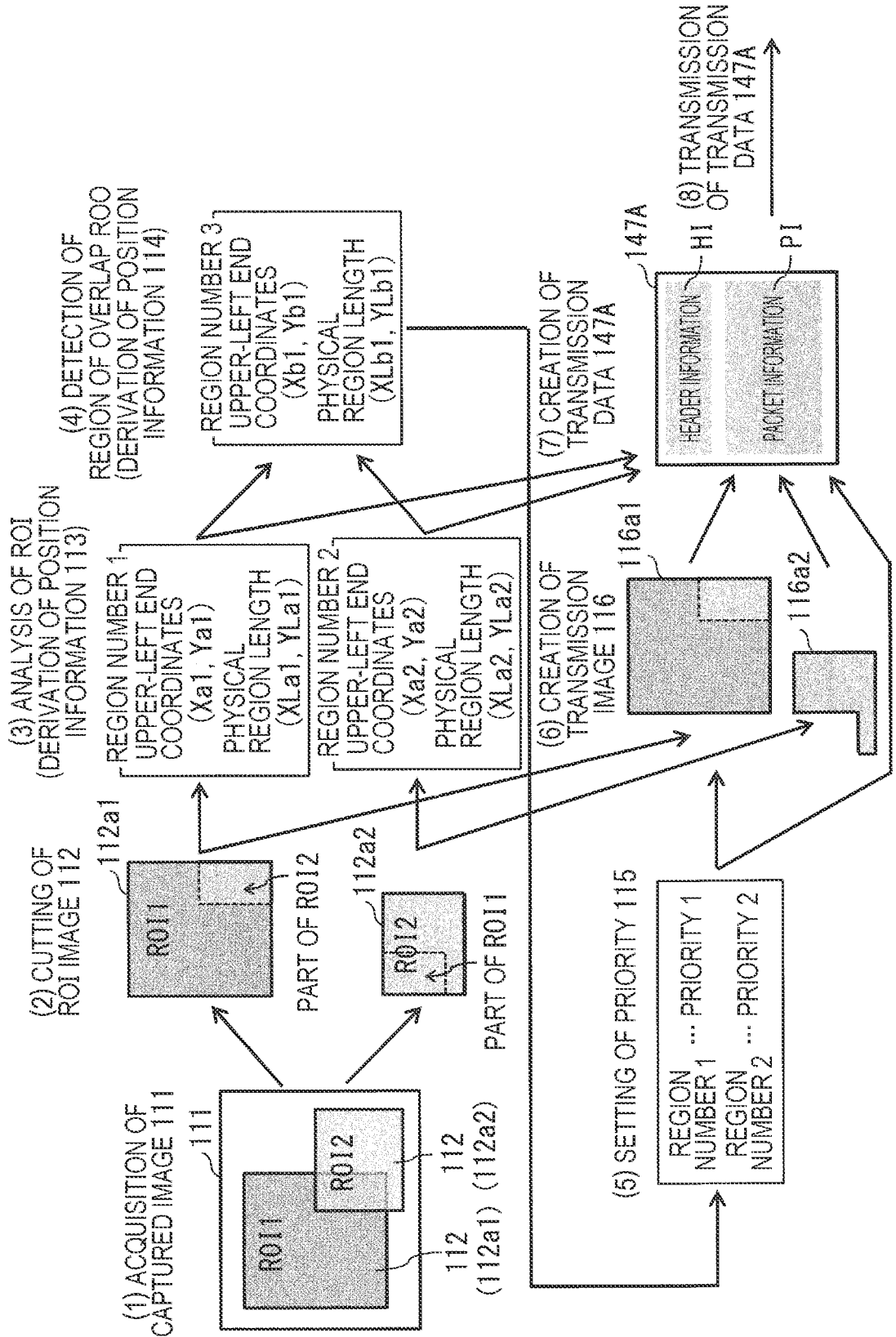
FIG. 3 is a diagram illustrating an example of a transmission data generation procedure in a case where two regions of interest (ROIs) are included in a captured image.

FIG. 2 illustrates an example of a configuration of the video transmission device 100. The video transmission device 100 corresponds Co a specific example of the CSI transmitter 100A. The video transmission device 100 includes, for example, an imaging unit 110, image processing units 120 and 130, and a transmission unit 140. The video transmission device 100 transmits transmission data 147A generated by performing predetermined processing on a captured image 111 obtained by the imaging unit 110 to the video reception device 200 via the data lane DL. FIG. 3 illustrates an example of a procedure of generating the transmission data 147A.

The imaging unit 110 converts, for example, an optical image signal obtained through an optical lens or the like into image data. The imaging unit 110 includes, for example, an image sensor such as a charge coupled device (CCD) image sensor, a complementary metal oxide semiconductor (CMOS) image sensor, or the like. The imaging unit 110 includes an analog-digital conversion circuit, and converts analog image data into digital image data. A data format after the conversion may be a YCbCr format in which the color of each pixel is expressed by a luminance component Y and chrominance components Cb and Cr, an RGB format, or the like. The imaging unit 110 outputs the captured image 111 (digital image data) obtained by imaging to the image processing unit 120.

The image processing unit 120 is a circuit that performs predetermined processing on the captured image 111 input from the imaging unit 110. In Underlying Technology 1, a case where the image processing unit 120 performs predetermined processing on the captured image 111 input from the imaging unit 110 in a case where a control signal for instructing cutting of an ROI is input from the video reception device 200 via the camera control interface CCI will be described. However, Underlying Technology 1 can also be applied to a case where the video transmission device 100, that is, a transmission side, specifies the coordinates of an ROI to be cut. In this case, for example, the transmission side is configured to receive information such as a "person" or an "object" to be acquired in the ROI sent from a reception side, and determine and specify the coordinates of the cutting. As a result, the image processing unit 120 generates various pieces of data (120A, 120B, and 120C) and outputs the various pieces of data to the transmission unit 140. The image processing unit 130 is a circuit that performs predetermined processing on the captured image 111 input from the imaging unit 110. The image processing unit 130 performs predetermined processing on the captured image 111 input from the imaging unit 110 in a case where a control signal for instructing outputting of a normal image is input from the video reception device 200 via the camera control interface CCI. As a result, the image processing unit 130 Generates image data 130A and outputs the image data 130A to the transmission unit 140.

The image processing unit 130 includes, for example, an encoding unit 131. The encoding unit 131 encodes the captured image 111 to generate compressed image data 130A. For example, the image processing unit 130 compresses the captured image 111 in a compression format conforming to the joint photographic experts group (JPEG) standard or the like as the format of the compressed image data 130A.

The image processing unit 120 includes, for example, an ROI cutting unit 121, an ROI analysis unit 122, an overlapping detection unit 123, a priority setting unit 124, an encoding unit 125, and an image processing control unit 126.

The ROI cutting unit 121 specifies one or more objects to be imaged included in the captured image 111 input from the imaging unit 110, and sets a region of interest ROI for each specified object. The region of interest ROI is, for example, a square-shaped region including the specified object. The ROI cutting unit 121 cuts an image of each region of interest ROI (for example, an ROI image 112 in FIG. 3) from the captured image 111. The ROI cutting unit 121 further assigns a region number as an identifier to each set region of interest ROI. For example, in a case where two regions of interest ROI are set in the captured image 111, the ROI cutting unit 121 assigns a region number 1 to one region of interest ROI (for example, a region of interest ROI1 in FIG. 3), and assigns a region number 2 to the other region of interest ROI (for example, a region of interest ROI2 in FIG. 3). For example, the ROI cutting unit 121 stores the assigned identifier (region number) in a storage unit. For example, the ROI cutting unit 121 stores each ROI image 112 cut from the captured image 111 in the storage unit. The ROI cutting unit 121 further stores, for example, the identifier (region number) assigned to each region of interest ROI in the storage unit in association with the ROI image 112.

The ROI analysis unit 122 derives position information 113 of a region of interest ROI in the captured image 111 for each region of interest ROI. The position information 113 includes, for example, the upper-left end coordinates (Xa, Ya) of a region of interest ROI, the length of a region of interest ROI in an X-axis direction, and the length of a region of interest ROI in a Y-axis direction. The length of a region of interest ROI in the X-axis direction is, for example, a physical region length XLa of a region of interest ROI in the X-axis direction. The length of a region of interest ROI in the Y-axis direction is, for example, a physical region length YLa of a region of interest ROI in the Y-axis direction. The physical region length indicates a physical length (data length) of a region of interest ROI. The position information 113 may include coordinates of a position different from the upper-left end of a region of interest ROI. The ROI analysis unit 122 stores, for example, the derived position information 113 in the storage unit. For example, the ROI analysis unit 122 stores, in the storage unit, the position information 113 in association with the identifier (region number) assigned to the region of interest ROI.

The ROI analysis unit 122 may further derive, for example, an output region length XLc of a region of interest ROI in the X-axis direction and an output region length YLc of a region of interest ROI in the Y-axis direction as the position information 113 for each region of interest ROI. The output region length is, for example, a physical length (data length) of a region of interest ROI after resolution of a region of interest ROI is changed by thinning processing, pixel addition, or the like. For example, the ROI analysis unit 122 may derive, in addition to the position information 113, for example, sensing information, exposure information, gain information, an analog-digital (AD) word length, an image format, and the like for each region of interest POI, and store the derived information in the storage unit.

The sensing information refers to a computation content for an object included in a region of interest ROI, supplementary information for post-stage signal processing for the ROI image 112, and the like. The exposure information refers to an exposure time of a region of interest ROI. The gain information refers to gain information of a region of interest ROI. The AD word length refers to a word length of data per pixel subjected to AD conversion in a region of interest ROI. The image format refers to the format of an image of a region of interest ROI. For example, the ROI analysis unit 122 may derive the number of regions of interest ROI (the number of ROIs) included in the captured image 111 and store the number in the storage unit.

In a case where a plurality of objects to be imaged is specified in the captured image 111, the overlapping detection unit 123 detects a region of overlap (ROO) in which two or more regions of interest ROI overlap each other on the basis of the position information 113 of the plurality of regions of interest ROI in the captured image 111. That is, the overlapping detection unit 123 derives position information 114 of a region of overlap ROO in the captured image 111 for each region of overlap ROO. For example, the overlapping detection unit 123 stores the derived position information 114 in the storage unit. For example, the overlapping detection unit 123 stores the derived position information 114 in the storage unit in association with the region of overlap ROO. The region of overlap ROO is, for example, a square-shaped region having the same size as or smaller than the smallest region of interest ROI among two or more regions of interest ROI overlapping each other. The position information 114 includes, for example, the upper-left end coordinates (Xb,Yb) of a region of overlap ROO, the length of a region of overlap ROO in the X-axis direction, and the length of a region of overlap ROO in the Y-axis direction. The length of a region of overlap ROO in the X-axis direction is, for example, a physical region length XLb. The length of a region of overlap ROO in the Y-axis direction is, for example, a physical region length YLb. The position information 114 may include coordinates of a position different from the upper-left end of a region of interest ROI.

The priority setting unit 124 assigns a priority 115 to each region of interest ROI in the captured image 111. The priority setting unit 124 stores, for example, the assigned priority 115 in the storage unit. For example, the priority setting unit 124 stores the assigned priority 115 in the storage unit in association with the region of interest ROI. The priority setting unit 124 may assign the priority 115 to each region of interest ROI separately from the region number assigned to each region of interest ROI, or may substitute the region number assigned to each region of interest ROI for the priority 115. For example, the priority setting unit 124 may store the priority 115 in the storage unit in association with the region of interest ROI, or may store the region number assigned to each region of interest ROI in the storage unit in association with the region of interest ROI.

The priority 115 is an identifier of each region of interest ROI, and is determination information that enables determination of from which one of a plurality of regions of interest ROI in the captured image 111 a region of overlap ROO has been omitted. For example, for two regions of interest ROI each including a region of overlap ROO, the priority setting unit 124 assigns 1 as the priority 115 to one region of interest ROI, and assigns 2 as the priority 115 to the other region of interest ROI. In this case, at the time of creating a transmission image 116 to be described later, the region of overlap ROO is omitted from the region of interest ROI whose priority 115 has a larger value. Note that the priority setting unit 124 may assign, to a region of interest ROI, the same number as a region number assigned to each region of interest ROI as the priority 115. For example, the priority setting unit 124 stores the priority 115 assigned to each region of interest ROI in the storage unit in association with the ROI image 112.

The encoding unit 125 encodes each transmission image 116 to generate compressed image data 120A. For example, the encoding unit 125 compresses each transmission image 116 in a compression format conforming to the JPEG standard or the like as the format of the compressed image data 120A. The encoding unit 125 generates each transmission image 116 before performing the above-described compression processing. The encoding unit 125 generates a plurality of transmission images 116 obtained by omitting an image 118 of the region of overlap ROO from a plurality of ROI images 112 obtained from the captured image 111 in such a manner that the image 118 is not included redundantly in the plurality of ROI images 112 obtained from the captured image 111.

For example, the encoding unit 125 determines from which of the plurality of ROI images 112 the image 118 is to be omitted on the basis of the priority 115 assigned to each region of interest ROI. Note that the encoding unit 125 may determine from which of the plurality of ROI images 112 the image 118 is to be omitted by using, for example, the region number assigned to each region of interest ROI as the priority 115. The encoding unit 125 uses an image obtained by omitting the image 118 from the ROI image 112 specified as described above as the transmission image 116 (for example, a transmission image 116a2 in FIG. 3). In a case of an ROI image 112 that does not include a region of overlap ROO or an ROI image 112 from which the image 118 is not omitted according to the above-described determination, the encoding unit 125 uses the ROI image 112 itself as the transmission image 116 (for example, a transmission image 116a1 in FIG. 3).

The image processing control unit 126 generates ROI information 120B and frame information 120C, and transmits the ROI information 120B and the frame information 120C to the transmission unit 140. The ROI information 120B includes, for example, each piece of position information 113. The ROI information 120B further includes, for example, at least one of the data type of each region of interest ROI, the number of regions of interest ROI included in the captured image 111, the region number (or the priority 115) of each region of interest ROI, the data length of each region of interest ROI, or the image format of each region of interest ROI. The frame information 1200 includes, for example, a virtual channel number assigned to each frame, the data type of each region of interest ROI, the payload length of each line, and the like. The data type includes, for example, YUV data, RGB data, RAW data, or the like. The data type further includes, for example, ROI format data or normal format data. The payload length is, for example, the number of pixels included in a payload of a long packet, and is, for example, the number of pixels for each region of interest ROI. Here, the payload refers to main data (application data) transmitted between the video transmission device 100 and the video reception device 200. The long packet refers to a packet arranged between a packet header PH and a packet footer PF.

The transmission unit 140 is a circuit that generates and sends the transmission data 147A on the basis of various pieces of data (120A, 120B, 120C, and 130A) input from the image processing units 120 and 130. The transmission unit 140 sends the ROI information 120B regarding each region of interest ROI in the captured image 111 as embedded data (Embedded Data). Further, in a case where a control signal for instructing cutting of an ROI is input from the video reception device 200 via the camera control interface CCI, the transmission unit 140 sends image data (compressed image data 120A) of each region of interest ROI as payload data (Payload Data) of the long packet. At this time, the transmission unit 140 sends the image data (compressed image data 120A) of each region of interest ROI through a common virtual channel. In addition, the transmission unit 140 sends the image data (compressed image data 120A) of each region of interest ROI by an image data frame, and sends the ROI information 120B regarding each region of interest ROI by a header of the image data frame. Further, in a case where a control signal for instructing outputting of a normal image is input from the video reception device 200 via the camera control interface CCI, the transmission unit 140 sends normal image data (compressed image data 130A) as the payload data of the long packet.

The transmission unit 140 includes, for example, a LINK control unit 141, an ECC generation unit 142, a PH generation unit 143, an EBD buffer 144, an ROI data buffer 145, a normal image data buffer 146, and a combining unit 147. The LINK control unit 141, the FCC generation unit 142, the PH generation unit 143, the FBD buffer 144, and the ROI data buffer 145 perform outputting to the combining unit 147 in a case where a control signal for instructing cutting of an ROI is input from the video reception device 200 via the camera control interface CCI. In a case where a control signal for instructing outputting of a normal image is input from the video reception device 200 via the camera control interface CCI, the normal image data buffer 146 outputs a normal image to the combining unit 147.

Note that the ROI data buffer 145 may also serve as the normal image data buffer 146. In this case, the transmission unit 140 may include a selector that selects an output of any one of the ROI data buffer 145 and the ROI data buffer 145 between an output terminal of each of the ROI data buffer 145 and the ROI data buffer 145 and an input terminal of the combining unit 147.

Figure 4:
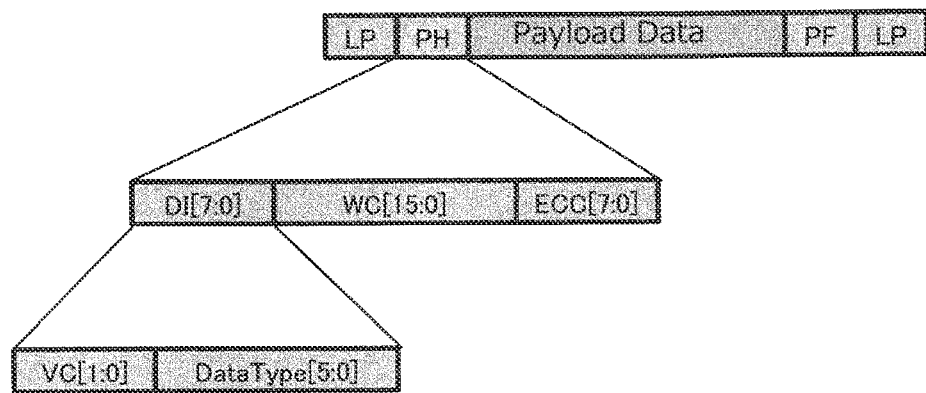
FIG. 4 is a diagram illustrating a configuration example of a packet header.

For example, the LINK control unit 141 outputs the frame information 120C to the ECC generation unit 142 and the PH generation unit 143 for each line. The ECC generation unit 142 generates an error correction code of one line on the basis of data (for example, a virtual channel number, the data type of each region of interest ROI, the payload length of each line, and the like) of the line in the frame information 120C, for example. The ECC generation unit 142 outputs the generated error correction code to the PH generation unit 143, for example. The PH generation unit 143 generates the packet header PH for each line by using, for example, the frame information 120C and the error correction code generated by the FCC generation unit 142. At this time, for example, as illustrated in FIG. 4, the packet header PH is a packet header of payload data of a long packet. The packet header PH includes, for example, DI, WC, and ECC. The WC is a region for indicating an end of a packet by the number of words for the video reception device 200. The WC includes, for example, the payload length, and includes, for example, the number of pixels of each region of interest ROI. The ECC is a region for storing a value for correcting a bit error. The ECC includes an error correction code. The DI is a region for storing a data identifier. The DI includes a virtual channel (VC) number and DataType (the data type of each region of interest ROI). The virtual channel (VC) is a concept introduced for packet flow control, and is a mechanism for supporting a plurality of independent data streams sharing the same link. The PH generation unit 143 outputs the generated packet header PH to the combining unit 147.

The EBD buffer 144 primarily stores the ROI information 120B and outputs the ROI information 120B to the combining unit 147 as the embedded data at a predetermined timing. The embedded data refers to additional information that can be embedded in a header or footer of an image data frame (see FIG. 5 as described later). The embedded data includes, for example, the ROI information 120B.

The ROI data buffer 145 primarily stores the compressed image data 120A and outputs the compressed image data 120A to the combining unit 147 as the payload data of the long packet at a predetermined timing. In a case where a control signal for instructing cutting of an ROI is input from the video reception device 200 via the camera control interface CCI, the ROI data buffer 145 outputs the compressed image data 120A to the combining unit 147 as the payload data of the long packet. The normal image data buffer 146 primarily stores the compressed image data 130A and outputs the compressed image data 130A to the combining unit 147 as the payload data of the long packet at a predetermined timing. In a case where a control signal for instructing outputting of a normal image is input from the video reception device 200 via the camera control interface CCI, the normal image data buffer 146 outputs the compressed image data 130A to combining unit 147 as the payload data of the long packet.

In a case where a control signal for instructing outputting of a normal image is input from the video reception device 200 via the camera control interface CCI, the combining unit 147 generates the transmission data 147A on the basis of input data (compressed image data 130A). The combining unit 147 outputs the generated transmission data 147A to the video reception device 200 via the data lane DL. Meanwhile, in a case where a control signal for instructing cutting of an ROI is input from the video reception device 200 via the camera control interface CCI, the combining unit 147 generates the transmission data 147A on the basis of various pieces of input data (the packet header PH, the ROI information 120B, and the compressed image data 120A). The combining unit 147 outputs the generated transmission data 147A to the video reception device 200 via the data lane DL. That is, the combining unit 147 includes, in the packet header PH of the payload data of the long packet, DataType (the data type of each region of interest ROI) and sends the packet. In addition, the combining unit 147 sends the image data (compressed image data 120A) of each region of interest ROI through a common virtual channel.

Figure 5:
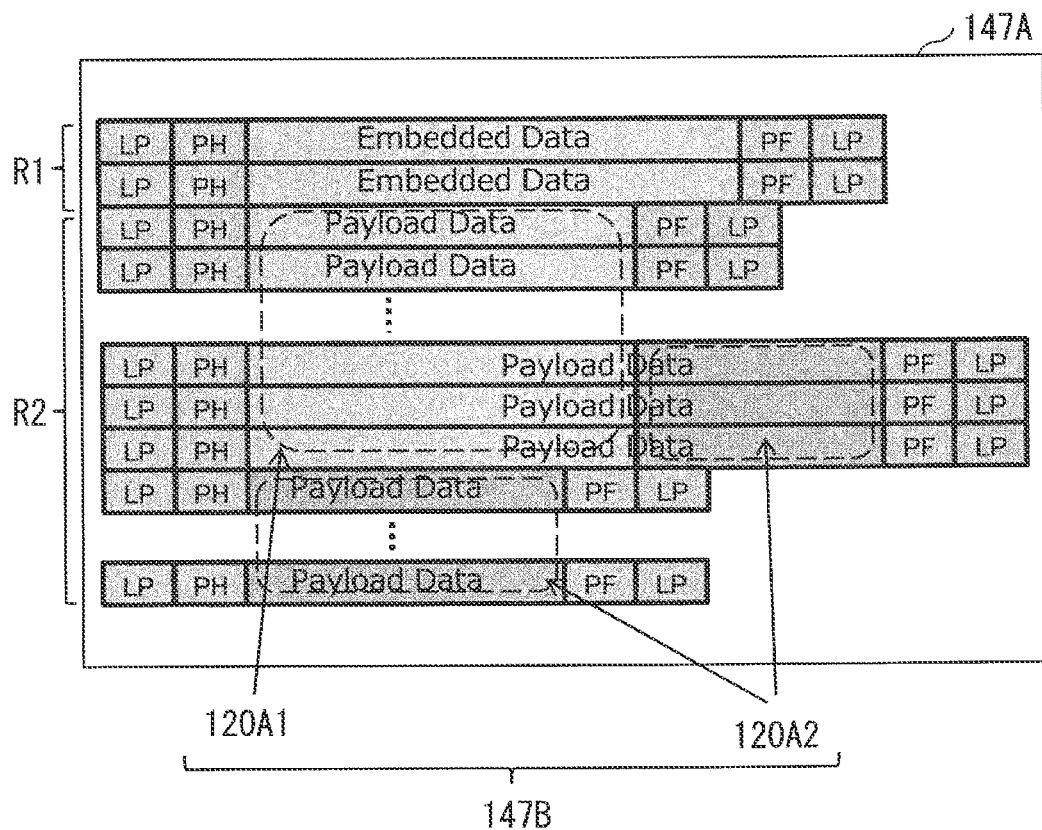
FIG. 5 is a diagram illustrating a configuration example of transmission data.

The transmission data 147A includes, for example, the image data frame as illustrated in FIG. 5. The image data frame usually includes a header region, a packet region, and a footer region. The footer region is omitted in FIG. 5 for convenience. A frame header region R1 of the transmission data 147A includes the embedded data. At this time, the embedded data includes the ROI information 120B. In FIG. 5, a packet region R2 of the transmission data 147A includes the payload data of the long packet for each line, and further includes the packet header PH and the packet footer PF at positions sandwiching the payload data of the long packet therebetween. Moreover, low power modes LP are included at positions sandwiching the packet header PH and the packet footer PF therebetween.

At this time, the packet header PH includes, for example, the DI, the WC, and the FCC. The WC includes, for example, the payload length, and includes, for example, the number of pixels of each region of interest ROI. The ECC includes an error correction code. The DI includes a virtual channel number (VC) and DataType (the data type of each region of interest ROI). In she present embodiment, the VC of each line is assigned with a common virtual channel number. Furthermore, in FIG. 5, compressed image data 147B is included in the packet region R2 of the transmission data 147A. The compressed image data 147B includes one piece of compressed image data 120A or a plurality of pieces of compressed image data 120A. Here, in FIG. 5, a packet group closer to the packet header PH includes, for example, the compressed image data 120A (120A1) of the transmission image 116a1 in FIG. 3, and a packet group away from the packet header PH includes, for example, the compressed image data 120A (120A2) of the transmission image 116a2 in FIG. 3. The two pieces of compressed image data 120A1 and 120A2 constitute the compressed image data 147B. The payload data of the long packet of each line includes pixel data for one line in the compressed image data 147B.

Figure 6:
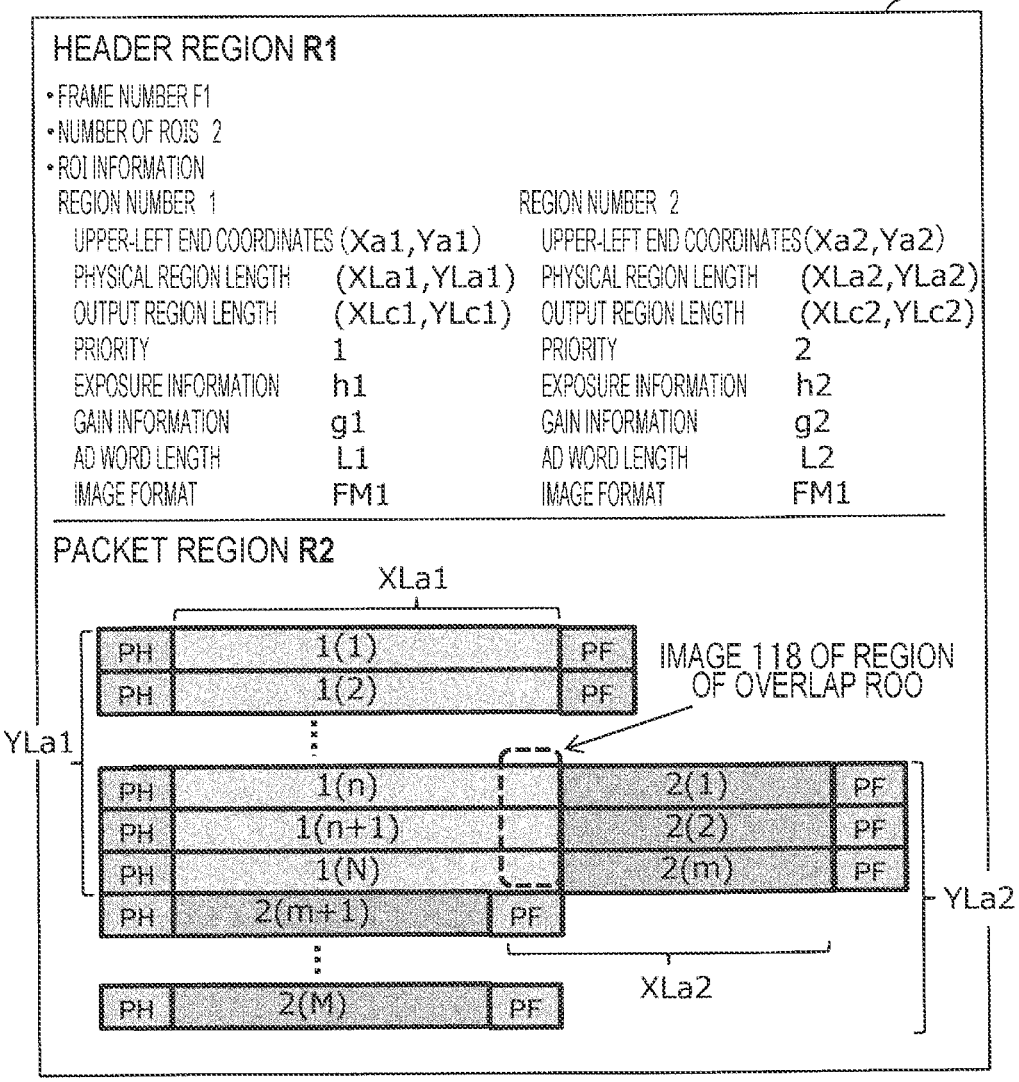
FIG. 6 is a diagram illustrating a configuration example of the transmission data.

FIG. 6 illustrates a configuration example of the transmission data 147A. The transmission data 147A includes, for example, the frame header region R1 and the packet region R2. Note that FIG. 6 illustrates contents of the frame header region R1 in detail. Furthermore, in FIG. 6, the low power modes LP are omitted.

The frame header region R1 includes, for example, a frame number F1 as the identifier of the transmission data 147A. The frame header region R1 includes information regarding the compressed image data 147B included in the packet region R2. The frame header region R1 includes, for example, the number of pieces of compressed image data 120A (the number of ROIs) included in the compressed image data 147B and information regarding the ROI image 112 corresponding to each piece of compressed image data 120A included in the compressed image data 147B (the ROI information 120B).

For example, the combining unit 147 arranges the compressed image data 147B separately for each pixel row of the compressed image data 120A in the packet region R2 of the transmission data 147A. Therefore, the compressed image data corresponding to the image 118 of the region of overlap ROO is not redundantly included in the packet region R2 of the transmission data 147A. Further, for example, the combining unit 147 omits a pixel row of the captured image 111 that does not correspond to each transmission image 116 in the packet region R2 of the transmission data 147A. Therefore, the packet region R2 of the transmission data 147A does not include a pixel row of the captured image 111 that does not correspond to each transmission image 116. Note that a portion surrounded by a broken line in the packet region R2 in FIG. 6 corresponds to the compressed image data of the image 118 of the region of overlap ROO.

A boundary between a packet group (for example, 1(n) in FIG. 6) closer to the packet header PH and a packet group (for example, 2(1) in FIG. 6) away from the packet header PH is specified by a physical region length XLa1 of the ROI image 112 corresponding to the compressed image data of the packet group (for example, 1(n) in FIG. 6) closer to the packet header PH. In the compressed image data corresponding to the image 118 of the region of overlap ROO included in the packet group (for example, 1(n) in FIG. 6) closer to the packet header PH, a start position of the packet is specified by a physical region length XLa2 of the ROI image 112 corresponding to the packet group (for example, 2(1) in FIG. 6) away from the packet header PH.

Figure 7:
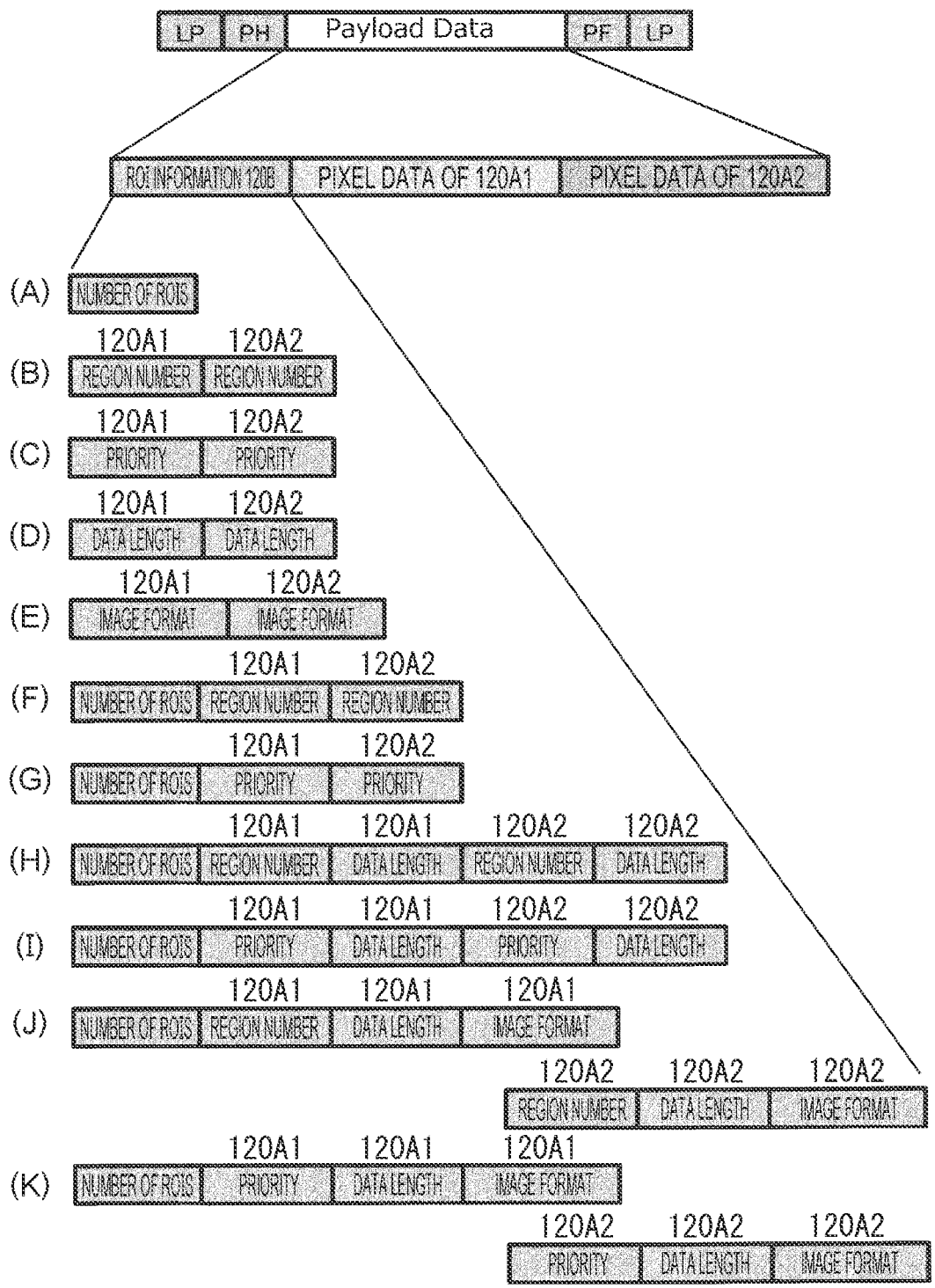
FIG. 7 is a diagram illustrating a configuration example of payload data of a long packet.

For example, the combining unit 147 may include, in the payload data of the long packet, the ROI information 120B in addition to, for example, the pixel data of one line in the compressed image data 147B as illustrated in FIG. 7 at the time of generating the payload data of the long packet for each line, in the packet region R2 of the transmission data 147A. That is, the combining unit 147 may include the ROI information 120B in the payload data of the long packet and send the payload data. At this time, for example, as illustrated in FIGS. 7(A) to 7(K), the ROI information 120B includes, for example, at least one of the data type of each region of interest ROI, the number of regions of interest ROI (the number of ROIs) included in the captured image 111, the region number (or the priority 115) of each region of interest ROI, the data length of each region of interest ROI, or the image format of each region of interest ROI. The ROI information 120B is preferably arranged at an end portion (that is, the head of the payload data of the long packet) on the packet header PH side in the payload data of the long packet.

(Video Reception Device 200)

Figure 8:
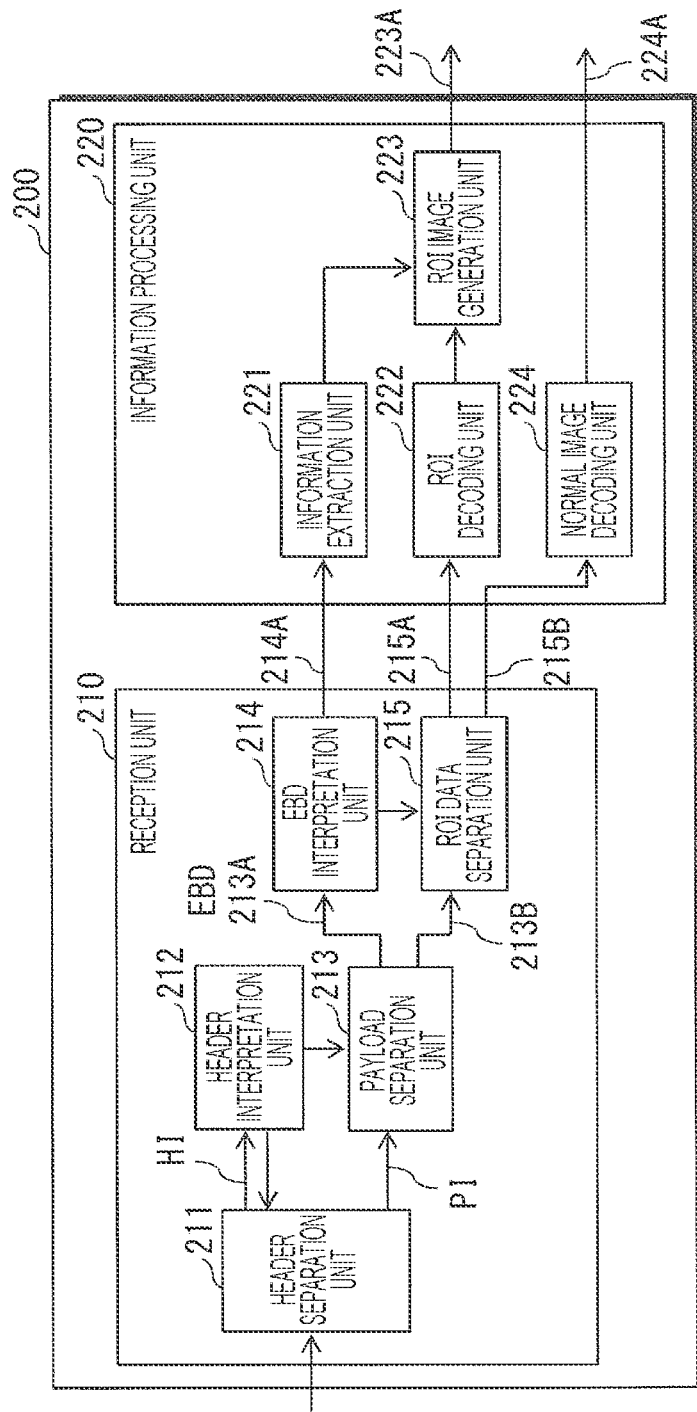
FIG. 8 is a diagram illustrating a schematic configuration example of a video reception device of FIG. 1.
Figure 9:
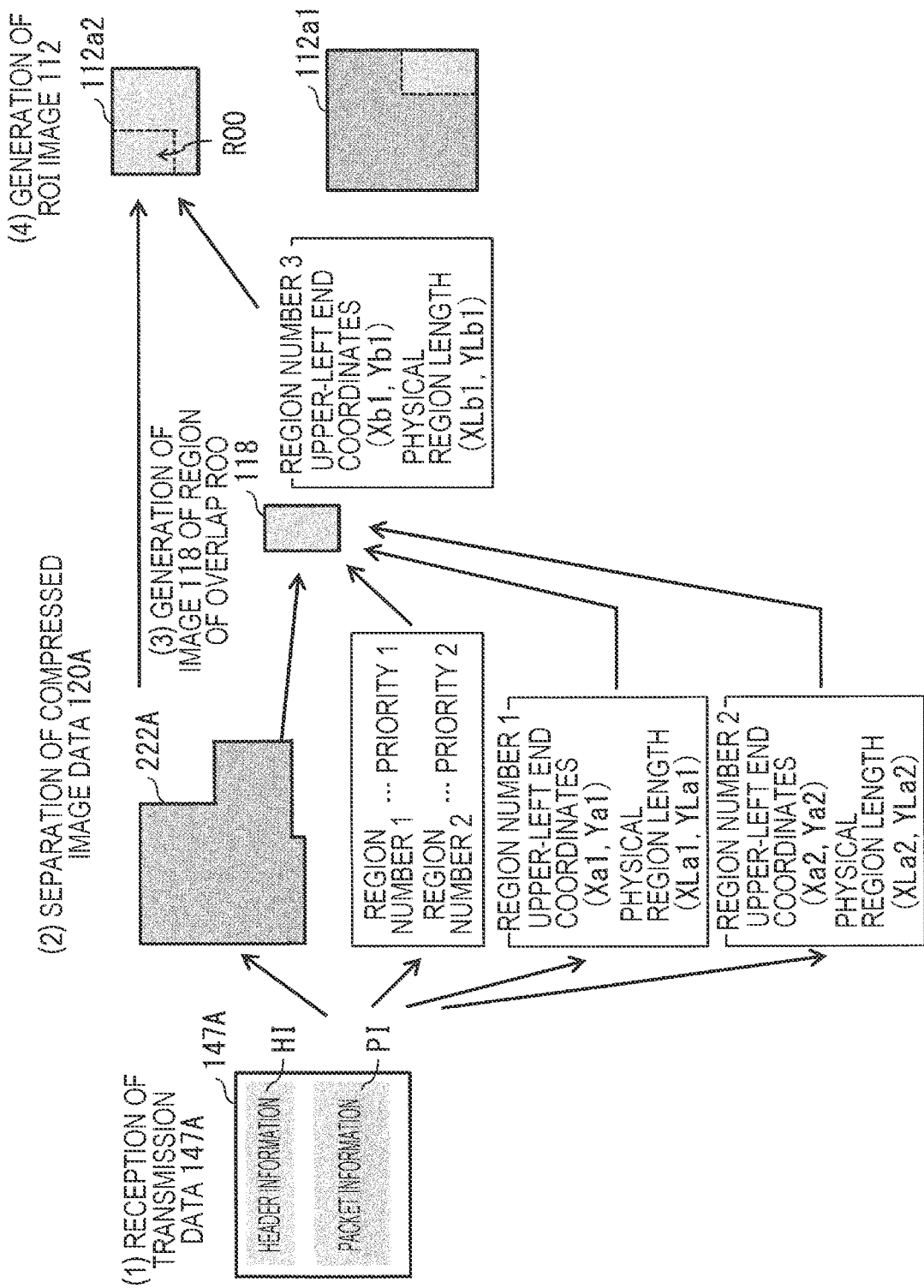
FIG. 9 is a diagram illustrating an example of a procedure of generating two ROI images included in a captured image in a case where two images are included in transmission data.

Next, the video reception device 200 will be described. FIG. 8 illustrates an example of a configuration of the video reception device 200. FIG. 9 illustrates an example of a procedure for generating an ROI image 223A in the video reception device 200. The video reception device 200 is a device that receives a signal according to a common standard (for example, the MIPI CSI-2 standard, the MIPI CSI-3 standard, or the MIPI DSI standard) with the video transmission device 100. The video reception device 200 includes, for example, the reception unit 210 and an information processing unit 220. The reception unit 210 is a circuit that receives the transmission data 147A output from the video transmission device 100 via the data lane DL, generates various pieces of data (214A, 215A, and 215B) by performing predetermined processing on the received transmission data 147A, and outputs the various pieces of data to the information processing unit 220. The information processing unit 220 is a circuit that generates the ROI image 223A on the basis of the various pieces of data (214A and 215A) received from the reception unit 210 and generates a normal image 224A on the basis of the data (215O) received from the reception unit 210.

The reception unit 210 includes, for example, a header separation unit 211, a header interpretation unit 212, a payload separation unit 213, an EBD interpretation unit 214, and an ROI data separation unit 215.

The header separation unit 211 receives the transmission data 147A from the video transmission device 100 via the data lane DL. That is, the header separation unit 211 receives the transmission data 147A in which the ROI information 120B regarding each region of interest ROI in the captured image 111 is included in the embedded data and the image data (compressed image data 120A) of each region of interest ROI is included in the payload data of the long packet. The header separation unit 211 separates the received transmission data 147A into the frame header region R1 and the packet region R2. The header interpretation unit 212 specifies the position of the payload data of the long packet included in the packet region R2 on the basis of the data (specifically, the embedded data) included in the frame header region R1. The payload separation unit 213 separates the payload data of the long packet included in the packet region R2 from the packet region R2 on the basis of the position of the payload data of the long packet specified by the header interpretation unit 212.

The EBD interpretation unit 214 outputs the embedded data as EBD data 214A to the information processing unit 220. The EBD interpretation unit 214 further determines whether the image data included in the payload data of the long packet is compressed image data 120A of image data 116 of an ROI or compressed image data 130A of normal image data on the basis of the data type included in the embedded data. The EBD interpretation unit 214 outputs the determination result to the ROI data separation unit 215.

In a case where the image data included in the payload data of the long packet is the compressed image data 120A of the image data 116 of the ROI, the ROI data separation unit 215 outputs the payload data of the long packet as payload data 215A to the information processing unit 220 (specifically, an ROI decoding unit 222). In a case where the image data included in the payload data is the compressed image data 1301 of the normal image data, the ROI data separation unit 215 outputs the payload data of the long packet as payload data 215B to the information processing unit 220 (specifically, a normal image decoding unit 224). In a case where the ROI information 120B is included in the payload data of the long packet, the payload data 215A includes the ROI information 120B and pixel data of one line of the compressed image data 147B.

The information processing unit 220 extracts the ROI information 120 from the embedded data included in the EBD data 214A. The information processing unit 220 extracts, on the basis of the ROI information 120B extracted by the information extraction unit 221, an image of each region of interest ROI (ROI image 112) in the captured image 111 from the payload data of the long packet included in the transmission data 147A received by the reception unit 210. The information processing unit 220 includes, for example, an information extraction unit 221, the ROI decoding unit 222, an ROI image generation unit 223, and the normal image decoding unit 224.

The normal image decoding unit 224 decodes the payload data 215B to generate the normal image 224A. The ROI decoding unit 222 decodes the compressed image data 147B included in the payload data 215A to generate image data 222A. The image data 222A includes one or more transmission images 116.

The information extraction unit 221 extracts the ROI information 120B from the embedded data included in the EBD data 214A. For example, the information extraction unit 221 extracts the number of regions of interest ROI included in the captured image 111, the region number (or the priority 115) of each region of interest ROI, the data length of each region of interest ROI, and the image format of each region of interest ROI from the embedded data included in the EBD data 214A. That is, the transmission data 147A includes the region number (or the priority 115) of the region of interest ROI corresponding to each transmission image 116 as determination information that enables determination of from which one of the plurality of transmission images 116 obtained from the transmission data 147A the image 118 of the region of overlap ROO has been omitted.

The ROI image generation unit 223 detects a region of overlap ROO in which two or more regions of interest ROI overlap each other on the basis of the ROI information 120B obtained by the information extraction unit 221.

For example, the information extraction unit 221 extracts the coordinates (for example, the upper-left end coordinates (Xa1,Ya1)), the lengths (for example, the physical region lengths XLa1 and YLa1), and the region number 1 (or the priority 115 (=1)) of the region of interest ROI corresponding to an ROI image 112a1 from the embedded data included in the EBD data 214A. The information extraction unit 221 further extracts the coordinates (for example, the upper-left end coordinates (Xa2,Ya2)), the lengths (for example, the physical region lengths XLa2 and YLa2), and the region number 2 (or the priority 115 (=2)) of the region of interest ROI corresponding to an ROI image 112a2 from the embedded data included in the EBD data 214A.

At this time, the ROI image generation unit 223 derives the position information 114 of the region of overlap ROD on the basis of these pieces of extracted information (hereinafter, referred to as "extracted information 221A"). The ROI image generation unit 223 derives, for example, the coordinates (for example, the upper-left end coordinates (Xb1, Yb1)) and the lengths (for example, the physical region lengths XLb1 and YLb1) of the region of overlap ROO as the position information 114 of the region of overlap ROO described above.

Note that the ROI image generation unit 223 may acquire the ROI information 120B from the payload data. 215A instead of acquiring the ROI information 120B from the embedded data included in the EBD data 214A. In this case, the ROI image Generation unit 223 may detect a region of overlap ROO in which two or more regions of interest ROI overlap each other on the basis of the ROI information 120B included in the payload data 215A. Furthermore, the ROI image generation unit 223 may extract the extracted information 221A from the ROI information 120B included in the payload data 215A, and may derive the position information 114 of the region of overlap ROO on the basis of the extracted information 221A extracted in this manner.

The ROI image generation unit 223 further generates images (ROI images 112a1 and 112a2) of respective regions of interest ROI in the captured image 111 on the basis of image data 222A, the extracted information 221A, and the position information 114 of the region of overlap ROO. The ROI image generation unit 223 outputs the generated image as the ROI image 223A.

[Procedure]

Next, an example of a procedure for data transmission in the video transmission system 1 will be described with reference to FIGS. 3 and 9.

First, the imaging unit 110 outputs the captured image 111 (digital image data) obtained by imaging to the image processing unit 120. The ROI cutting unit 121 specifies two regions of interest ROI1 and ROI2 included in the captured image 121 input from the imaging unit 110. The ROI cutting unit 121 cuts images (ROI images 112a1 and 112a2) of the respective regions of interest ROI1 and ROI2 from the captured image 111. The ROI cutting unit 121 assigns the region number 1 as the identifier to the region of interest ROI1, and assigns the region number 2 as the identifier to the region of interest ROI2.

The ROI analysis unit 122 derives position information 113 of a region of interest ROI in the captured image 111 for each region of interest ROI. The ROI analysis unit 122 derives the upper-left end coordinates (Xa1,Ya1) of the region of interest ROI1, the length (XLa1) of the region of interest ROI1 in the X-axis direction, and the length (YLa1) of the region of interest ROI1 in the Y-axis direction on the basis of the region of interest ROI1. The ROI analysis unit 122 derives the upper-left end coordinates (Xa2,Ya2) of the region of interest ROI2, the length (XLa2) of the region of interest ROI2 in the X-axis direction, and the length (YLa2) of the region of interest ROI2 in the Y-axis direction on the basis of the region of interest ROI2.

The overlapping detection unit 123 detects a region of overlap ROO in which the two regions of interest ROI1 and ROI2 overlap each other on the basis of the position information 113 of the two regions of interest ROI1 and ROI2 in the captured image 111. That is, the overlapping detection unit 123 derives the position information 114 of the region of overlap ROO in the captured image 111. The overlapping detection unit 123 derives the upper-left end coordinates (Xb1,Yb1) of the region of overlap ROO, the length (XLb1) of the region of overlap ROO in the X-axis direction, and the length (YLb1) of the region of overlap ROO in the Y-axis direction as the position information 114 of the region of overlap ROO in the captured image 111.

For two regions of interest ROI1 and ROI2, the priority setting unit 124 assigns 1 as the priority 115 to one region of interest ROI1, and assigns 2 as the priority 115 to the other region of interest ROI2.

The encoding unit 125 generates two transmission images 116a1 and 116a2 obtained by omitting an image 118 of a region of overlap ROO from the two ROI images 112a1 and 112a2 obtained from the captured image 111 in such a manner that the image 118 is not included redundantly in the two regions of interest ROI1 and ROI2.

The encoding unit 125 determines from which of the two ROI images 112a1 and 112a2 the image 118 is to be omitted on the basis of the region numbers (or the priorities 115) of the two regions of interest ROI1 and ROI2. The encoding unit 125 omits the image 118 from the ROI image 112a2 corresponding to the region of interest ROI2 having the larger region number (or higher priority 115) among the two regions of interest ROI1 and ROI2, thereby generating the transmission image 116a2. In a case of the ROI image 112a1 corresponding to the region of interest ROI1 having the smaller region number (or lower priority 115) among the two regions of interest ROI1 and ROI2, the encoding unit 125 uses the ROI image 112a1 itself as the transmission image 116a1.

The image processing control unit 126 generates ROI information 120B and frame information 120C, and transmits the ROI information 1206 and the frame information 120C to the transmission unit 140. The transmission unit 140 generates and sends the transmission data 147A on the basis of various pieces of data (120A, 120B, 120C, and 130A) input from the image processing units 120 and 130. The transmission unit 140 sends the generated transmission data 147A to the video reception device 200 via the data lane DL.

The reception unit 210 receives the transmission data 147A output from the video transmission device 100 via the data lane DL. The reception unit 210 performs predetermined processing on the received transmission data 147A to generate the EBD data 214A and the payload data 215A, and outputs the generated data to the information processing unit 220.

The information extraction unit 221 extracts the ROI information 120B from the embedded data included in the EBD data 214A. The information extraction unit 221 extracts the coordinates (for example, the upper-left end coordinates (Xa1,Ya1)), the lengths (for example, the physical region lengths XLa1 and YLa1), and the region number 1 (or the priority 115 (=1)) of the region of interest ROI corresponding to an ROI image 112a1 from the embedded data included in the EBD data 214A. The information extraction unit 221 further extracts the coordinates (for example, the upper-left end coordinates (Xa2,Ya2)), the lengths (for example, the physical region lengths XLa2 and YLa2), and the region number 2 (or the priority 115 (=2)) of the region of interest ROI corresponding to the ROI image 112a2. The ROI decoding unit 222 decodes the compressed image data 147B included in the payload data 215A to generate image data 222A.

The ROI image generation unit 223 derives the position information 114 of the region of overlap ROO on the basis of these pieces of extracted information (extracted information 221A). The ROI image generation unit 223 derives, for example, the coordinates (for example, the upper-left end coordinates (Xb1,Yb1)) and the lengths (for example, the physical region lengths XLb1 and YLb1) of the region of overlap ROO as the position information 114 of the region of overlap ROO described above. The ROI image generation unit 223 further generates images (ROI images 112a1 and 112a2) of respective regions of interest ROI in the captured image 111 on the basis of image data 222A, the extracted information 221A, and the position information 114 of the region of overlap ROO.

[Effects]

Next, effects of the video transmission system 1 according to the present embodiment will be described.

In recent years, transmission of a large amount of massive data is increasing. A large load is likely to be applied to a transmission system, and in the worst case, there is a possibility that the transmission system is down and data transmission cannot be performed.

Conventionally, an object to be imaged is specified and only an image of a cut part of the specified object is transmitted instead of, for example, transmitting all captured images in order to prevent the transmission system from being down.

Meanwhile, the MIPI CSI-2 may be used as a method used for transmission from an image sensor to an application processor. In a case where an attempt is made to transmit an ROI using this method, the transmission of the ROI is not easy due to various restrictions in some cases.

On the other hand, in the present embodiment, the ROI information 120B regarding each region of interest ROI in the captured image 111 is sent as the embedded data, and the image data of each region of interest ROI is sent as the payload data of the long packet. As a result, the device (video reception device 200) that has received the transmission data 147A transmitted from the video transmission device 100 can easily extract the image data (ROI image 112) of each region of interest ROI from the transmission data 147A. As a result, the region of interest ROI can be sent even under various constraints.

Furthermore, in the present embodiment, the image data (compressed image data 120A) of each region of interest ROI is sent through a common virtual channel. As a result, a plurality of ROI images 112 can be sent in the same packet, and it is thus not necessary to enter the IP mode while sending the plurality of ROI images 112, as a result of which high transmission efficiency can be obtained.

Furthermore, is the present embodiment, the data type of each region of interest ROI included in the packet header PH of the payload data of the long packet and sent. As a result, the data type of each region of interest ROI can be obtained only by accessing the packet header PH of the payload data of the long packet without accessing the embedded data. Therefore, a processing speed in the video reception device 200 can be increased, as a result of which high transmission efficiency can be obtained.

Furthermore, in the present embodiment, in a case where the ROI information 120B is included in the payload data of the long packet and sent, the ROI information 120B can be obtained only by accessing the payload data of the long packet without accessing the embedded data. Therefore, a processing speed in the video reception device 200 can be increased, as a result of which high transmission efficiency can be obtained.

Furthermore, in the present embodiment, the ROI information 120B regarding each region of interest ROI is extracted from the embedded data included in the transmission data 147A, and the image (ROI image 112) of each region of interest ROI is extracted from the payload data of the long packet included in the transmission data 147A on the basis of the extracted ROI information 120B. As a result, the image (ROI image 112) of each region of interest ROI can be easily extracted from the transmission data 147A. As a result, the region of interest ROI can be sent even under various constraints.

2. Underlying Technology 2 of Present Disclosure

Figure 10:
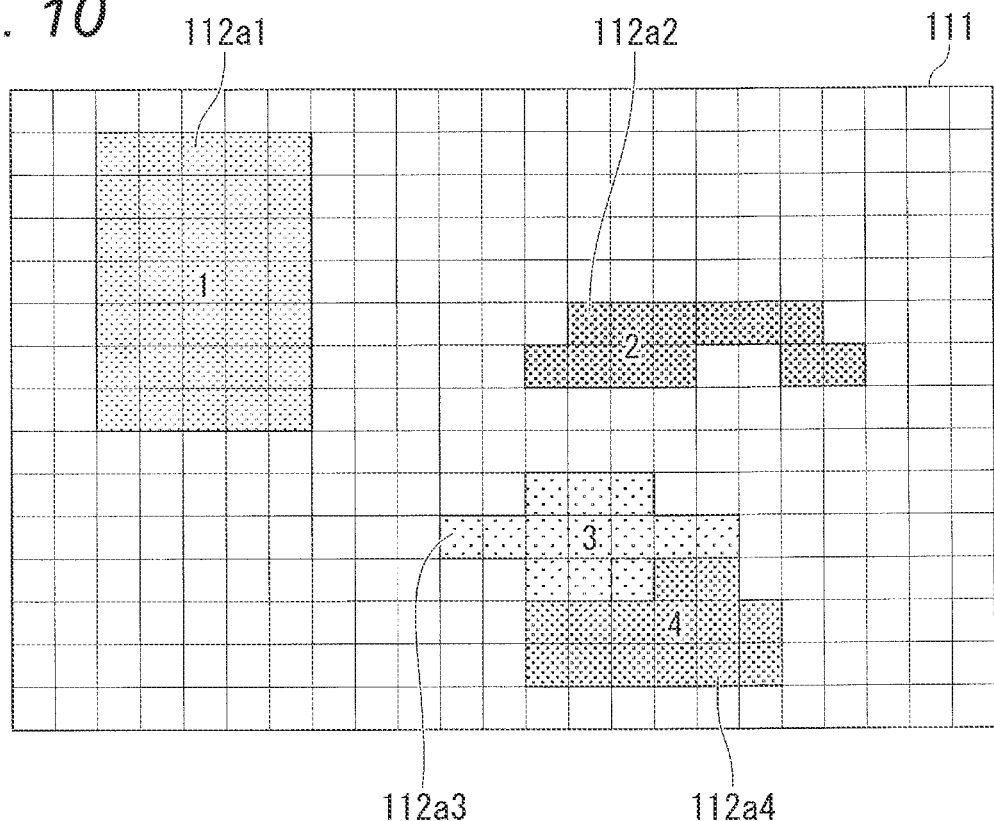
FIG. 10 is a diagram schematically illustrating a region in which a specified object is arranged in a captured image.
Figure 11:
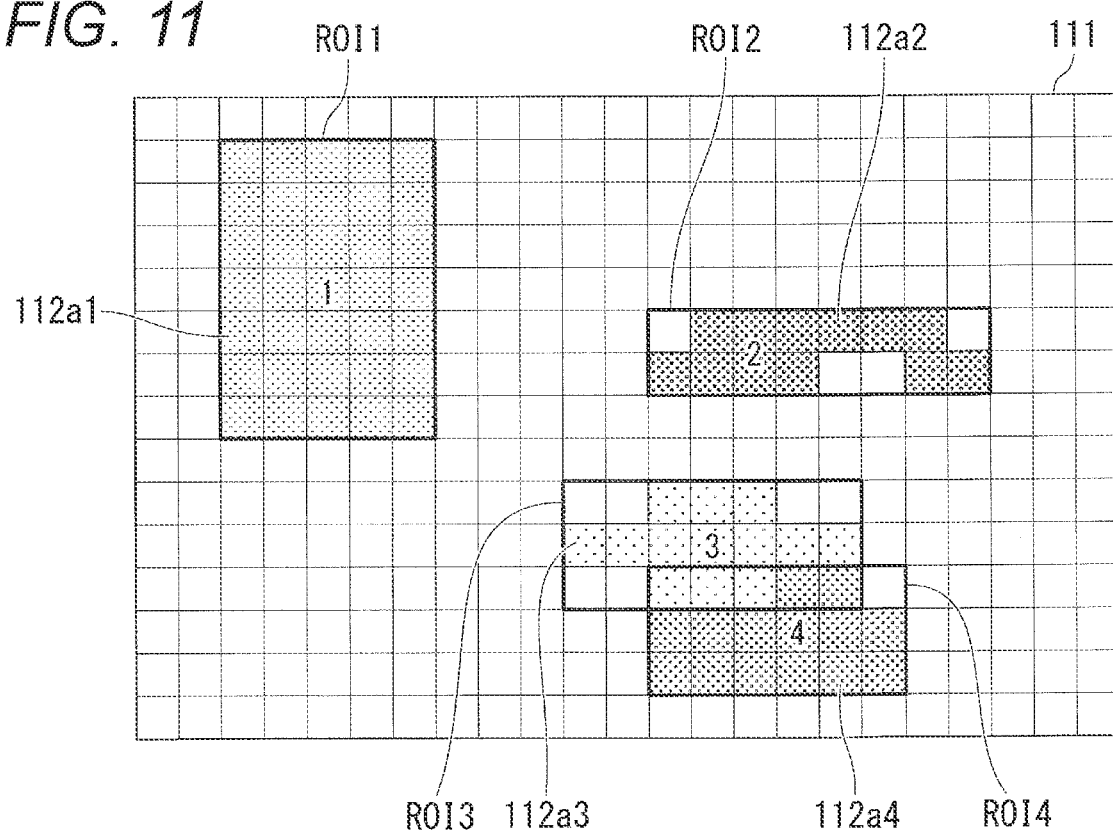
FIG. 11 is a diagram illustrating an example of an ROI set for a specified object.

A technology for transmitting some (non-rectangular) regions of interest (ROIs) cut from a captured image will be described with reference to FIGS. 1 to 9 and FIGS. 10 to 12. That is, a technology for transmitting and receiving an image of an object to be captured having a shape other than a square shape (rectangular shape) will be described. FIG. 10 is a diagram schematically illustrating a region in which a specified object is arranged in the captured image 111. Note that FIG. 10 schematically illustrates the captured image 111 captured in an imaging region including 15 rows×23 columns of imaging elements in order to facilitate understanding. FIG. 11 is a diagram illustrating an example of an ROI set for a specified object.

In Underlying Technology 2, similarly to Underlying Technology 1, a case where predetermined processing is performed on the captured image 111 input from the imaging unit 110 in a case where a control signal for instructing cutting of an ROI is input from the video reception device 200 to the video transmission device 100 via the camera control interface CCI will be described. However, Underlying Technology 2 can also be applied to a case where the video transmission device 100, that is, a transmission side, specifies the coordinates of an ROI to be cut. In this case, for example, the transmission side is configured to receive information such as a "person" or an "object" to be acquired in the ROI sent from a reception side, and determine and specify the coordinates of the cutting.

The control signal for instructing cutting of an ROI is input from the video reception device 200 via the camera control interface CCI. As a result, as illustrated in FIG. 10, the ROI cutting unit 121 specifies four objects 1 to 4 to be captured included in the captured image 111. The object 1 has, for example, a rectangular shape that occupies a part of the upper-left region in the captured image 111. The object 2 occupies, for example, a partial region on the right side of the object 1 in the captured image 111, and has a shape in which opposite upper side corners of a rectangle and a part of the lower edge of the rectangle are missing. The object 3 occupies, for example, a partial region below the object 2 in the captured image 111, and has a shape in which four corners of a rectangle are missing. The object 4 occupies, for example, a partial region under the object 3 in the captured image 111, and has a shape in which opposite upper side corners of a rectangle are missing. The object 3 and the object 4 partially overlap each other.

As illustrated in FIG. 11, the ROT cutting unit 121 (see FIG. 2) sets the smallest rectangles including the specified objects 1 to 4 as regions of interest ROI1 to ROI4, respectively. The ROI cutting unit 121 sets the region of interest ROI1 for the object 1 and cuts an ROI image 112a1. In addition, the ROI cutting unit 121 sets the region of interest ROI2 for the object 2 and cuts an ROI image 112a2. In addition, the ROI cutting unit 121 sets the region of interest ROI3 for the object 3 and cuts an ROI image 112a3. Moreover, the ROI cutting unit 121 sets the region of interest ROI4 for the object 4 and cuts an ROI image 112a4.

The ROI cutting unit 121 stores the region of interest ROI1 and the region number "1" assigned to the region of interest ROI1 in the storage unit in association with each other. The ROI cutting unit 121 stores the region of interest ROI2 and the region number "2" assigned to the region of interest ROI2 in the storage unit in association with each other. The ROI cutting unit 121 stores the region of interest ROI3 and the region number "3" assigned to the region of interest ROI3 in the storage unit in association with each other. The ROI cutting unit 121 stores the region of interest ROI4 and the region number "4" assigned to the region of interest ROI4 in the storage unit in association with each other.

The ROI analysis unit 122 (see FIG. 2) derives the position information of each of the regions of interest ROI1 to ROI4. The ROI analysis unit 122 derives, for example, a physical region length XLa1 in the X-axis direction and a physical region length YLa1 in the Y-axis direction as the position information of the region of interest ROI1. The ROI analysis unit 122 derives, for example, a physical region length XLa2 in the X-axis direction and a physical region length YLa2 in the Y-axis direction as the position information of the region of interest ROI2. The ROI analysis unit 122 derives, for example, a physical region length XLa3 in the X-axis direction and a physical region length YLa3 in the Y-axis direction as the position information of the region of interest ROI3. The ROI analysis unit 122 derives, for example, a physical region length XLa4 in the X-axis direction and a physical region length YLa4 in the Y-axis direction as the position information of the region of interest ROI4. The ROI analysis unit 122 may further derive, for example, an output region length XLc of a region of interest ROI in the X-axis direction and an output region length YLc of a region of interest ROI in the Y-axis direction as the position information 113 for each region of interest ROI.

The ROI analysis unit 122 derives the lengths of each region of interest ROI in the X-axis direction and the Y-axis direction, thereby deriving the size and the total data amount of each of the regions of interest ROI1 to ROI4 as information for the subsequent stage. As a result, the video reception device 200 corresponding to the subsequent stage can secure a memory region.

The ROI analysis unit 122 is configured to derive the position information of the ROI images 112a1 to 112a4 instead of the position information of the regions of interest ROI in a case where the shapes of the object to be captured and the region of interest do not match. The ROI analysis unit 122 derives the left end coordinates (xn,yn) of each row and a physical region length XLn in the X-axis direction as the position information of the ROI images 112a1 to 112a4. In addition, in a case where the ROI images are separated as in the second row of the ROI image 112a2, the ROI analysis unit 122 derives the position information of each of the separated portions. The ROI analysis unit 122 stores the region numbers of the regions of interest ROI1 to ROI4 and the position information of the ROI images 112a1 to 112a4 in the storage unit in association with each other.

Furthermore, the ROI analysis unit 122 may derive, in addition to the position information, for example, sensing information, exposure information, gain information, an AD word length, an image format, and the like for each of the regions of interest ROI1 to ROI4, and store the derived information in the storage unit in association with the region number.

In a case where the object to be captured has a rectangular shape, the overlapping detection unit 123 (see FIG. 2) derives a region where the ROI images overlap each other as a region of overlap, instead of a region where the regions of interest overlap each other. As illustrated in FIG. 11, the overlapping detection unit 123 derives a region of overlap ROO as a region where the ROI image 112a3 and the ROI image 123a4 overlap each other. The overlapping detection unit 123 stores the derived region of overlap ROO in the storage unit in association with the position information of each of the regions of interest ROI3 and ROI4.

The priority setting unit 124 (see FIG. 2) assigns the priority "1" to the region of interest ROI1, and stores the priority (1) in the storage unit in association with the region of interest ROI1. The priority setting unit 124 assigns the priority "2" lower than the priority "1" to the region of interest ROI2, and stores the priority (2) in the storage unit in association with the region of interest ROI2. The priority setting unit 124 assigns the priority "3" lower than the priority "2" to the region of interest ROI3, and stores the priority (3) in the storage unit in association with the region of interest ROI3. The priority setting unit 124 assigns the priority "4" lower than the priority "3" to the region of interest ROI4, and stores the priority (4) in the storage unit in association with the region of interest ROI4.

The encoding unit 125 (see FIG. 2) generates a transmission image for each of the ROI images 112a1 to 112a4. Since the region of interest ROI4 is lower in priority than the region of interest ROI3, the encoding unit 125 generates the transmission image by omitting the region of overlap ROO from the ROI image 112a4.

The image processing control unit 126 (see FIG. 2) generates ROI information and frame information, and transmits the ROI information and the frame information to the transmission unit 140 (see FIG. 2). The ROI information includes, for example, the position information of each of the ROI images 112a1 to 112a4. The ROI information further includes information similar to that in the case where the object to be captured has a rectangular shape (for example, the data type of each of the regions of interest ROI1 to ROI4, the number of the regions of interest ROI1 to ROI4 included in the captured image 111, the region numbers and priorities of the regions of interest ROI1 to ROI4, and the like). The frame information includes, for example, information similar to that in the case where the object to be imaged has a rectangular shape, such as the data types of the regions of interest ROI1 to ROI4.

The LINK control unit 141 provided the transmission unit 140 (see FIG. 2) outputs the frame information and the ROI information input from the image processing control unit 126 to the ECC generation unit 142 and the PH generation unit 143 (see FIG. 2) for each line. The ECC generation unit 142 generates an error correction code of one line on the basis of data (for example, a virtual channel number, the data type of each of the regions of interest ROI1 to ROI4, the payload length of each line, and the like) of the line in the frame information, for example. The ECC generation unit 142 outputs the generated error correction code to the PH generation unit 143, for example. The PH generation unit 143 generates the packet header PH (see FIG. 4) for each line by using, for example, the frame information and the error correction code generated by the ECC generation unit 142.

The EBD buffer 144 (see FIG. 2) primarily stores the ROI information and outputs the ROI information to the combining unit 147 (see FIG. 2) as embedded data at a predetermined timing.

The ROI data buffer 145 (see FIG. 2) primarily stores compressed image data input from the encoding unit 125, and outputs, in a case where a control signal for instructing cutting of an ROI is input from the video reception device 200 via the camera control interface CCI, outputs the compressed image data 120A to the combining unit 147 as payload data of a long packet, for example.

In a case where a control signal for instructing cutting of an ROI input from the video reception device 200 via the camera control interface CCI, the combining unit 147 generates transmission data 147A on the basis of various pieces of input data (the packet header PH, the POI information, and the compressed image data that is input from the encoding unit 125 via the ROI data buffer 145). The combining unit 147 outputs the generated transmission data 147A to the video reception device 200 via the data lane DL. That is, the combining unit 147 includes, in the packet header PH of the payload data of the long packet, the data type of each of the regions of interest ROI1 to ROI4 and sends the packet. In addition, the combining unit 147 sends the image data (compressed image data) of each of the regions of interest ROI1 to ROI4 through a common virtual channel.

In a case where the object to be captured does not have rectangular shape, the position information of each of the ROI images 112a1 to 112a4 is included in the packet header PH or the payload data of the long packet. The position information of each of the ROI images 112a1 to 112a4 is included in the packet header PH by the PH generation unit 143. Meanwhile, the position information of each of the ROI images 112a1 to 112a4 is included in the payload data of the long packet by the combining unit 147.

FIG. 12 is a diagram illustrating a configuration example of the transmission data 147A in which the position information of each of the ROI images 112a1 to 112a4 is included in the payload data of the long packet. As illustrated in FIG. 12, the transmission data 147A includes, for example, a frame header region R1 and a packet region R2. Note that FIG. 12 illustrates contents of the frame header region R1 in detail. Furthermore, in FIG. 12, the low power modes LP are omitted.

The frame header region R1 includes, for example, a frame number F1 as the identifier of the transmission data 147A. The frame header region R1 includes information regarding compressed image data included in the packet region R2. The frame header region R1 includes, for example, the number of pieces of compressed image data (the number of ROIs) and information regarding each of the ROI images 112a1 to 112a4 corresponding to the respective compressed image data (ROI information). The ROI information includes a region number, a physical region length, a rectangular output region size, a priority, exposure information, gain information, an AD word length, and an image format. The physical region length is the maximum length of an ROI image, and the rectangular output region size is the size of a region of interest ROI.

"Info" illustrated in FIG. 12 indicates region information stored in the payload of the long packet. The position information of each of the ROI images 112a1 to 112a4 is stored in "Info", for example. The position information of each of the ROI images 112a1 to 112a4 is stored in the head portion of the payload of the long packet. In a case where the physical region lengths of the respective consecutive pixel rows included in the ROI image in the X-axis direction are the same and the ROI images having different region numbers are not included in the respective pixel rows, the region information "info" does not have to be stored in the payload of the long packet including the image data of the second and subsequent pixel rows among the respective pixel rows. In this example, in the ROI image 112a1, the physical region lengths of the first to fourth consecutive pixel rows among all the pixel rows in the X-axis direction are the same, and the ROI images having different region numbers are not included in the first to fourth pixel rows. Therefore, the region information "info" is not stored in the payload of each long packet including the image data of the second to fourth pixel rows corresponding to the second and subsequent pixel rows among the first to fourth consecutive pixel rows included in the ROI image 112a1. Furthermore, in this example, in the ROI image 112a4, the physical region lengths of the second and third consecutive pixel rows among all the pixel rows in the X-axis direction are the same, and the ROI images having different region numbers are not included in the second and third pixel rows. Therefore, the region information "info" is not stored in the payload of the long packet including the image data of the third pixel row corresponding to the second and subsequent pixel rows among the second and third consecutive pixel rows included in the ROI image 112a4. Note that even in a case where the physical region lengths in the X-axis direction are the same and the ROI images having different region numbers are not included in each pixel row, the region information "info" may be stored in the payload of each row.

For example, the combining unit 147 divides and arranges compressed image data generated by compressing each of the ROI images 112a1 to 112a4 for each pixel row in the packet region R2 of the transmission data 147A. "1" illustrated in FIG. 12 indicates the compressed image data of the ROI image 112a1 stored in the payload of the long packet. "2" illustrated in FIG. 12 indicates the compressed image data of the ROI image 112a2 stored in the payload of the long packet. "3" illustrated in FIG. 12 indicates the compressed image data of the ROI image 112a3. "4" illustrated in FIG. 12 indicates the compressed image data of the ROI image 112a4 stored in the payload of the long packet. Note that, in FIG. 12, each piece of compressed image data is illustrated in a divided manner for easy understanding, but there is no division in data stored in a payload of a long packet. Compressed image data 112b corresponding to the image of the region of overlap ROO is not redundantly included in the packet region R2 of the transmission data 147A. Further, for example, the combining unit 147 omits a pixel row of the captured image 111 that does not correspond to each transmission image in the packet region R2 of the transmission data 147A. Therefore, the packet region R2 of the transmission data 147A does not include a pixel row of the captured image 111 that does not correspond to each transmission image.

Next, an operation of the video reception device 200 in a case where the transmission data 147A is received will be described.

The header separation unit 211 (see FIG. 8) provided in the reception unit 210 receives the transmission data 147A from the video transmission device 100 via the data lane DL. That is, the header separation unit 211 receives the transmission data 147A in which the ROI information regarding each of the regions of interest ROI1 to ROI4 in the captured image 111 is included in the embedded data and the image data (compressed image data) of each of the regions of interest ROI1 to ROI4 is included in the payload data of the long packet. The header separation unit 211 separates the received transmission data 147A into the frame header region R1 and the packet region R2.

The header interpretation unit 212 (see FIG. 8) specifies the position of the payload data of the long packet included in the packet region R2 on the basis of the data (specifically, the embedded data) included in the frame header region R1.

The payload separation unit 213 (see FIG. 8) separates the payload data of the long packet included in the packet region R2 from the packet region R2 on the basis of the position of the payload data of the long packet specified by the header interpretation unit 212.

The EBD interpretation unit 214 outputs the embedded data as EBD data to the information processing unit 220 (see FIG. 8). The BED interpretation unit 214 further determines whether the image data included in the payload data of the long packet is compressed image data of image data 116 of an ROI or compressed image data of normal image data on the basis of the data type included in the embedded data. The EBD interpretation unit 214 outputs the determination result to the ROI data separation unit 215 (see FIG. 8).

In a case where image data of an ROI as the image data included in the payload data of the long packet is input, the ROI data separation unit 215 outputs the payload data of the long packet as the payload data to the information processing unit 220 (specifically, the ROI decoding unit 222 (see FIG. 8)). The payload data of the long packet including the ROI information includes pixel data of one line of the ROI information and the compressed image data.

The information extraction unit 221 (see FIG. 8) provided in the information processing unit 220 extracts the number of regions of interest ROI1 to ROI4 included in the captured image 111 (four in this example), the region numbers 1 to 4 and the priorities 1 to 4 of the regions of interest. ROI1 to ROI4, the data length of each of the regions of interest ROI1 to ROI4, and the image format of each of the regions of interest ROI1 to ROI4 from the embedded data included in the EBD data input from the EBD interpretation unit 214. Moreover, the information extraction unit 221 extracts the position information of each of the ROI images 112a1 to 112a4 from the embedded data.

The ROI decoding unit 222 decodes the compressed image data 147B included in the payload data, extracts the position information of each of the ROI images 112a1 to 112a4, and generates the image data (generated from the transmission image). For example, in a case where the payload data corresponding to the sixth pixel row is input, the ROI decoding unit 222 extracts one piece of position information of the ROI image 112a1 and two pieces of position information of the ROI image 112a2 from the payload data, and generates the image data (transmission image) of each of the ROI images 112a1 and 112b1 corresponding to the sixth pixel row.

For example, in a case where the payload data corresponding to the tenth pixel row is input, the ROI decoding unit 222 extracts one piece of position information of the ROI image 112a3 and one piece of position information of the ROI1 image 112a4 from the payload data, and generates the image data (transmission image) of each of the ROI images 112a3 and 112b4.

The ROI image generation unit 223 (see FIG. 8) generates the ROI images 112a1 to 112a4 of the regions of interest ROI1 to ROI4 in the captured image 111 on the basis of the ROI information obtained by the information extraction unit 221, the position information of each of the ROI images 112a1 to 112a4 extracted by the ROI decoding unit 222, and the transmission image generated by the ROI decoding unit 222. For example, in a case where one piece of position information of the ROI image 112a1 and two pieces of position information of the ROI image 112a2 extracted from the payload data corresponding to the sixth pixel row, and the transmission images thereof are input, the ROI image generation unit 223 generates the ROI image 112a1 corresponding to five pixels and extending in the X-axis direction, the ROI image 112a2 corresponding to four pixels and extending in the X-axis direction at a position separated from the ROI image 112a1 by five pixels, and the ROI image 112a2 corresponding to two pixels and extending in the X-axis direction at a position separated from the ROI image 112a2 by two pixels (see FIG. 10).

In addition, the ROI image generation unit 223 detects the region of overlap ROO in which the region of interest ROI3 and the region of interest ROI4 overlap each other on the basis of the ROI information obtained by the information extraction unit 221. The ROI image generation unit 223 generates, on the basis of the detected region of overlap ROO, the position information of each of the ROI images 112a3 and 112a4 extracted from the payload data corresponding to the tenth pixel row, and the transmission image, the ROI image 112a3 corresponding to four pixels and extending in the X-axis direction and the ROI image 112a4 corresponding to three pixels and extending in the X-axis direction in a state where one pixel overlaps with the ROI image 112a3 (see FIG. 10).

The ROI image generation unit 223 outputs the generated image as an ROI image to a device in the subsequent stage (not illustrated).

In this manner, the video transmission device 100 and the video reception device 200 can transmit and receive an ROI image even in a case where an object to be captured has a shape other than a rectangular shape.

Figure 13:
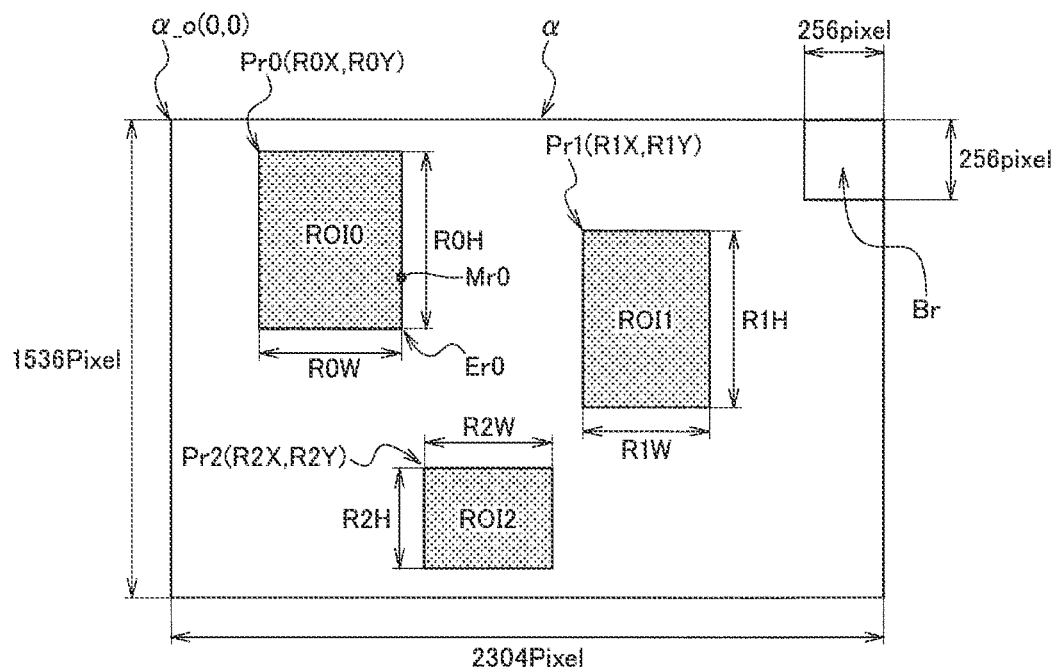
FIG. 13 is a diagram schematically illustrating an example of a region of interest included in a captured image to be subjected to shading correction.
Figure 14:
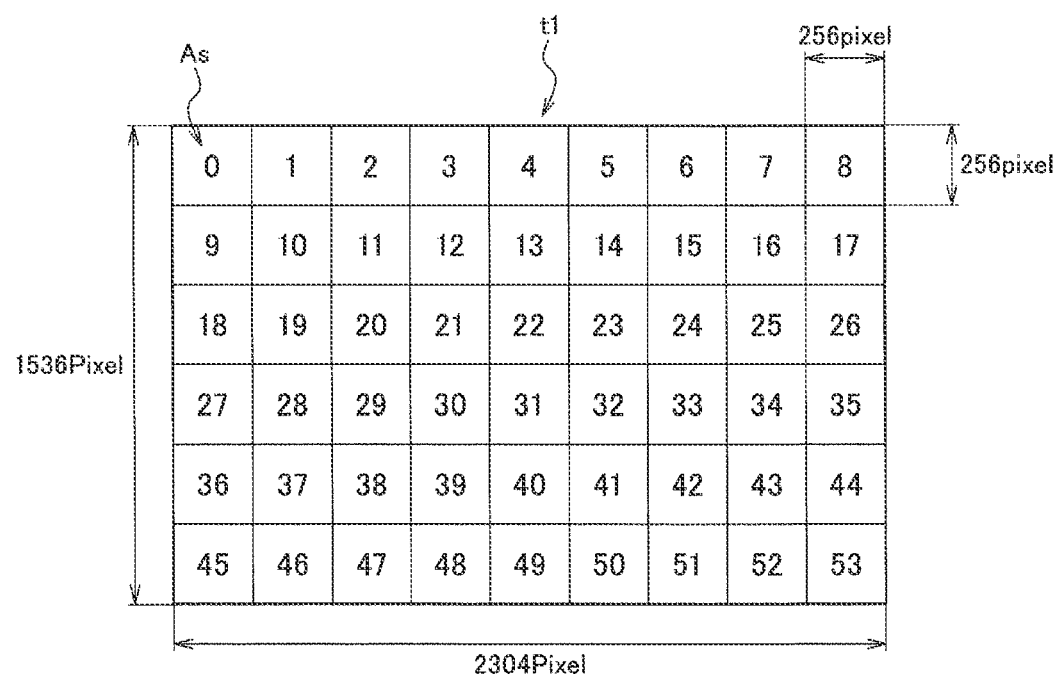
FIG. 14 is a diagram illustrating an example of a correction value table used for shading correction processing.
Figure 15:
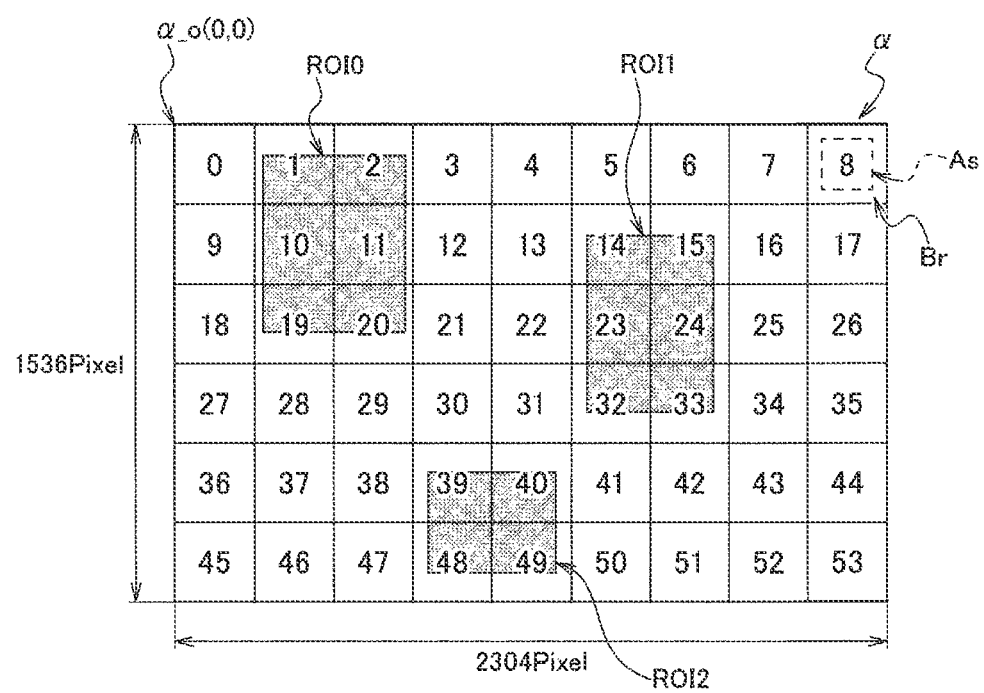
FIG. 15 is a diagram schematically illustrating the shading correction processing in the present disclosure.

3. Principle of Shading Correction Processing in Embodiment of Present Disclosure Next, a principle of shading correction processing according to an embodiment of the present disclosure will be described with reference to FIGS. 13 to 15. FIG. 13 is a diagram illustrating an example of an ROI included in a captured image to be subjected to the shading correction processing. FIG. 14 is a diagram illustrating an example of a correction value table used for the shading correction processing. Furthermore, FIG. 15 is a diagram schematically illustrating the shading correction processing in the present disclosure.

As illustrated in FIG. 13, a captured image α includes three regions of interest (regions of interest ROI0 to ROI2). For example, in an image (the captured image α in this example) captured using a lens, a phenomenon (luminance unevenness or density unevenness) in which the peripheral portion of the image is darker than the central portion of the image may occur due to an influence of a direction of a light source, lens aberration, and the like. Shading correction is a method for solving this phenomenon.

In the shading correction processing, for example, it is possible to correct the luminance unevenness, the density unevenness, and the like to make the luminance of the captured image uniform by adjusting (amplifying) the luminance of the image depending on a region in the captured image. Therefore, in the shading correction processing, the degree of amplification of the luminance is adjusted depending on a region in the captured image. For example, the degree of amplification of the luminance is increased in the peripheral portion of the captured image, because the peripheral portion of the captured image has a relatively low luminance. Furthermore, the degree of amplification of the luminance is decreased or the luminance at the time of imaging is maintained without being amplified in the central portion of the captured image, because the central portion of the captured image has a relatively high luminance. Therefore, in the shading correction processing for the entire captured image, the luminance of each region in the captured image is amplified on the basis of a shading correction value (a correction value used for luminance amplification) corresponding to a region in the captured image. As a result, the luminance of the entire captured image is made uniform.

However, the range and size of the region of interest (ROI) cut from the captured image each time are unknown. Therefore, in a case where the shading correction is performed on the region of interest, it is necessary to determine the degree of amplification of the luminance, that is, the shading correction value, depending on which region in the captured image the region of interest is located.

For example, a corresponding shading correction value varies depending on whether the region of interest corresponds to the peripheral portion in the captured image or corresponds to the central portion in the captured image. Therefore, shading correction processing similar to that for the entire captured image (the captured image α in this example) cannot be performed for a region of interest whose position and size are arbitrarily selected in the captured image. For example, as illustrated in FIG. 13, in a case where three regions of interest (the regions of interest ROI0 to ROI2) are included in the captured image α, the degree of adjustment of sensitivity differs for each region of interest. Furthermore, in a case where a plurality of regions of interest is present with spaces therebetween like the regions of interest ROI0 to ROI2, the shading correction is performed on a discontinuous region in imaging. Moreover, also in each region of interest, the degree of amplification of the luminance for each pixel, that is, the corresponding shading correction value, may be different depending on which of a distance to the peripheral portion of the captured image α and a distance to the central portion of the captured image α is shorter.

Therefore, the transmission system according to the present embodiment is configured to perform the shading correction processing on image data of a region of interest on the basis of coordinate information of the region of interest in a captured image in either the video device or the video reception device. As a result, the luminance of the image data of the region of interest can be amplified at a degree corresponding to the region in the captured image, and the luminance can be made uniform. Here, the coordinate information is information (position information) indicating the position of the region of interest in the captured image α. In the present embodiment, at least the coordinates of the upper-left end portion of the region of interest are used as the coordinate information of the region of interest. The coordinate information of the region of interest used in the shading correction processing will be described below.

(Coordinate Information of Region of Interest)

Here, the coordinate information of the region of interest used in the shading correction processing in the present embodiment will be described.

As illustrated in FIG. 13, the rectangular regions of interest ROI0 to ROI2 are arranged at predetermined intervals in the captured image α. The origin α_o (0,0) of the captured image α corresponds to a pixel at the upper-left end portion of the captured image α. As described above, in a case where the region of interest is set, the coordinate information and the size information (the length in the X-axis direction and the length in the Y-axis direction) of the region of interest are derived. In this example, in a case where the regions of interest ROI0 to ROI2 are set in the captured image α, for example, coordinates (R0X, R0Y) of a start point Pr0 indicating the upper-left end portion of the region of interest ROI0 are derived as the coordinate information of the region of interest ROI0 as illustrated in FIG. 13. Here, the coordinates (R0X,R0Y) of the start point Pr0 of the region of interest ROI0 are pixels at the upper-left end portion of the region of interest ROI0. Furthermore, in addition to the coordinate information, a length R0W in the X-axis direction and a length R0H in the Y-axis direction are derived as the size information of the region of interest ROI0.

Further, similarly, for example, coordinates (R1X,R1Y) of a start point Pr1 are derived as the coordinate information of the region of interest ROI1. Here, the coordinates (R1X, R1Y) of the start point Pr1 correspond to a pixel at the upper-left end portion of the region of interest ROI1. Moreover, a length R1W in the X-axis direction and a length R1H in the Y-axis direction are derived as the size information of the region of interest ROI1. Further, similarly, for example, coordinates (R2X,R2Y) of a start point Pr2 are derived as the coordinate information of the region of interest ROI2. Here, the coordinates (R2X,R2Y) of the start point Pr2 correspond to a pixel at the upper-left end portion of the region of interest ROI2. Moreover, a length R2W in the X-axis direction and a length R2H in the Y-axis direction are derived as the size information of the region of interest ROI2.

The respective coordinates of the start points Pr0, Pr1, and Pr2 of the regions of interest ROI0, ROI1, and ROI2 represent the positions of the regions of interest ROI0, ROI1, and ROI2 in the captured image α. Therefore, the respective coordinates of the start points Pr0, Pr1, and Pr2 are coordinates based on the origin α_o (0, 0) of the captured image, that is, the pixel at the upper-left end portion of the captured image α. In the present embodiment, the coordinates of the upper-left end portion of the region of interest are derived as the coordinate information at the time of setting the region of interest in the transmission device, and are held for use in subsequent processing. As will be described in detail later, the coordinates of the upper-left end portion of the region of interest are also used in the shading correction processing. Furthermore, at the time of setting the region of interest, the size information (the length in the X-axis direction and the length in the Y-axis direction) is also derived together with the coordinate information, and is held for use in subsequent processing (the shading correction processing and the like).

Furthermore, in the present embodiment, in the shading correction processing, the coordinates of each pixel of the image data of the region of interest in the captured image are generated as the coordinate information. The coordinates of each pixel as the coordinate information are generated on the basis of the coordinates of the upper-left end portion of the region of interest. That is, the coordinate information used for the shading correction processing includes the coordinates of each pixel of the image data of the region of interest in addition to the coordinates of the upper-left end portion of the region of interest. Then, the luminance is amplified for each pixel of the image data of the region of interest generated by using the shading correction value according to the coordinate information. As a result, the accuracy of the shading correction processing for the image data of the region of interest can be improved. Here, the generation of the coordinates of each pixel (units of pixels) of the image data of the region of interest will be described.

(Coordinate Information of Each Pixel in Region of Interest)

In the present embodiment, the coordinates of each pixel in the image data of the region of interest are generated using the coordinates indicating the pixel at the upper-left end portion (start point) of the region of interest and the size information of the region of interest. In the present embodiment, the size information of the region of interest indicates the number of pixels. That is, the length of the region of interest in the X-axis direction indicates the number of pixels in the X-axis direction in the image data of the region of interest, and the length in the Y-axis direction indicates the number of pixels in the Y-axis direction in the image data of the region of interest. Furthermore, the number of pixels in the entire region of interest is calculated by multiplying the length (the number of pixels) in the X-axis direction by the length (the number of pixels) in the Y-axis direction (length in X-axis direction×length in Y-axis direction). Furthermore, the length in the Y-axis direction indicates the number of pixel rows in the image data of the region of interest. For example, in a case where the length of the image data in the Y-axis direction is 10 pixels in a predetermined region of interest, the image data includes 10 pixel rows.

In the present embodiment, image data of one pixel is arranged at each coordinate position in the captured image. That is, each coordinate in the region of interest and each pixel of the image data in the region of interest correspond to each other on a one-to-one basis. In the present embodiment, the X coordinates are measured (counted) on the basis of the length (the number of pixels) in the X-axis direction, starting from the coordinates indicating the pixel at the upper-left end portion (start point) of the region of interest. As a result, the relative coordinates (pixel coordinates) of each pixel of the image data of the region of interest in the captured image can be generated in units of pixel rows. Furthermore, the pixel coordinates of the entire image data of the region of interest can be generated by repeating the generation of the pixel coordinates in units of pixel rows on the basis of the length (the number of pixels) of the image data of the region of interest in the Y-axis direction, that is, the number of pixel rows.

For example, the length R0W of the region of interest ROI0 in the X-axis direction indicates the number of pixels in the X-axis direction (the number of pixels included in the pixel row data) in the image data of the region of interest ROI0. In addition, the length R0H of the region of interest ROI0 in the Y-axis direction indicates the number of pixels (the number of pieces of pixel data) in the Y-axis direction in the image data of the region of interest ROI0. Therefore, the measurement (counting) is performed while adding 1 to the X coordinate of the start point PR0 by the number of pixels corresponding to a "length R0W−1 in the X-axis direction" starting from the coordinate (R0X,R0Y) of the start point Pr0 of the region of interest ROI0. As a result, coordinates corresponding to the number of pixels indicated by the length R0W in the X-axis direction including the coordinates (R0X, R0Y) of the start point Pr0 are generated for the top pixel row of the image data of the region of interest ROI0.

Thereafter, the pixel coordinates corresponding to the length (the number of pixels) in the X-axis direction are generated in units of pixel rows while moving the coordinates (R0X,R0Y) of the start point Pr0 of the region of interest ROI0 by one coordinate (one pixel) in the Y-axis direction. The processing of generating the pixel coordinates in the region of interest ROI0 is repeatedly performed by the number of pixel rows (the length R0H in the Y-axis direction). Specifically, the processing of generating the pixel coordinates in units of pixel rows is repeated the number of times corresponding to "length in Y-axis direction−1". As a result, coordinates (R0X+(R0W−1), ER0Y+(R0H−1)) of a lower-right end (end point) Er0 of the region of interest ROI0 are finally generated. That is, the coordinates of all the pixel rows constituting the image data in the region of interest ROI0, that is, the coordinates of all the pixels in the image data of the region of interest ROI are generated.

As described above, the coordinates of each pixel of the image data of the region of interest ROI0 are generated on the basis of the coordinates (R0X, R0Y) of the start point Pr0 of the region of interest ROI0. More specifically, the coordinates of each pixel of the image data of the region of interest ROI0 are generated using the coordinates (R0X, R0Y) of the start point Pr0 of the region of interest ROI0 and the size information (the length R0W in the X-axis direction and the length R0H in the Y-axis direction). By doing so, the coordinates of each pixel of the image data of the region of interest ROI0 in the captured image α can be generated. The coordinates of all the pixels of the image data are generated similarly for the regions of interest ROI1 and ROI2.

(Block Region of Captured Image)

In the present embodiment, in the shading correction processing, the luminance is amplified using the shading correction value for the image data of the region of interest. The shading correction value is, for example, a value (numerical value) by which multiplication is made for image data in order to amplify the luminance. In the present embodiment, the shading correction value is associated with a block region (a block region Br in this example) which is a region obtained by dividing a captured image (the captured image α in this example) by a predetermined number of pixels.

As illustrated in FIG. 13, the block region Br in the captured image α is an image region including 256 (pixels)×256 (pixels)=65536 pixels per region. That is, each block region corresponds to the coordinates of image data corresponding to 65536 pixels. Furthermore, as illustrated in FIG. 13, the captured image α is an image including 3538944 pixels=2304 pixels (length in X-axis direction)×1536 pixels (length in Y-axis direction). Therefore, the number of block regions Br in the captured image α is 54 (=3538944 pixels (total number of pixels)/65536 pixels (the number of pixels per block region)). That is, the captured image α is divided into 54 block regions Br. More specifically, the captured image α is divided into 54 coordinate regions (nine in the X-axis direction and six in the Y-axis direction). FIG. 13 illustrates only the block region Br at the upper-right end among the 54 block regions Br for easy understanding.

In the captured image α, each block region Br is associated with a suitable shading correction value according to the position (coordinate) in the captured image. For example, a relatively large shading correction value is associated with a block region Br corresponding to the peripheral portion of the captured image α. Therefore, it is possible to appropriately amplify the luminance of the image data in the peripheral portion of the captured image α, the peripheral portion having a relatively low luminance. Furthermore, for example, a relatively small shading correction value is associated with a block region Br corresponding to the central portion of the captured image α. Therefore, it is possible to adjust a balance with the luminance of the peripheral portion by decreasing the degree of amplification of the luminance of the image data at the central portion of the captured image α, the central portion having a relatively high luminance.

In the present embodiment, in the shading correction processing for the region of interest, it is determined to which block region Br each pixel of the image data of the region of interest belongs. That is, it is determined to which coordinate of the block region Br the pixel coordinates of the image data of the region of interest correspond. As a result, shading correction processing suitable for the image data of each pixel is performed by using the shading correction value corresponding to the block region Br to which each pixel of the image data in the region of interest belongs.

(Correction Value Table)

In the present embodiment, the shading correction value corresponding to the block region in the captured image is held in the correction value table. Here, the shading correction table will be described with reference to FIG. 14 while referring to FIG. 13.

FIG. 14 is a diagram illustrating each storage region in a correction value table t1 in association with the block region Br in the captured image α of the present embodiment. In the correction value table t1, correction values are held in association with the coordinate information in the captured image α. Specifically, the correction value table T1 in the present embodiment includes a plurality of address regions As. Each of the plurality of address regions As is associated with each of block regions Br obtained by dividing the captured image α by a predetermined number of pixels (65536 pixels in this example). In one address region As, a shading correction value corresponding to one associated block region Br is held. That is, in one address region As, a correction value is held in association with one block region Br including a predetermined number of pixel coordinates (pixel coordinates of image data corresponding to 65536 pixels in this example) in the captured image α.

As illustrated in FIG. 14, in this example, the correction value table t1 includes 54 address regions As respectively associated with 54 coordinate regions of the captured image α. The address region As is a storage region capable of holding a shading correction value. In the correction value table t1 of this example, addresses having sequential numbers from 0 to 53 are associated with the 54 address regions As. The address value "0" is an address value indicating the address region As corresponding to the block region Br at the upper-left end portion in the captured image α, and the address value "53" is an address value indicating the address region As corresponding to the block region Br at the lower end portion in the captured image α.

Each storage region of the correct on value table t1 corresponds to one block region Br in the captured image α, that is, pixel coordinates corresponding to 65536 pixels=256 (pixels)×256 (pixels). Therefore, one correction value corresponding to each of the pixel coordinates positioned in the 54 block regions Br of the captured image α is held in each storage region of the correction value table t1. That is, one shading correction value in the address region As corresponds to a plurality of (65536 pixels in this example) pixel coordinates in the block region Br, and the shading correction value and the pixel coordinates have a one-to-many relationship.

For example, as illustrated in FIG. 14, nine address regions As with the address values "0" to "8" in the correction value table T1 correspond to nine block regions Br positioned in the upper peripheral portion in the captured image α. More specifically, the storage region with the address value "0" corresponds to the block region Br including the origin α_o of the captured image α. Therefore, for example, the shading correction value held in the storage region with the address value "0" is used to amplify the luminance for each pixel in the block region Br including the origin α_o of the captured image α.

As described above, in the shading correction processing in the present embodiment, the luminance of the image data of the region of interest is amplified using the shading correction value acquired from the correction value table on the basis of the coordinate information of the region of interest in the captured image. Specifically, the shading correction value corresponding to the coordinates of each pixel of the image data of the region of interest is acquired from the correction value table, and the luminance is adjusted for each pixel of the image data of the region of interest.

Here, the shading correction processing for the pieces of image data of the regions of interest ROI0 to ROI2 will be described with reference to FIG. 15. For easy understanding, FIG. 15 illustrates 54 block regions Br in the captured image α and the address regions As of the correction value table t1 corresponding to the respective block regions Br together. Further, FIG. 15 illustrates association between the block region Br and the address region As, and the regions of interest ROI0 to ROI2.

In this example, in a case where the shading correction processing is performed on the image data of the region of interest ROI0, it is determined to which block region Br each pixel of the region of interest ROI0 belongs on the basis of the coordinate information of the region of interest ROI0 in the captured image α, that is, the relative coordinates of the region of interest ROI. In a case where a block region Br to which each pixel belongs is determined, the address value of the correction value table t1 corresponding to the block region Br is derived. Then, a shading correction value corresponding to the block region Br is acquired from the address region. As associated with the derived address value, and the luminance of the image data of the region of interest ROI0 is amplified for each pixel by using the acquired shading correction value. As a result, the shading correction processing for the image data of each pixel of the region of interest ROI0 is performed by using the shading correction value corresponding to the block region Br.

As illustrated in FIG. 15, the image data of the region of interest ROI0 is arranged over six block regions Br in the correction value table T1. The six block regions Br correspond to six address regions As corresponding to address values "1", "2", "10", "11", "19", and "20", respectively. Therefore, the shading correction values held in these six address regions As are used for the shading correction processing related to the image data of the region of interest ROI0.

In the shading correction processing for the image data of the region of interest ROI0, the relative coordinates (pixel coordinates) of each pixel of the image data of the region of interest ROI0 are generated. Then, the block region Br to which the generated pixel coordinates belong is determined, and then the address value of the correction value table t1 corresponding to the determined block region Br is derived. As described above, the block region Br in the captured image α is associated with the address value indicating the address region of the correction value table t1 on a one-to-one basis. Therefore, the address value of the correction value table t1 corresponding to each of the pixel coordinates of the mage data of the region of interest ROI0 can be derived by generating the pixel coordinates of the image data of the region of interest ROI0 and determining to which block region Br in the captured image α the pixel coordinates belong.

Furthermore, for example, the address value of the correction value table t1 corresponding to each of the pixel coordinates of the image data of the region of interest ROI0 may be acquired using a conversion table (not illustrated) for converting the coordinates in each coordinate region in the captured image α into an address value of each storage region of the correction value table T1.

For example, it is assumed that the pixel coordinates of the image data of the region of interest ROI0 generated in the shading correction processing are coordinates belonging to the block region Br corresponding to the address value "1" in the correction value table t1. In this case, the luminance of the image data corresponding to the pixel coordinates in the region of interest ROI0 is amplified by using the shading correction value held in the address region As with the address value "1" in the correction value table T1. Similarly, in a case where the pixel coordinates included in the block region Br corresponding to the address value "2" in the correction value table t1 are generated, the luminance of the image data corresponding to the pixel coordinates is amplified by using the shading correction value held in the address region As corresponding to the address value "2". In addition, also in a case where the generated pixel coordinates of the image data of the region of interest ROI0 are included in the block regions Br corresponding to the address values "10", "11", "19", and "20" of the correction value table T1, similarly, the luminance of the image data corresponding to each of the pixel coordinates is amplified by using the shading correction values held in the address regions As with the corresponding address values.

For the regions of interest ROI1 and ROI2 in the captured image α, similarly, the address value of the correction value table t1 is derived on the basis of the block region Br to which the pixel coordinates, which are the relative coordinates of each pixel of the image data, belong, and the luminance of the image data for each pixel corresponding to the pixel coordinates is amplified by using the shading correction value held in the address region As associated with the derived address value. That is, the image data of the region of interest ROI1 is arranged over block regions Br corresponding to six address values "14", "15", "23", "24", "32", and "33" in the address regions As of the correction value table t1. Therefore, for the image data of each pixel of the region of interest ROI1, the luminance is amplified by using the shading correction value held by the address region As associated with any one of the six address values. The address value corresponding to each of the pixel coordinates is derived on the basis of the block region Br to which the pixel coordinates belong. Further, for the image data of the region of interest ROI2, similarly, the luminance is amplified by using the shading correction value held in the address region As associated with any one of the six address values of four address values "39", "40" "48", and "49".

Note that, as described above, the peripheral portion of the captured image has a lower luminance than that of the central portion. Therefore, relatively large shading correction values are held in the address regions As with the addresses 0 to 8 in the correction value table t1 corresponding co the block regions Br in the upper peripheral portion of the captured image α, the address regions As with the address values 45 to 53 corresponding to the block regions Br in the lower peripheral portion, the address regions As with the address values 9, 18, 27, and 36 corresponding to the block regions Br in the left peripheral portion, and the address regions As with the address values 17, 26, 35, and 44 corresponding to the block regions Br in the right peripheral portion. Therefore, in a case of using a correction value corresponding to a coordinate region in the peripheral portion, the degree of amplification of the luminance of the image data of the region of interest is increased. As a result, for example, the luminance of the image data of the region of interest ROI (for example, the regions of interest ROI0 and ROI2) arranged in the peripheral portion of the captured image α can be amplified to a similar luminance as that of the image data in the central portion of the captured image α.

Further, relatively smaller shading correction values are held in the address regions As associated with the address values 21 to 23 and 30 to 32 of the correction value table t1 corresponding to the block regions Br in the central portion of the captured image α. Therefore, in a case of using a shading correction value corresponding to a block region Br in the central portion, the degree of amplification of the luminance of the image data of the region of interest is decreased. As a result, it is possible to suppress an increase in difference between the luminance of the image data in the central portion of the captured image α and the luminance of the image data in the peripheral portion, thereby making the luminance of the image data in the captured image α uniform. Note that the shading correction value held in the address region As corresponding to the block region Br in the central portion may be set to "0" or a value close to "0" so that the luminance is not substantially amplified.

Note that, for example, a shading correction value that is smaller than that of the address region As corresponding to the block region Br in the peripheral portion and is larger than that of the address region As corresponding to the block region Br in the central portion may be held in an address region As corresponding to a block region Br other than those in the peripheral portion and the central portion of the captured image α. As described above, the shading correction value corresponding to each block region Br of the captured image α is held in the correction value table t1.

Furthermore, each address region As of the correction value table t1 holding the shading correction value is associated with each block region Br of the captured image α on a one-to-one basis. Therefore, in the shading correction processing for the pieces of image data of the regions of interest ROI0 to ROI2, the coordinates (pixel coordinates) of each pixel of the image data of each region of interest are generated, and the block region Br to which the generated pixel coordinates belong is determined, whereby the address value of the correction value table t1 corresponding to the block region Br can be derived. Therefore, the shading correction value corresponding to the block region Br can be acquired. Therefore, the luminance amplification using the shading correction value corresponding to the block region Br in the captured image α can be performed for each pixel of the pieces of image data of the regions of interest ROI0 to ROI2. In this manner, in the present embodiment, the luminance of the image data of each of the regions of interest ROI0 to ROI2 can be appropriately adjusted by the shading correction processing.

4. First Embodiment of Present Disclosure

Figure 16:
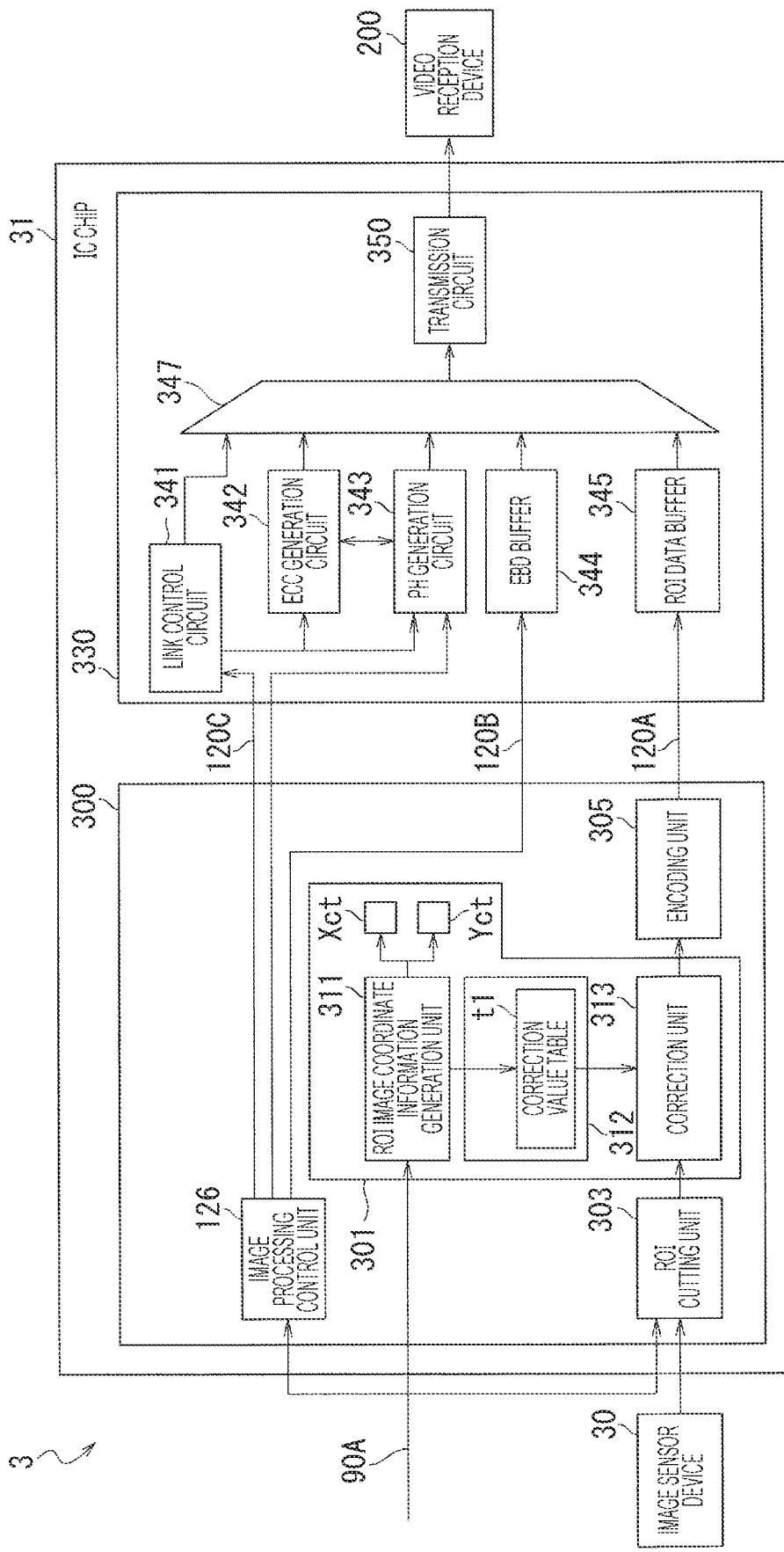
FIG. 16 is a block diagram illustrating a schematic configuration of a video transmission device, a video reception device, and a video transmission system according to a first embodiment.

Next, a transmission device, a reception device, and a transmission system according to a first embodiment of the present disclosure will be described with reference to FIGS. 13 to 15 and FIGS. 16 to 18. First, a schematic configuration of the transmission device, the reception device, and the transmission system according to the present embodiment will be described with reference to FIG. 16. FIG. 16 is a block diagram illustrating an example of a configuration of a video transmission system 10. The video transmission system 10 according to the present embodiment includes a video transmission device 3 and a video reception device 200. The video transmission system 10 is configured to perform transmission and reception of a signal between the video transmission device 3 and the video reception device 200 according to the MIPI CSI-3 standard or the MIPI DSI standard, for example, similarly to the video transmission system 1 according to Underlying Technologies 1 and 2 described above.

Since the video reception device 200 included in the video transmission system 10 is a component that implements the same operation and function as those of the video reception device 200 in Underlying Technologies 1 and 2 described above, the same reference signs are given and a description thereof is omitted.

The video transmission device 3 included in the video transmission system 10 is configured to implement a function equivalent to that of the video transmission device 100 according to Underlying Technologies 1 and 2 described above. That is, the video transmission device 3 is configured to be able to perform processing similar to that performed by the video transmission device 100 on a captured image input from an image sensor device 30 in a case where a control signal for instructing cutting of a region of interest is input from a predetermined external device (for example, the video reception device 200). The video transmission device 3 is different from the video transmission device 100 according to Underlying Technologies 1 and 2 described above in that the video transmission device 3 is configured to be able to perform the above-described shading correction processing.

Further, in a case where a control signal for instructing outputting of a normal image is input from the video reception device 200, the video transmission device 3 is configured to be able to perform processing similar to that performed by the video transmission device 100 on a captured image input from the image sensor device 30. Here, FIG. 16 mainly illustrates components related to the shading processing in the video transmission device 3. Therefore, components for performing processing related to a normal image are not illustrated in FIG. 16.

The video transmission device 3 according to the present embodiment performs each processing in the device in synchronization with a predetermined clock signal. Therefore, processings performed by the respective components can be in conjunction (for example, synchronization) with each other by performing the processings on the basis of the clock signal.

As illustrated in FIG. 16, the video transmission device 3 includes the image sensor device 30 that images an object, and a transmission processing unit 31 that performs predetermined processing for a captured image and image data transmission processing. The image sensor device 30 is a similar component to the imaging unit 110 of the video transmission device 100 according to Underlying Technologies 1 and 2 described above. The image sensor device 30 includes, for example, a charge coupled device (CCD) image sensor or a complementary metal oxide semiconductor (CMOS) image sensor, and converts an optical image signal obtained through an optical lens or the like into digital image data. The image sensor device 30 outputs a captured image (for example, the captured image α) obtained by imaging to the transmission processing unit 31 (specifically, an image processing circuit 300).

The transmission processing unit 31 includes the image processing circuit (an example of a processing unit in a transmission device) 300 and an image transmission unit 330. The image processing circuit 300 is component corresponding to the image processing unit 120 of the video transmission device 100 according to Underlying Technologies 1 and 2 described above, and is a circuit that performs predetermined processing on a captured image input from the imaging unit (image sensor device 30). In addition, the image transmission unit 330 is a component corresponding to the transmission unit 140 of the video transmission device 100 according to Underlying Technologies 1 and 2 described above, and is a circuit that generates and transmits transmission data 347A on the basis of various pieces of data (120A, 120B, 120C, and the like) input from the image processing circuit 300. In the present embodiment, the transmission processing unit 31 is configured as an IC chip.

Region-of-interest designation information 90A is input as information regarding setting of a region of interest to be cut together with a control signal for instructing cutting of the region of interest from an external device (for example, the video reception device 200) to the image processing circuit 300. The region-of-interest designation information 90A is, for example, information indicating a position and a size in the captured image. The region-of-interest designation information 90A is input to an image processing control unit 126, a correction circuit 301 (specifically, an ROI image coordinate information generation unit 311), and an ROI cutting unit 121 included in the image processing circuit 300.

Specifically, the region-of-interest designation information 90A includes, as the position information, information (coordinate information) on the relative coordinates of the region of interest in the captured image. The coordinates include at least coordinates (start point coordinates) of the upper-left end portion of the region of interest. Note that, in the present embodiment, the position information is not limited to the start point coordinates, and may include coordinates (end point coordinates) of the lower-right end portion of the region of interest. The position information in the present disclosure may be coordinates indicating any one of four corners in a case where the region of interest has a rectangular shape. Furthermore, the size information includes the size of the region of interest ROI in the X-axis direction and the size of the region of interest ROI in the Y-axis direction. In this example, the region-of-interest designation information 90A regarding the regions of interest ROI0 to ROI2 in the captured image α includes the position information and the size information of each of the three regions of interest ROI0 to ROI2.

The image processing circuit 300 includes the image processing control unit 126, the correction circuit 301, the ROI cutting unit 303, and an encoding unit 305. The image processing control unit 126 has an equivalent configuration to that of the image processing control unit 126 of the image processing unit 120 in Underlying Technologies 1 and 2 described above. In the present embodiment, the image processing control unit 126 generates ROI information 120B and frame information 120C on the basis of the region-of-interest designation information 90A, and transmits the ROI information 120B and the frame information 120C to the image transmission unit 330. Furthermore, the image processing control unit 126 outputs the input region-of-interest designation information 90A to the encoding unit 305 and the encoding unit 305.

The correction circuit 301 in the image processing circuit 300 of the video transmission device 3 according to the present embodiment performs the above-described shading correction processing. The correction circuit 301 performs the shading correction processing for image data of a region of interest on the basis of coordinate information of the region of interest (ROI) in a captured image. The correction circuit 301 generates the coordinates of each pixel of the image data of the region of interest in the captured image on the basis of the coordinates of the upper-left end portion of the region of interest, and amplifies the luminance for each pixel of the image data of the region of interest on the basis of the generated coordinates of each pixel. As a result, the shading correction is performed on the image data of the region of interest. The correction circuit 301 includes the ROI image coordinate information generation unit 311, a correction value table RAM 312, and a correction unit 313. The correction value table RAM 312 holds shading correction values used for the shading correction processing. The correction circuit 301 performs each processing related to the shading correction processing with these components. Details of each component of the correction circuit 301 will be described later.

The ROI cutting unit 303 is an equivalent component to the ROI cutting unit 121 of the image processing unit 120 in Underlying Technologies 1 and 2 described above. The ROI cutting unit 303 sets a region of interest ROI in a captured image input from the imaging unit (image sensor device 30). The ROI cutting unit 303 cuts a region of interest (ROI) from a captured image (for example, the captured image α) input from the imaging unit (image sensor device 30), for example, on the basis of the region-of-interest designation information 90A. In the present embodiment, the ROI cutting unit 303 outputs image data of a region of interest cut from a captured image to the correction circuit 301 (specifically, the correction unit 313). The ROI cutting unit 303 outputs image data of a region of interest to the correction circuit 301 in units of pixels, for example, in synchronization with the above-described clock signal.

The encoding unit 305 is an equivalent component to the encoding unit 125 of the image processing unit 120 in Underlying Technologies 1 and 2 described above. The encoding unit 305 encodes image data of a region of interest subjected to the shading correction processing in the correction circuit 301 to generate compressed image data 120A. The encoding unit 305 outputs the generated compressed image data 120A to the image transmission unit 330 (specifically, an ROI data buffer 345 to be described later).

(Details of Correction Circuit)

The ROI image coordinate information generation unit 311 generates relative coordinates (pixel coordinates) of each pixel of image data of a cut region of interest (ROI). In the present embodiment, the ROI image coordinate information generation unit 311 generates the pixel coordinates of the image data of the region of interest by using a counter. In the present embodiment, the image processing circuit 300 includes a counter unit used for various types of measurement processing. In the present embodiment, the correction circuit 301 includes a horizontal counter Xct and a vertical counter Yct as the counter units.

The horizontal counter (an example of a first counter) Xct is a counter that measures a position (horizontal position) of each pixel of the image data of the region of interest in the X-axis direction in the captured image. A counter value of the horizontal counter Xct corresponds to an X coordinate in a captured image (for example, the captured image α). In the video transmission device 3 according to the present embodiment, the horizontal counter Xct measures the X coordinates of the region of interest in the captured image, starting from the coordinates of the upper-left end portion of the region of interest (the pixel coordinates of the upper-left end portion).

Furthermore, the vertical counter (an example of a second counter) Yct is a counter that measures a position (vertical position) of each pixel of the image data of the region of interest in the Y-axis direction in the captured image. A value of the vertical counter Yct corresponds to a Y coordinate in a captured image, and indicates the position of a pixel row in the captured image. In the video transmission device 3 according to the present embodiment, the vertical counter Yct measures the Y coordinates of the region of interest in the captured image, starting from the coordinates of the upper-left end portion of the region of interest (the pixel coordinates of the upper-left end portion). For example, in a case where the values of both of the horizontal counter Xct and the vertical counter Yct are "0", the origin $α\_o$ (0,0) in the captured image is indicated.

Note that it is sufficient if the horizontal counter Xct and the vertical counter Yct are provided so as to be able to perform control (referring to the counter value, resetting the counter value, and the like) related to the counter value from the ROI image coordinate information generation unit 311. Therefore, the installation locations of the horizontal counter Xct and the vertical counter Yct are not limited to the inside of the correction circuit 301, and may be any location in the image processing circuit 300, for example. In addition, the horizontal counter Xct and the vertical counter Yct are configured to be able to reset the counter values to arbitrary values set by the ROI image coordinate information Generation unit 311.

Figure 17:
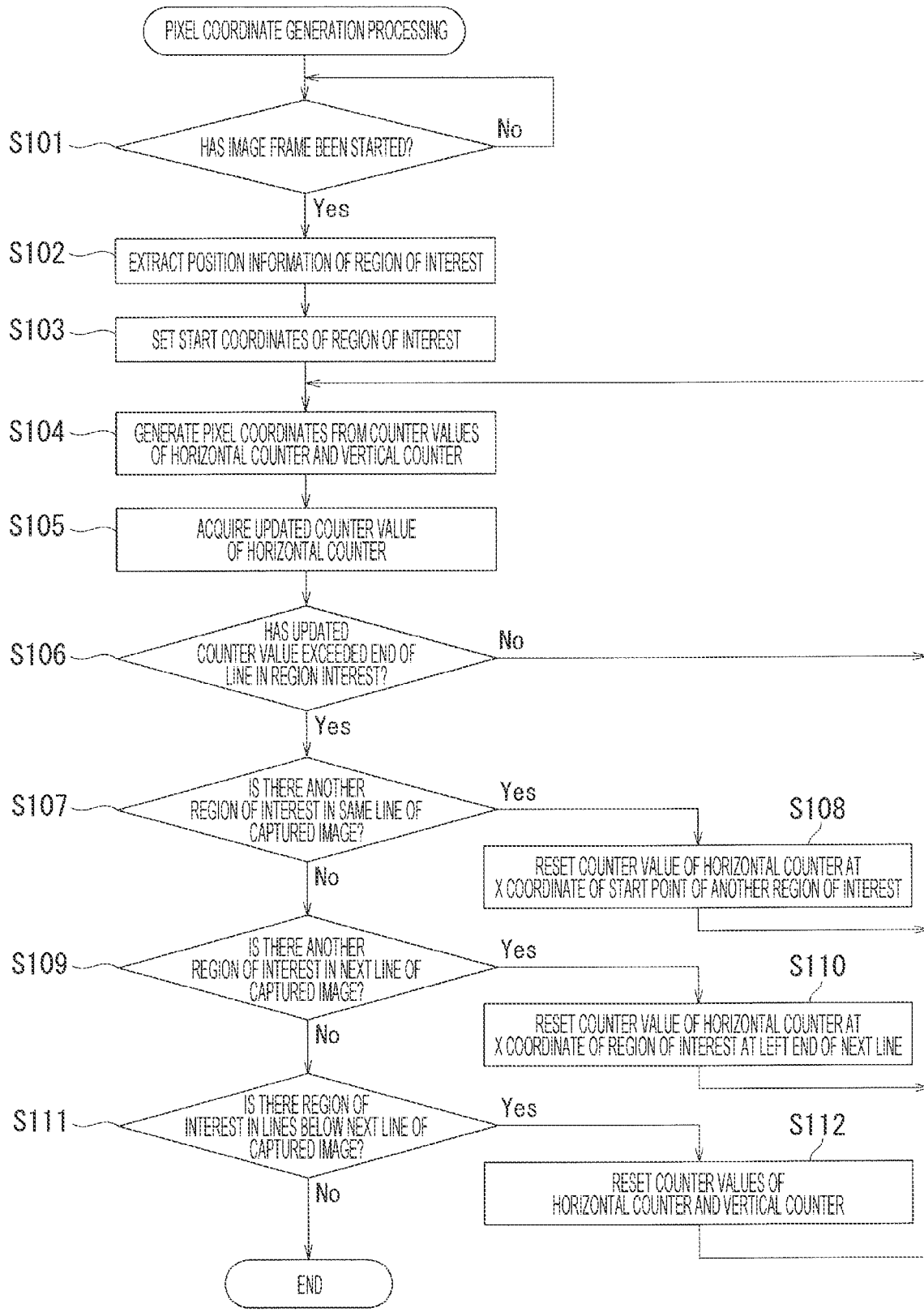
FIG. 17 as a flowchart illustrating an example of a flow of coordinate information generation processing of generating coordinate information of a region of interest used for the shading correction processing in the present disclosure.

The ROI image coordinate information generation unit 311 in the correction circuit 301 generates the coordinates of each pixel of the image data of the region of interest by using the horizontal counter Xct and the vertical counter Yct. Here, an example of a flow of pixel coordinate generation processing (pixel coordinate generation processing method) will be described with reference to FIG. 17. FIG. 17 is a flowchart illustrating an example of a flow of the pixel coordinate generation processing in the video transmission device 3 according to the present embodiment.

(Step S101)

In the correction circuit 301 included in the video transmission device 3, the ROI image coordinate information generation unit 311 determines whether or not an image data frame has been started. In the present embodiment, the start of the image data frame in the pixel coordinate generation processing indicates that the region-of-interest designation information 90A has been transmitted from the video reception device 200. In this example, the ROI image coordinate information generation unit 311 determines that the image data frame has been started in a case where the region-of-interest designation information 90A for a region of interest (the regions of interest ROI0 to ROI2 in this example) has been transmitted, and proceeds to Step S102. On the other hand, the ROI image coordinate information generation unit 311 determines that the image data frame has not been started in a case where the region-of-interest designation information 90A has not been transmitted, and repeats the processing of Step S101 at predetermined intervals until the region-of-interest designation information 90A is transmitted.

(Step S102)

The ROI image coordinate information generation unit 311 extracts the position information of the region of interest, and proceeds to Step S103. Specifically, the ROI image coordinate information generation unit 311 extracts the coordinate information of each region of interest in the captured image α as the position information of each of the regions of interest ROI0 to ROI2 from the region-of-interest designation information 90A. The coordinate information includes at least the start point coordinates (the pixel coordinates of the upper-left end portion) of the region of interest (the regions of interest ROI0 to ROI2 in this example).

(Step S103)

The ROI image coordinate information generation unit 311 sets, as reference coordinates in the pixel coordinate generation processing, the start point coordinates of a region of interest that is closest to the origin in the captured image, and proceeds to Step S104. Specifically, the ROI image coordinate information generation unit 311 resets the counter values of the horizontal counter Xct and the vertical counter Yct on the basis of the start point coordinates of the region of interest that is closest to the origin. The resetting indicates processing of setting the counter value to an arbitrary value.

Here, the determination of the reference coordinates will be described. Once pieces of coordinate information for a plurality of regions of interest are extracted from the region-of-interest designation information 90A in Step S103, the ROI image coordinate information generation unit 311 rearranges the respective pieces of extracted coordinate information in ascending order of the values of the Y coordinates of the start point coordinates (the pixel coordinates of the upper-left end portions of the regions of interest) to generate the Y-coordinate order data. The Y-coordinate order data includes end point Y coordinates (pixel coordinates of the lower-right end portions of the regions of interest) calculated from the Y coordinates of the start point coordinates and the number of pixels indicating the size in the Y-axis direction. The end point Y coordinate is calculated by "value of start point Y coordinate+size in Y-axis direction (−1)". The generated Y-coordinate order data may be held in a predetermined register, for example, during execution of a series of shading correction processing based on one piece of region-of-interest designation information 90A that is input.

The ROI image coordinate information generation unit 311 determines, as the reference coordinates, the start point coordinates of a region of interest whose value of the Y coordinate is smallest in the Y-coordinate order data. Once the reference coordinates are determined, the ROI image coordinate information generation unit 311 resets the counter value of the horizontal counter Xct to the value of the X coordinate of the reference coordinates, and resets the counter value of the vertical counter Yct to the value of the Y coordinate of the reference coordinates.

In this example, in the captured image α (see FIG. 13), a region of interest that is closest to the origin is the region of interest ROI0. Therefore, the coordinates (R0X,R0Y) of the start point Pr0 indicating the upper-left end portion of the region of interest ROI0 is determined as the reference coordinates. Therefore, in Step S103, the counter value of the horizontal counter Xct is reset to "R0X", and the counter value of the vertical counter Yct is reset to "R0Y". In this manner, the pixel coordinates of the image data of the region of interest are generated.

(Step S104)

The ROI image coordinate information generation unit 311 generates the pixel coordinates from the current counter value of the horizontal counter Xct and the current counter value of the vertical counter Yct, and proceeds to Step S105. As will be described in detail later, the address of the correction value table t1 is derived on the basis of the pixel coordinates generated here. As a result, the shading correction value is acquired from the address region As (see FIG. 14) associated with the address value.

(Step S105)

The ROI image coordinate information generation unit 311 acquires the counter value of the horizontal counter Xct updated (incremented by 1) in synchronization with the clock signal, and proceeds to Step S106.

(Step S106)

The ROI image coordinate information generation unit 311 determines whether or not the updated counter value of the horizontal counter Xct exceeds a value indicating the right end of the X coordinates of the region of interest, that is, the end of one pixel row (line) in the image data of the region of interest. In this example, an X coordinate of coordinates Mr0 indicating the right end of a predetermined pixel row of the region of interest ROI0 (see FIG. 13) has a value "R0X+(R0W−1)" obtained by incrementing (adding 1) the start point (R0X) of the X coordinates by the number of pixels of "length R0W in X-axis direction−1". In a case where it is determined that the counter value of the horizontal counter Xct exceeds the value corresponding to the end of the X coordinates of the region of interest (for example, the region of interest ROI0), the ROI image coordinate information generation unit 311 proceeds to Step S107. On the other hand, in a case where it is determined that the counter value of the horizontal counter Xct does not exceed the value corresponding to the end of the X coordinates of the region of interest (for example, the region of interest ROI0), the ROI image coordinate information generation unit 311 returns to Step S104. Note that, in a case where a plurality of regions of interest is arranged while overlapping each other in one line, the ROI image coordinate information generation unit 311 determines in Step S106 whether or not values indicating the ends of all the regions of interest arranged while overlapping each other are exceeded.

(Step S107)

The ROI image coordinate information generation unit 311 determines whether or not there is a region of interest other than the region of interest that is a target of the current pixel coordinates in the same line (pixel row) as that of the Y coordinate indicated by the current counter value of the vertical counter Yct in the captured image. The ROI image coordinate information generation unit 311 determines whether or not there is another region of interest in the same line (pixel row) as that of the Y coordinate indicated by the current counter value of the vertical counter Yct in the captured image. For example, the ROI image coordinate information generation unit 311 determines whether or not there is another region of interest including the current counter value of the vertical counter Yct by referring to the Y-coordinate order data. In a case where it is determined that there is another region of interest in the same line for which it is determined whether or not there is another region of interest, the ROI image coordinate information generation unit 311 proceeds to Step S108.

Here, in a case where there are two or more other regions of interest in the same line as that of the Y coordinate indicated by the counter value of the vertical counter Yct, the ROI image coordinate information generation unit 311 determines a region of interest whose value of the start point of the X coordinate is smaller as a region of interest to be the next pixel coordinate generation target (next target ROI). On the other hand, in a case where it is determined that there is no next target ROI region in the same line as that of the Y coordinate indicated by the counter value of the vertical counter Yct, the ROI image coordinate information generation unit 311 proceeds to Step S109.

The next target ROI is determined using the X-coordinate order data obtained by rearranging the respective pieces of coordinate information extracted from the region-of-interest designation information 90A in ascending order of the values of the X-coordinates of the start point coordinates (the pixel coordinates of the upper-left end portions of the regions of interest). For example, it is sufficient if the ROI image coordinate information generation unit 311 generates the X-coordinate order data together with the Y-coordinate order data in Step S103. The X-coordinate order data includes end point X coordinates (pixel coordinates of the right end portions of the respective pixel rows of the regions of interest) calculated from the X coordinates of the start point coordinates and the number of pixels indicating the size in the X-axis direction. Moreover, the X-coordinate order data may include the Y coordinates of the start point coordinates and the end point Y coordinates included in the Y-coordinate order data. The end point X coordinate is calculated by "value of start point X coordinate+size in X-axis direction (−1)". Similarly to the Y-coordinate order data, the generated X-coordinate order data may be held in a predetermined register, for example, during execution of a series of shading correction processing based on one piece of region-of-interest designation information 90A that is input. The ROI image coordinate information generation unit 311 determines the next target ROI in ascending order of the start point X coordinates among the regions of interest ROI in the same line by referring to the X-coordinate order data.

In this example, for example, in a case where the counter value of the horizontal counter Xcnt exceeds the value of the coordinates Mr0 indicating the right end of the predetermined pixel row of the region of interest ROI0, the ROI image coordinate information generation unit 311 determines whether or not there is another region of interest in the same line as that of the Y coordinate of the coordinates Mr0 in Step S107. As illustrated in FIG. 13, there is the region of interest ROI1 in the same line as that of the coordinates Mr0. Therefore, the ROI image coordinate information generation unit 311 determines that there is another region of interest (the region of interest ROI1 in this example) and proceeds to Step S108. On the other hand, for example, in a case where the generation of the pixel coordinates up to the end of the top pixel row of the region of interest ROI0 has ended, the ROI image coordinate information generation unit 311 determines that there is no other region of interest in the same line as that of the Y coordinate of the coordinates of the end (right end) of the top pixel row of the region of interest ROI0, and proceeds to Step S109.

(Step S108)

The ROI image coordinate information generation unit 311 resets the counter value of the horizontal counter Xct to the X coordinate of the start point (left end portion) of another region of interest, and returns to Step S104. Specifically, the ROI image coordinate information generation unit 311 resets the counter value of the horizontal counter Xct to the value of the X coordinate of the start point coordinates of the region of interest (next target ROI) that is the next pixel coordinate generation target. As a result, the generation of the pixel coordinates is started from the head pixel of the pixel row of the region of interest that is the next pixel coordinate generation target. For example, in a case where the region of interest that is the next pixel-coordinate generation target is the region of interest ROI1, the counter value of the horizontal counter Xct is reset to the value "R1X" of the X coordinate of the coordinates (R0X, R0Y) of the start point Pr0.

As described above, in the pixel coordinate generation processing, the ROI image coordinate information generation unit 311 updates the counter value of the horizontal counter Xct to a discontinuous value. That is, the horizontal counter Xct is a counter that can perform update to a discontinuous value.

(Step S109)

The ROI image coordinate information generation unit 311 determines whether or not there is image data of a region of interest in the next line (pixel row) in the captured image. Specifically, the ROI image coordinate information generation unit 311 updates the counter value of the vertical counter Yct to a value obtained by adding 1, and determines whether or not there is image data of a region of interest at the Y coordinate in the captured image indicated by the updated value. In a case where it is determined that there is image data of a region of interest at the Y coordinate indicated by the updated counter value of the vertical counter Yct by referring to the Y-coordinate order data, the ROI image coordinate information generation unit 311 proceeds to Step S110. On the other hand, in a case where it is determined that there is no image data of a region of interest at the Y coordinate indicated by the updated counter value of the vertical counter Yct, the ROI image coordinate information generation unit 311 proceeds to Step S111.

(Step S110)

The ROI image coordinate information generation unit 311 resets the counter value of the horizontal counter Xcnt to the value of the start point X coordinate of the leftmost region of interest in the next line (pixel row) by referring to the X-coordinate order data, and proceeds to Step S104. Specifically, the ROI image coordinate information generation unit 311 acquires a start point X coordinate at which the counter value of the vertical counter Yct updated in Step S109 is the smallest in the region of interest at the Y coordinate by referring to the X-coordinate order data, and resets the counter value of the horizontal counter Xcnt to the start point X coordinate. As a result, the generation of the pixel coordinates is started from the leftmost region of interest in the next line in the captured image.

(Step S111)

The ROI image coordinate information generation unit 311 determines whether or not there is a region of interest (next target ROI that is the next pixel coordinate generation target) below the next line (pixel row) in the captured image. Specifically, the ROI image coordinate information generation unit 311 determines whether or not there is a next target ROI below the Y coordinate indicated by the counter value of the vertical counter Yct updated in Step S109 by referring to the Y-coordinate order data. In a case where it is determined that there is a next target ROI below the next line, the ROI image coordinate information generation unit 311 proceeds to Step S112. On the other hand, in a case where it is determined that there is no next target ROI below the next line, the ROI image coordinate information generation unit 311 determines that the pixel coordinates of the pieces of image data of all the regions of interest in the captured image have been generated, and ends the pixel coordinate generation processing.

(Step S112)

The ROI image coordinate information generation unit 311 resets the counter value of the vertical counter Yct and the counter value of the horizontal counter Xct, and returns to Step S104. Specifically, the ROI image coordinate information generation unit 311 resets the counter value of the vertical counter Yct to the value of the Y coordinate of the start point coordinates of the next target ROI by referring to the Y-coordinate order data. In addition, the ROI image coordinate information generation unit 311 resets the counter value of the horizontal counter Xcnt to the value of the X coordinate of the start point coordinates of the next target ROI by referring to the X-coordinate order data. As a result, it is possible to generate the pixel coordinates for all pieces of image data of a plurality of regions of interest arranged at intervals in the Y-axis direction in the captured image.

In this example, it is assumed that the pixel coordinates are generated up to the end point coordinates (the coordinates of the pixel at the lower-right end portion) of the region of interest ROI1, and the region of interest that is the next pixel coordinate generation target is the region of interest ROI2. In this case, the ROI image coordinate information generation unit 311 resets the counter value of the horizontal counter Xcnt to the value "R2X" of the X coordinate of the coordinates (R2X, R2Y) of the start point Pr2 of the region of interest ROI2, and resets the vertical counter Yct to the value "R2Y" of the Y coordinate. As a result, the generation can be started from the pixel coordinates of the pixel at the start point (upper-left end portion) of the region of interest ROI2 after the region of interest ROI1.

In Step S112 of the pixel coordinate generation processing, the ROI image coordinate information generation unit 311 updates the counter value of the vertical counter Yct to a discontinuous value. That is, the vertical counter Ycnt is a counter that can perform update to a discontinuous value. In the present embodiment, the ROI image coordinate information generation unit 311 can generate the coordinates of each pixel of pieces of image data of a plurality of regions of interest (ROI) included in a captured image (the captured image α in this example) by using the horizontal counter Xcnt and the vertical counter Ycnt.

The pixel coordinate generation processing has been described above with reference to FIG. 17. As described above, the ROI image coordinate information generation unit 311 included in the correction circuit 301 generates the pixel coordinates by using at least the coordinates (start point coordinates) of the upper-left end portion of the region of interest as the coordinate information. More specifically, the ROI image coordinate information generation unit 311 generates the Y-coordinate order data and the X-coordinate order data by using the start point coordinates of the region of interest and the size information, and generates the pixel coordinates of the image data of the region of interest.

The ROI image coordinate information generation unit 311 derives an address value of the correction value table t1 on the basis of the generated pixel coordinates every time the pixel coordinates are generated. Specifically, the ROI image coordinate information generation unit 311 specifies a block region Br (see FIG. 15) in the captured image to which the generated pixel coordinates belong. Once the address value associated with the specified block region Br is derived, the ROI image coordinate information generation unit 311 acquires a shading correction held in an address region associated with the derived address value and outputs the shading correction to the correction unit 313.

The correction unit 313 included in the correction circuit 301 amplifies the luminance of the image data of the region of interest (ROI) by using the shading correction value acquired from the correction value table t1 on the basis of the coordinate information by the ROI image coordinate information generation unit 311. Specifically, in the correction circuit 301, the ROI image coordinate information generation unit 311 acquires the shading correction value corresponding to the coordinates (pixel coordinates) of each pixel of the image data of the region of interest from the correction value table t1, and the correction unit 313 performs sensitivity adjustment for each pixel of the image data of the region of interest by using the acquired shading correction value.

The correction unit 313 multiplies the image data of each pixel of the region of interest input from the ROI cutting unit 303 by the shading correction value input from the ROI image coordinate information generation unit 311 to amplify the luminance. As a result, the luminance of image data of each pixel of a region of interest of the correction circuit including the correction unit 313 can be amplified on the basis of the shading correction value corresponding to the region in the captured image. Therefore, the video transmission device 3 including the correction circuit 301 can amplify the luminance of the image data of the region of interest at a degree corresponding to the region in the captured image by the shading correction processing to make the luminance uniform.

The correction circuit 301 outputs, to the encoding unit 305, corrected image data 313A, which is image data of the region of interest subjected to the shading correction processing. As described above, the encoding unit 305 outputs the corrected image data 303A to the image transmission unit 330. The encoding unit 305 collects, in units of pixel rows, the image data of the region of interest input in units of pixels, and generates a transmission image for one line (one pixel row). For example, the encoding unit 305 collects the image data in units of pixels of the region of interest ROI0 corresponding to the number of pixels corresponding to the length R0W in the X-axis direction, and generates a transmission image of one pixel row of the region of interest ROI0. The encoding unit 305 generates a transmission image for each region of interest in units of pixel rows (lines) on the basis of the region-of-interest designation information 90A input from the image processing control unit 126. The encoding unit 305 outputs, to the image transmission unit 330, the compressed image data 120A obtained by compressing the transmission image in a compression format or the like conforming to the JPEG standard.

(Image Transmission Unit)

The image transmission unit 330 includes a LINK control circuit 341, an ECC generation circuit 342, a PH generation circuit 343, an EBD buffer 344, an ROI data buffer 345, a combining circuit 347, and a transmission circuit 350. In addition, the image transmission unit 330 includes a normal image data buffer (not illustrated).

The LINK control circuit 341 is an equivalent component to that of the LINK control unit 141 of the video transmission device 100 according to the underlying technologies described above. The LINK control circuit 341 outputs the frame information 120C input from the image processing control unit 126, for example, to the ECC generation circuit 342 and the PH generation circuit 343 for each line. The ECC generation circuit 342 is an equivalent component to the ECC generation unit 142 of the video transmission device 100 according to the underlying technologies described above. The ECC generation circuit 342 generates an error correction code of one line on the basis of data (for example, a virtual channel number, the data type of each of the regions of interest ROI1 to ROI2, the payload length of each line, and the like) of the line in the frame information, for example. The ECC generation circuit 342 outputs the generated error correction code to the PH generation circuit 343, for example. Note that the ECC generation circuit 342 may output the error correction code to the combining circuit 347.

The PH generation circuit 343 is an equivalent component to the PH generation unit 143 of the video transmission device 100 according to the underlying technologies described above. The PH generation circuit 343 generates a packet header PH (see FIG. 4) for each line by using, for example, the frame information, the region-of-interest designation information 90A, and the error correction code generated by the ECC generation circuit 342. In addition, the PH generation circuit 343 may output the region-of-interest designation information 90A input from the image processing control unit 126 to the ECC generation circuit 342. The PH generation circuit 343 outputs the generated packet header PH to the combining unit 147.

The EBD buffer 344 is an equivalent component to the EBD buffer 144 of the video transmission device 100 according to the underlying technologies described above. The EBD buffer 344 primarily stores the ROI information generated by the image processing control unit 126, and outputs the ROI information to the combining circuit 347 as embedded data at a predetermined timing.

The ROI data buffer 345 is an equivalent component to the ROI data buffer 145 of the video transmission device 100 according to the underlying technologies described above. The ROI data buffer 345 primarily stores the compressed image data 120A input from the encoding unit 305, and outputs the compressed image data 120A to the combining circuit 347 as payload data of a long packet at a predetermined timing.

The combining circuit 347 is an equivalent component to the combining unit 147 of the video transmission device 100 according to the underlying technologies described above. In a case where a control signal for instructing cutting of an ROI is input from the video reception device 200 via the camera control interface CCI, the combining circuit 347 generates the transmission data 347A on the basis of various pieces of input data (the packet header PH, the ROI information 120B, and the compressed image data 120A). The combining unit 147 outputs the generated transmission data 147A to the transmission circuit 350.

The transmission circuit 350 of the image transmission unit 330 included in the transmission processing unit (an example of a transmission unit) 31 outputs the transmission data 147A to the video reception device 200 through the data lane DL. Specifically, the transmission circuit 350 transmits image data of a region of interest (ROI) subjected to the shading correction processing as payload data. As a result, the image data of the region of interest subjected to the shading correction processing is transmitted as payload data to the video reception device 200 together with embedded data.

(Shading Correction Processing Method in Transmission Device)

Figure 18:
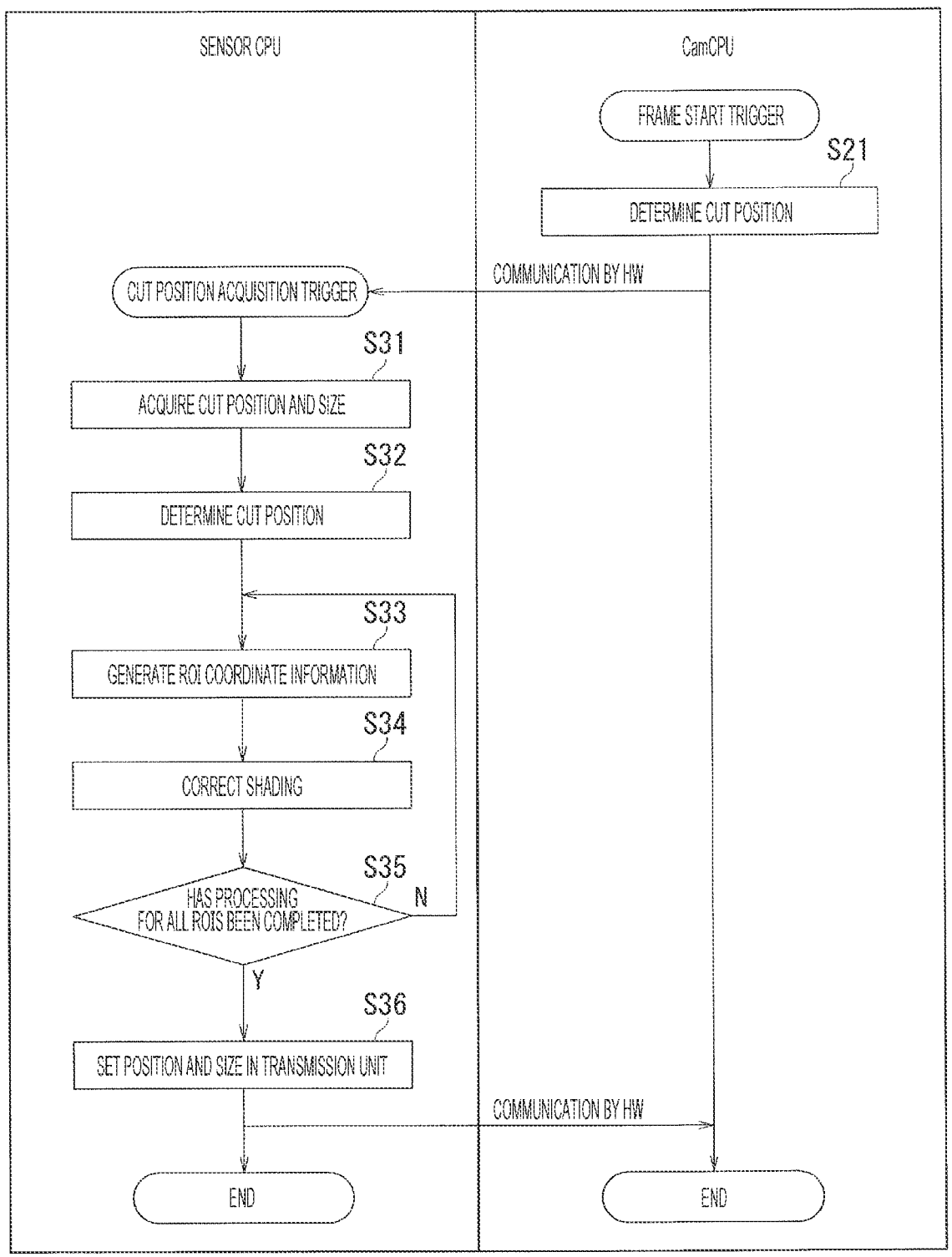
FIG. 18 is a flowchart illustrating an example of a flow of shading correction processing in the video transmission device, the video reception device, and the video transmission system according to the first embodiment.
Figure 19:
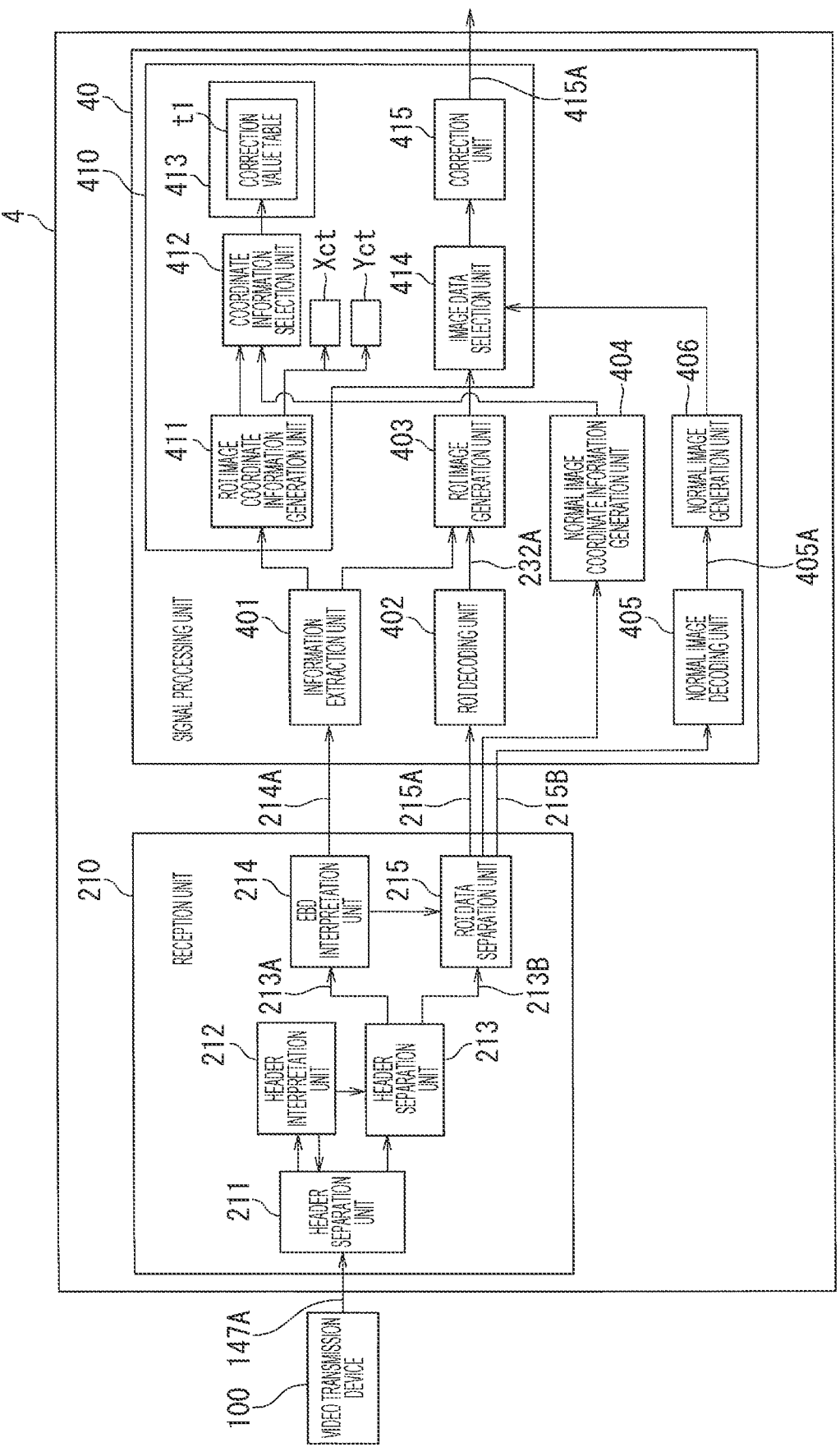
FIG. 19 is a block diagram illustrating a schematic configuration of a video transmission device, a video reception device, and a video transmission system according to a second embodiment.

Next, a shading correction processing method in the transmission device, the reception device, and the transmission system according to the present embodiment will be described with reference to FIG. 18 while referring to FIGS. 13 to 17. FIG. 18 is a flowchart illustrating an example of a flow of the shading correction processing method in the transmission device, the reception device, and the transmission system capable of performing the shading correction according to the present embodiment.

Once the video transmission system 10 is activated and a frame start trigger is input, an information processing unit 220 (a CamCPU in the drawing) included in the video reception device 200 proceeds to Step S21.

(Step S21)

Once the video transmission system 10 is activated and a frame start trigger is input, the information processing unit 220 (the CamCPU in the drawing) included in the video reception device 200 determines a cut position at which an image (a region of interest) is cut from a captured image of the image sensor device 30 of the video transmission device 3, and ends cut position determination processing. Specifically, once the cut position is determined, the CamCPU sends a control signal for instructing cutting and the region-of-interest designation information 90A. The region-of-interest designation information 90A includes the position information (coordinate information) and the size information (the sizes in the X-axis direction and the Y-axis direction) of the region of interest. The control signal and the region-of-interest designation information 90A are transmitted from the video reception device 200 to the video transmission device 3 by communication using hardware (HW) using the MIPI.

(Step S31)

Once a cut position designation trigger is detected, the image processing circuit 300 (a sensor CPU in the drawing) included in the transmission processing unit 31 of the video transmission device 3 acquires the cut position and the size in the captured image of the image sensor device 30, and proceeds to Step S32. Specifically, the image processing circuit 300 acquires the position information (the coordinate information of the region of interest) and the size information (the sizes in the X-axis direction and the Y-axis direction) from the region-of-interest designation information 90A in the image processing control unit 126, the ROI image coordinate information generation unit 311 in the correction circuit 301, and the ROI cutting unit 121.

(Step S32)

The image processing circuit 300 determines, by the ROI cutting unit 121, the cut position at which the region of interest in the captured image is cut on the basis of the region-of-interest designation information 90A, and proceeds to Step S33. Once the cut position is determined, the ROI cutting unit 121 cuts the image data of the region of interest from the captured image, and outputs the image data to the correction unit 313 in the correction circuit 301 in units of pixels.

(Step S33)

The image processing circuit 300 generates, by the ROI image coordinate information generation unit 311 of the correction circuit 301, the pixel coordinates of the image data of the region of interest, and proceeds to Step S34. Specifically, the ROI image coordinate information generation unit 311 performs the pixel coordinate generation processing illustrated in FIG. 17. The ROI image coordinate information generation unit 311 specifies a block region Br (see FIG. 15) in the captured image to which the image data of each pixel of the region of interest belongs on the basis of the generated pixel coordinates. Once the block region Br is specified, the ROI image coordinate information generation unit 311 derives an address value of the correction value table t1 corresponding to the block region Br. The ROI image coordinate information generation unit 311 acquires a shading correction value from an address region As of the correction value table t1 associated with the address value, and outputs the shading correction value to the correction unit 313 of the correction circuit 301.

(Step S34)

The image processing circuit 300 performs, by the correction unit 313 of the correction circuit 301, the shading correction on the image data of the region of interest, and proceeds to Step S35. Specifically, the correction unit 313 amplifies the luminance of the image data of the region of interest in units of pixels input from the ROI cutting unit 121 by using the shading correction value input from the ROI image coordinate information generation unit 311. The correction unit 313 outputs the corrected image data 313A, which is image data of the region of interest subjected to the shading correction processing, to the encoding unit 305 in units of pixels.

(Step S35)

The image processing circuit 300 determines, by the correction unit 313 of the correction circuit 301, whether or not the shading correction has been completed for the pieces of image data of all the regions of interest in the captured image. Specifically, the image processing circuit 300 determines whether or not the shading correction for all the regions of interest has been completed according to whether or not the generation of the pixel coordinates of all the regions of interest has ended in the ROI image coordinate information generation unit 311. In a case where the pixel coordinates of the pieces of image data of all the regions of interest in the captured image have been generated (NO in Step S111), the image processing circuit 300 determines that the shading correction has been completed for the pieces of image data of all the regions of interest in the captured image, and proceeds to Step S36. On the other hand, in a case where the pixel coordinates of the pieces of image data of all the regions of interest in the captured image have not been generated (YES in Step S111), the image processing circuit 300 determines that the shading correction has not been completed for the pieces of image data of all the regions of interest in the captured image, and returns to Step S33.

(Step S36)

The image processing circuit 300 generates, by the image processing control unit 126, the ROI information in which the position information (coordinate information) and the size information (the sizes in the X-axis direction and the Y-axis direction) of the region of interest are set, and outputs the ROI information to the image transmission unit 330 (specifically, the EBD buffer 344). In addition, the image processing circuit 300 outputs, by the encoding unit 305, the compressed image data 120A obtained by compressing the corrected image data 313A to the image transmission unit 330 (specifically, the ROI data buffer 345). As a result, the combining circuit 347 of the image transmission unit 330 generates, as the transmission data 347A, the embedded data including the ROI information and the payload data including the image data of the region of interest subjected to the shading correction processing. The generated transmission data 347A is transmitted to the video reception device 200 through the transmission circuit 350 by communication using hardware (HW) using the MIPI.

As described above, once the shading correction processing of the video transmission device 3 according to the present embodiment is performed, the image data of the region of interest subjected to the shading correction is transmitted to the video reception device 200. As a result, the video reception device 200 can perform various types of processing on the image data of the region of interest subjected to the shading correction.

The video transmission system 10 that performs the shading correction processing in the video transmission device 3 according to the present embodiment has been described above. In the present embodiment, the video transmission device 3 included in the transmission system 10 includes: the image processing circuit 300 that performs the shading correction processing on image data of a region of interest (ROI) on the basis of coordinate information of the region of interest in a captured image; and the image transmission unit 330 that transmits, as payload data, the image data of the region of interest subjected to the shading correction processing. Therefore, the video transmission device 3 in the transmission system 10 can perform the shading correct iron processing on the image data of the region of interest.

The image processing circuit 300 of the video transmission device 3 according to the present embodiment is configured as hardware capable of performing the shading correction processing. In addition, the image transmission unit 330 of the video transmission device 3 according to the present embodiment is configured as hardware capable of transmitting image data of a region of interest ROI. As a result, the video transmission device 3 can speed up the shading correction processing and the transmission processing for image data of a region of interest, and increase the number of image data frames processed per unit time in the transmission system 10. That is, it is possible to implement the processing performed at a high frame rate.

5. Second Embodiment of Present Disclosure

Next, a transmission device, a reception device, and a transmission system according to a second embodiment of the present disclosure will be described with reference to FIGS. 13 to 15 and FIGS. 19 and 20. First, a schematic configuration of the transmission device, the reception device, and the transmission system according to the present embodiment will be described with reference to FIG. 19. FIG. 16 is a block diagram illustrating an example of a configuration of a video transmission system 20. The video transmission system 20 according to the present embodiment includes a video transmission device 100 and a video reception device 4. The video transmission system 20 is configured to perform transmission and reception of a signal between the video transmission device 100 and the video reception device 4 according to the MIPI CSI-3 standard or the MIPI DSI standard, for example, similarly to the video transmission system 1 according to Underlying Technologies 1 and 2 described above.

Since the video transmission device 100 included in the video transmission system 20 is a component that implements the same operation and function as those of the video transmission device 100 in Underlying Technologies 1 and 2 described above, the same reference signs are given and a description thereof is omitted.

The video reception device 4 included in the video transmission system 20 is configured to implement a function equivalent to that of the video reception device 200 according to Underlying Technologies 1 and 2 described above. That is, the video reception device 4 is configured to be able to perform processing similar to that of the video reception device 200 according to Underlying Technologies 1 and 2 described above on transmission data transmitted from the video transmission device 100. Moreover, the video reception device 4 is configured to be able to perform shading correction processing by using ROI information transmitted from the video transmission device 100. Therefore, FIG. 19 mainly illustrates components related to the shading correction processing in the video reception device 4.

The video reception device 4 according to the present embodiment includes a reception unit 210 and a signal processing unit (an example of a processing unit in a reception device) 40. The reception unit 210 in the video reception device 4 receives a transmission signal (transmission data 147A in this example) in which image data of a region of interest (ROIs) cut from a predetermined captured image is included in the payload data, and ROI information corresponding to a predetermined number of regions of interest is included in the embedded data. Similarly to the video transmission device 100 in Underlying Technologies 1 and 2, the video transmission device 100 (see FIG. 18) included in the transmission system 20 according to the present embodiment sends image data of each region of interest (ROI) in a captured image 111 as payload data of a long packet, and sends ROI information 120B regarding the region of interest as embedded data. As a result, the device (the video reception device 4 in this example) that has received the transmission data 147A transmitted from the video transmission device 100 can easily extract the image data (ROI image 112) of each region of interest ROI from the transmission data 147A.

The reception unit 210 is a circuit that generates various pieces of data (214A, 215A, and 215B) by performing predetermined processing on the received transmission data 147A and outputs the various pieces of data to the signal processing unit 40. In the present embodiment, once a packet (SOF) indicating that communication of an image data frame with the video transmission device 100 is started is received, the reception unit 210 outputs a predetermined signal indicating the reception of the SOF to the signal processing unit 40.

Similarly to the video reception device 200 in Underlying Technologies 1 and 2 described above, also in the video reception device 4, the reception unit 210 includes, for example, a header separation unit 211, a header interpretation unit 212, a payload separation unit 213, an EBD interpretation unit 214, and an ROI data separation unit 215. Among these, the header separation unit 211 and the header interpretation unit 212 have similar configurations to those of the video reception device 200, and a description thereof is thus omitted.

The EBD interpretation unit 214 determines whether the image data included in the payload data of the transmission data 147A is image data of an ROI (the compressed image data 120A of the image data 116 of the region of interest in Underlying Technologies 1 and 2) or data of a normal image (the compressed image data 130A), on the basis of the data type included in embedded data 213A input from the payload separation unit 213. Further, the EBD interpretation unit 214 outputs the data type determination result to the ROI data separation unit 215. Furthermore, the EBD interpretation unit 214 outputs the embedded data including ROI information (indicating that the image data of the region of interest is included in the payload data) to the signal processing unit 40 (specifically, an information extraction unit 401) as EBD data 214A.

In a case where it is determined that the image data included in the payload data of the transmission data 147A is image data of a region of interest (the compressed image data 120A of the image data 116) on the basis of the data type determination result from the EBD interpretation unit 214, the ROI data separation unit 215 outputs each line of the payload data as payload data 215A to the signal processing unit 40 (specifically, an ROI decoding unit 402) for each line. The payload data 215A includes ROI pixel row data that is pixel data for one line of compressed image data 147B. Here, the ROI pixel row data indicates image data of a region of interest in units of Y-axis coordinates (in units of pixel rows) in a captured image (for example, a captured image α).

In the present embodiment, for example, each line of the payload data is transmitted to the video reception device 4 in units of transactions constituting an image data frame related to the transmission data 147A sent from the video transmission device 100. Once a header of each line of the payload data of the long packet is detected in the header interpretation unit 212 of the reception unit 210, each line of the payload data is separated from a packet region R2 in the payload separation unit 213, and the payload data 215A including a payload header PH, ROI pixel row data, and a payload footer PF of each line is generated in the ROI data separation unit 215.

On the other hand, in a case where the image data included in the payload data is the compressed image data 130A which is data of a normal image, the ROI data separation unit 215 outputs the payload data to the first information processing unit 230a (specifically, a normal image decoding unit 236) as payload data 215B. In addition, the ROI data separation unit 215 outputs the data type determination result (the determination result indicating that the image data is data of a normal image) input from the EBD interpretation unit 214 to the signal processing unit 40 (specifically, a normal image coordinate information generation unit 404).

The signal processing unit 40 is configured to implement a function equivalent to that of the information processing unit 220 of the video reception device 200 according to Underlying Technologies 1 and 2 described above. That is, the signal processing unit 40 is a circuit that generates ROI image 223A on the basis of the various pieces of data (214A and 215A) received from the reception unit 210 and generates a normal image 224A on the basis of the data (215B) received from the reception unit 210.

The signal processing unit 40 is a circuit that performs the shading correction processing on image data of a region of interest on the basis of coordinate information of the region of interest extracted from ROI information corresponding to the region of interest (ROI) extracted from embedded data. Furthermore, the signal processing unit 40 also performs the shading correction processing on data of a normal image (payload data 215B).

The signal processing unit 40 includes an information extraction unit 401, an ROI decoding unit 402, an ROI image generation unit 403, and a correction processing unit 410 as components related to the shading correction processing for image data of a region of interest. First, these components for performing the shading correction processing on image data of a region of interest will be described.

The information extraction unit 401 included in the signal processing unit 40 extracts the ROI information 120B from the embedded data included in the EBB data 214A. The ROI information 120B includes information (coordinate information) of relative coordinates of a region of interest in a captured image as position information. Furthermore, the ROI information 120B includes the sizes of a region of interest ROI in the X-axis direction and the Y-axis direction as size information.

Specifically, the information extraction unit 401 extracts at least the coordinates of the upper-left end portion of the region of interest ROI as the coordinate information of the region of interest from the position information of the ROI information 120B. In this example, the ROI information 120B regarding the regions of interest ROI0 to ROI2 in the captured image α includes the position information (coordinate information) and the size information of each of the three regions of interest ROI0 to ROI2. Therefore, the information extraction unit 401 extracts the start point coordinates of each of three regions of interest ROI0 to ROI2 in the captured image α as the coordinate information, and extracts the lengths of each of the regions of interest ROI0 to ROI2 in the X-axis direction and the Y-axis direction as the size information.

Note that the position information of the ROI information 120B is not limited to the coordinates (start point coordinates) of the upper-left end portion of the region of interest ROI, and may include coordinates (end point coordinates) of the lower-right end portion of the region of interest. The position information in the present disclosure may be coordinates indicating any one of four corners in a case where the region of interest has a rectangular shape.

The information extraction unit 401 generates the Y-coordinate order data and the X-coordinate order data in the first embodiment from the extracted ROI information (the coordinate information and the size information), and outputs the Y-coordinate order data and the X-coordinate order data to the correction processing unit 410 (specifically, an ROI image coordinate information generation unit 411) and the ROI image generation unit 403. Once pieces of coordinate information for a plurality of regions of interest are extracted from the ROI information 120B, the information extraction unit 401 rearranges the pieces of extracted coordinate information of the respective regions of interest in ascending order of the values of the Y coordinates of the start point coordinates (the pixel coordinates of the upper-left end portions of the regions of interest) to generate the Y-coordinate order data. The Y-coordinate order data includes end point Y coordinates (pixel coordinates of the lower-right end portions of the regions of interest) calculated from the Y coordinates of the start point coordinates and the number of pixels indicating the size in the Y-axis direction.

Furthermore, the X-coordinate order data includes end point X coordinates (pixel coordinates of the right end portions of the respective pixel rows of the regions of interest) calculated from the X coordinates of the start point coordinates and the number of pixels indicating the size in the X-axis direction. Moreover, the X-coordinate order data may include the Y coordinates of the start point coordinates and the end point Y coordinates included in the Y-coordinate order data.

The ROI decoding unit 402 decodes the ROI pixel row data (compressed image data 147B) in the payload data 215A input from the ROI data separation unit 215 to generate the ROI decoded image data 232A. The ROI decoding unit 402 outputs the generated ROI decoded image data 232A to the ROI image generation unit 403.

The ROI image generation unit 403 outputs image data of a region of interest to the correction processing unit 410 (specifically, an image data selection unit 414) in units of payload data on the basis of the Y-coordinate order data and the X-coordinate order data. Specifically, the ROI image generation unit 403 divides the ROI pixel row data in the payload data 215A for each region of interest on the basis of the Y-coordinate order data and the X-coordinate order data, and outputs the divided ROI pixel row data to the correction processing unit 410.

(Correction Processing Unit)

The correction processing unit 410 in the signal processing unit 40 of the video reception device 4 according to the present embodiment performs the shading correction processing based on the above-described principle. The correction processing unit 410 performs the shading correction processing on the image data of the region of interest on the basis of the coordinate information of the region of interest extracted from the ROI information. The correction processing unit 410 generates the coordinates of each pixel of the image data of the region of interest in the captured image on the basis of the coordinates (start point coordinates) of the upper-left end portion of the region of interest, and amplifies the luminance for each pixel of the image data of the region of interest on the basis of the generated coordinates of each pixel. As a result, the shading correction is performed on the image data of the region of interest. The correction processing unit 410 includes the ROI image coordinate information generation unit 411, a coordinate information selection unit 412, a correction value table RAM 413, the image data selection unit 414, and a correction unit 415. The correction value table RAM 413 holds shading correction values used for the shading correction processing. The correction processing unit 410 performs each processing related to the shading correction processing with these components.

The ROI image coordinate information generation unit 411 in the correction processing unit 410 of the video reception device 4 according to the present embodiment is an equivalent component to the ROI image coordinate information generation unit 311 included in the correction circuit 301 of the video transmission device 3 according to the first embodiment. That is, the ROI image coordinate information generation unit 411 generates relative coordinates (pixel coordinates) of each pixel of image data of a cut region of interest (ROI).

In the present embodiment, the ROI mage coordinate information generation unit 411 generates the pixel coordinates of the image data of the region of interest by using a counter, similarly to the ROI image coordinate information generation unit 311 in the first embodiment. In the present embodiment, the correction processing unit 410 includes a counter unit used for various types of measurement processing. In the present embodiment, the correction processing unit 410 includes a horizontal counter Xct and a vertical counter Yct as the counter units.

The horizontal counter Xct measures the X coordinates of the region of interest in the captured image, starting from the coordinates of the upper-left end portion of the region of interest (the pixel coordinates of the upper-left end portion). Furthermore, the vertical counter Yct measures the Y coordinates of the region of interest in the captured image, starting from the coordinates of the upper-left end portion of the region of interest (the pixel coordinates of the upper-left end portion). Note that the horizontal counter Xct and the vertical counter Yct in the correction processing unit 410 of the video reception device 4 according to the present embodiment are equivalent components to the horizontal counter Xct and the vertical counter Yct in the correction circuit 301 of the video transmission device 3 according to the first embodiment, and thus, are denoted by the same reference signs, and a detailed description thereof will be omitted. The ROI image coordinate information generation unit 411 generates the coordinates of each pixel of the image data of the region of interest by using the horizontal counter Xct and the vertical counter Yct. Here, pixel coordinate generation processing performed by the ROI image coordinate information generation unit 411 is processing equivalent to the pixel coordinate generation processing (see FIG. 17) performed by the ROI image coordinate information generation unit 311 of the correction circuit 301 in the first embodiment. Therefore, a detailed description thereof is omitted. The ROI image coordinate information generation unit 411 performs the pixel coordinate generation processing by using the X-coordinate order data and the Y-coordinate order data input from the information extraction unit 401 instead of the region-of-interest designation information 90A the pixel coordinate generation processing.

That is, the ROI image coordinate information generation unit 411 generates the pixel coordinates by using at least the coordinates (start point coordinates) of the upper-left end portion of the region of interest as the coordinate information. More specifically, the ROI image coordinate information generation unit 411 generates the pixel coordinates of the image data of the region of interest on the basis of the Y-coordinate order data and the X-coordinate order data generated by the information extraction unit 401 using the start point coordinates and the size information of the region of interest.

The ROI image coordinate information generation unit 411 outputs the generated pixel coordinates to the coordinate information selection unit 412 every time the pixel coordinates are generated. Once the pixel coordinates are input, the coordinate information selection unit 412 specifies a block region Br (see FIG. 15) in the captured image to which the input pixel coordinates belong. Once an address value of a correction value table t1 associated with the specified block region Br is derived, the coordinate information selection unit 412 acquires a shading correction held in an address region associated with the address value derived from the correction value table t1 and outputs the shading correction to the correction unit 413.

The correction unit 415 included in the correction processing unit 410 of the signal processing unit 40 amplifies the luminance of the image data of the region of interest (ROI) by using the shading correction value acquired from the correction value table t1 on the basis of the coordinate information by the coordinate information selection unit 412. Specifically, in the correction processing unit 410, the ROI image coordinate information generation unit 411 generates the coordinates (pixel coordinates) of each pixel of the image data of the region of interest, the coordinate information selection unit 412 acquires the shading correction value corresponding to the pixel coordinates from the correction value table t1, and the correction unit 415 performs sensitivity adjustment for each pixel of the image data of the region of interest by using the acquired shading correction value.

The correction unit 415 multiplies the image data of each pixel of the region of interest input from the image data selection unit 414 by the shading correction value input from the coordinate information selection unit 412 to amplify the luminance. The image data selection unit 414 divides the image data of each region of interest input from the ROI image generation unit 403 in units of pixels and outputs the divided image data to the correction unit 415. The video reception device 4 according to the present embodiment performs each processing in the device in synchronization with a predetermined clock signal. Therefore, processings performed by the respective components can be in conjunction (for example, synchronization) with each other by performing the processings on the basis of the clock signal. The image data selection unit 414 outputs image data of a region of interest to the correction unit 415 in units of pixels, for example, in synchronization with the above-described clock signal. Furthermore, the coordinate information selection unit 412 outputs the shading correction value to the correction unit 415 in synchronization with the above-described clock signal, for example.

As described above, in the correction processing unit 410 of the signal processing unit 40, the correction unit 415 amplifies the luminance of the image data of the region of interest in units of pixels input from the image data selection unit 414. As a result, the correction unit 415 can amplify the luminance of image data of each pixel of a region of interest on the basis of the shading correction value corresponding to the region in the captured image. Therefore, the video reception device 4 including the correction unit 415 can amplify the luminance of the image data of the region of interest at a degree corresponding to the region in the captured image by the shading correction processing to make the luminance uniform.

Next, a configuration related to shading correction processing for a normal image in the signal processing unit 40 will be described. The signal processing unit 40 includes the normal image coordinate information generation unit 404, a normal image decoding unit 405, and a normal image generation unit 406 as components for performing processing related to a normal image.

The normal image decoding unit 405 decodes the payload data 215B input from the ROI data separation unit 215, and generates a normal image 405A. The normal image decoding unit 405 outputs the normal image 405A to the normal image generation unit 406. Furthermore, the normal image coordinate information generation unit 404 generates coordinates (pixel coordinates) in units of pixels for data of a normal image on the basis of the inputting of the determination result indicating that the image data included in the payload data is the normal image data (the payload data 215b including the data of the normal image has been output to the normal image decoding unit 405) from the ROI data separation unit 215, and outputs the coordinates to the coordinate information selection unit 412. The normal image coordinate information generation unit 404 generates, for example, each pixel coordinate from the origin $\alpha\_o$ (0,0) of the captured image $\alpha$ (see FIG. 13) to the coordinates of the pixel at the lower-right end portion (end point) of the captured image $\alpha$ in order, and outputs the generated coordinates to the coordinate information selection unit 412 at a timing synchronized with the clock signal.

Once the pixel coordinates are input from the normal image coordinate information generation unit 404, the coordinate information selection unit 412 specifies a block region Br (see FIG. 15) in the captured image to which the input pixel coordinates belong, and derives an address value associated with the specified block region Br, similarly to a case where the pixel coordinates are input from the ROI image coordinate information generation unit 411. Moreover, the coordinate information selection unit 412 acquires a shading correction held in an address region associated with the derived address value and outputs the shading correction to the correction unit 413. By doing so, the video reception device 4 can perform the shading correction also on the data of the normal image on the basis of the shading correction held in the correction value table t1 and amplify the luminance of the data of the normal image to a degree corresponding to the region in the captured image, thereby making the luminance uniform.

Note that, also in the video transmission device 3 according to the first embodiment, similarly to the video reception device 4, the shading correction may be performed on the data of the normal image on the basis of the shading correction held in the correction value table t1. In this case, the image processing circuit 300 may include equivalent components to the normal image coordinate information generation unit 404 and the coordinate information selection unit 412.

The correction unit 415 outputs the image data subjected to the shading correction processing (the mage data of the region of interest or the image data of the normal image) as corrected image data 415A.

(Shading Correct iron Processing Method in Reception Device)

Figure 20:
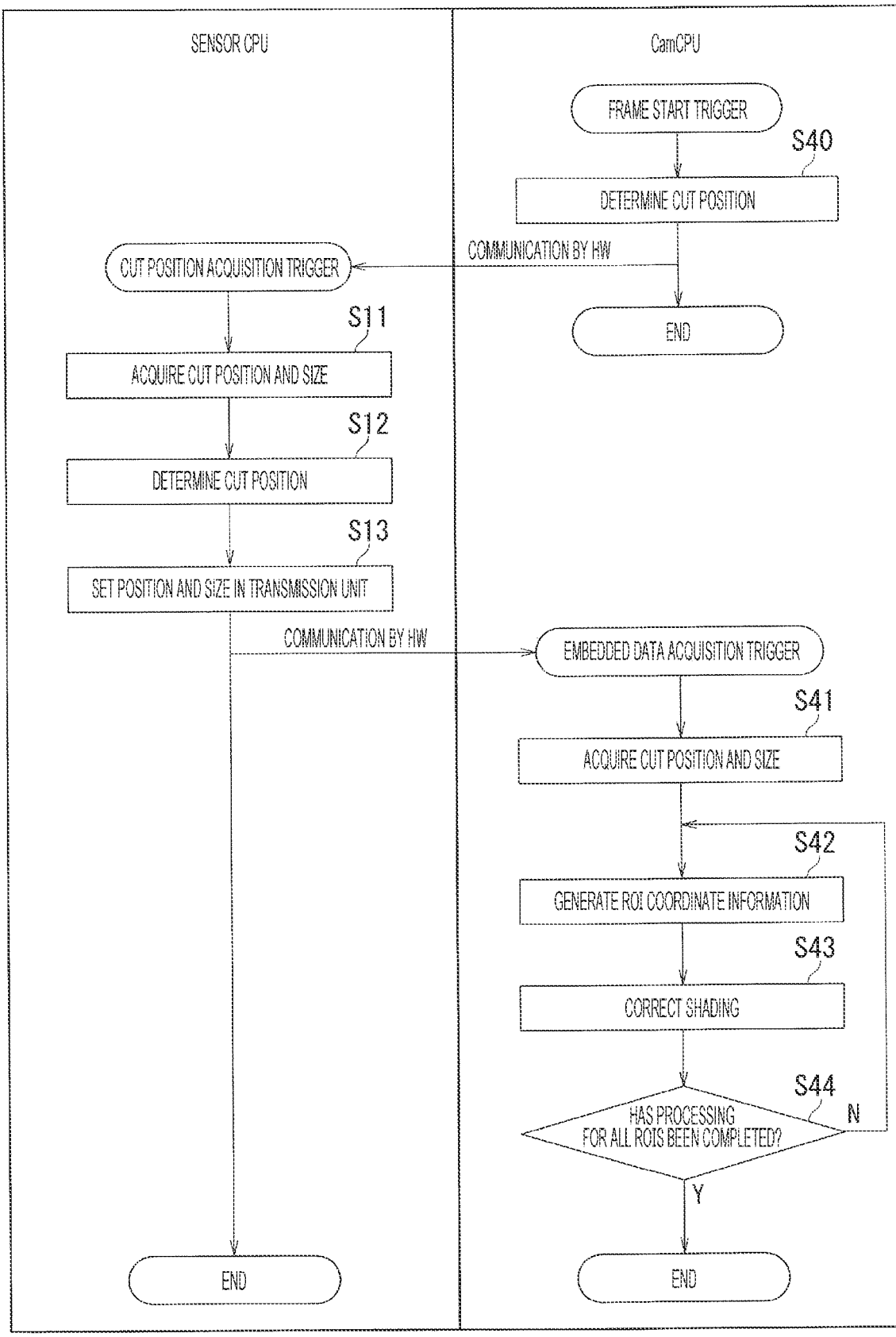
FIG. 20 is a flowchart illustrating an example of a flow of shading correction processing in the video transmission device, the video reception device, and the video transmission system according to the second embodiment.

Next, a shading correction processing method in the transmission device, the reception device, and the transmission system according to the present embodiment will be described with reference to FIG. 20 while referring to FIGS. 13 to 19. FIG. 20 is a flowchart illustrating an example of a flow of the shading correction processing method in the reception device, the transmission device, and the transmission system capable of performing the shading correction according to the present embodiment.

Once the video transmission system 20 is activated and a frame start trigger is input, the signal processing unit 40 (a CamCPU in the drawing) included in the video reception device 4 proceeds to Step S40.

(Step S40)

Once the video transmission system 10 is activated and a frame start trigger is input, the signal processing unit 40 (the CamCPU in the drawing) included in the video reception device 200 determines a cut position at which an image (a region of interest) is cut from a captured image of the imaging unit 110 (see FIG. 2) of the video transmission device 100, and ends cut position determination processing. Specifically, once the cut position is determined, the CamCPU sends a control signal for instructing cutting. The control signal is transmitted from the video reception device 4 to the video transmission device 100 by communication using hardware (HW) using the MIPI.

(Step S11)

Once a cut position designation trigger is detected, the image processing unit 120 (a sensor CPU in the drawing) included in the video transmission device 100 acquires the cut position and the size in the captured image of the imaging unit 110, and proceeds to Step S12. Specifically, the ROI cutting unit 121 acquires the position information (the coordinate information of the region of interest) and the size information (the sizes in the X-axis direction and the Y-axis direction) from the control signal.

(Step S12)

The image processing unit 120 determines, by the ROI cutting unit 121, the cut position at which the region of interest in the captured image is cut on the basis of the control signal, and proceeds to Step S13. Once the cut position is determined, the ROI cutting unit 121 cuts the image data of the region of interest from the captured image, and outputs the image data to the encoding unit 125.

(Step S13)

The image processing unit 120 generates, by the image processing control unit 126, the ROI information in which the position information (coordinate information) and the size information (the sizes the X-axis direction and the Y-axis direction) of the region of interest are set, and outputs the ROI information to the transmission unit 140 (specifically, the EBD buffer 144). In addition, the image processing unit 120 outputs, by the encoding unit 125, the compressed image data 120A obtained by compressing the image data of the region of interest to the transmission unit 140 (specifically, the ROI data buffer 145). As a result, the combining unit 147 of the transmission unit 140 generates, as the transmission data 147A, the embedded data including the ROI information and the payload data including the image data of the region of interest. The generated transmission data 147A is transmitted to the video reception device 200 by communication using hardware (HW) using the MIPI.

The video reception device 4 starts, by the signal processing unit 40, the processing of Step S61 with a timing at which the embedded data is input from the EBD interpretation unit 214 to the information extraction unit 401 as a trigger.

(Step S41)

The video reception device 4 extracts, by 401 of the signal processing unit 40, the POI information 120E from the embedded data included in the EBD data 2142, further extracts the position information (coordinate information) and the size information (the sizes in the X-axis direction and the Y-axis direction) of the region of interest from the ROI information 120B, and proceeds to Step S42. The information extraction unit 401 generates the Y-coordinate order data and the X-coordinate order data from the extracted ROI information (the coordinate information and the size information), and outputs the Y-coordinate order data and the X-coordinate order data to the correction processing unit 410.

(Step S42)

The video reception device 4 generates, by the ROI image coordinate information generation unit 411 of the correction processing unit 410, the pixel coordinates of the image data of the region of interest, and proceeds to Step S43. The coordinate information selection unit 412 specifies a block region Br (see FIG. 15) in the captured image to which the image data of each pixel of the region of interest belongs on the basis of the pixel coordinates generated by the ROI image coordinate information generation unit 411. Once the block region Br is specified, the coordinate information selection unit 412 derives an address value of the correction value table t1 corresponding to the block region Br. The coordinate information selection unit 412 acquires a shading correction value from an address region As of the correction value table t1 associated with the address value, and outputs the shading correction value to the correction unit 415.

(Step S43)

The video reception device 4 performs, by the correction unit 415 of the correction processing unit 410, the shading correction on the image data of the reg iron of interest, and proceeds to Step S44. Specifically, the correction unit 415 amplifies the luminance of the image data of the region of interest in units of pixels input from the image data selection unit 414 by using the shading correction value input from the coordinate information selection unit 412.

(Step S44)

The video reception device 4 determines, by the correction processing unit 410, whether or not the shading correction has been completed for the pieces of image data of all the regions of interest in the captured image by the correction unit 415. Specifically, the correction processing unit 410 determines whether or not the shading correction for all the regions of interest has been completed according to whether or not the generation of the pixel coordinates of all the regions of interest has ended in the ROI image coordinate information generation unit 411. In a case where the pixel coordinates of the pieces of image data of all the regions of interest in the captured image have been generated (NO in Step S111), the correction processing unit 410 determines that the shading correction has been completed for the pieces of image data of all the regions of interest in the captured image, and ends the shading correction processing. On the other hand, in a case where the pixel coordinates of the pieces of image data of all the regions of interest in the captured image have not been generated (YES in Step S111), the correction processing unit 410 determines that the shading correction has not been completed for the pieces of image data of all the regions of interest in the captured image, and returns to Step S42.

As described above, once the shading correction processing of the video reception device 4 according to the present embodiment is performed, the image data (corrected image data 415A) of the region of interest subjected to the shading correction is output from the correction unit 415. Therefore, the video reception device 4 can use the image data of the region of interest subjected to the shading correction in the subsequent processing (for example, display of the image data of the region of interest on a predetermined display device (not illustrated)).

The transmission system 20 that performs the shading correction processing in the video reception device 4 according to the present embodiment has been described above. In the present embodiment, the video reception device 4 included in the transmission system 20 includes the reception unit 210 that receives a transmission signal in which image data of a region of interest (ROI) cut from a predetermined captured image is included in payload data, and ROI information corresponding to the region of interest is included in embedded data, and the signal processing unit 40 that performs the shading correction processing on the image data of the region of interest on the basis of coordinate information of the region of interest extracted from the ROI information. Therefore, the video reception device 4 in the transmission system 20 can perform the shading correction processing on the image data of the region of interest.

The signal processing unit 40 of the video reception device 4 according to the present embodiment is configured as hardware capable of performing the shading correction processing. Furthermore, the reception unit 210 of the video reception device 4 according to the present embodiment is configured as hardware capable of receiving the transmission data 147A including the embedded data and the payload data. As a result, the video reception device 4 can speed up the shading correction processing and the transmission processing for image data of a region of interest, and increase the number of image data frames processed per unit time in the transmission system 20. That is, it is possible to implement the processing performed at a high frame rate.

Although the present disclosure has been described above with reference to the underlying technologies, the embodiment, and the modified examples thereof, the present disclosure is not limited to the above-described embodiment and the like, and various modifications can be made. Note that the effects described in the present specification are merely examples. The effects of the present disclosure are not limited to the effects described herein. The present disclosure may have effects other than those described herein.

Furthermore, for example, the present disclosure can have the following configuration.

(1)

A transmission device including:

a processing unit that performs shading correction processing on image data of a region of interest (ROI) in a captured image on the basis of coordinate information of the ROI; and a transmission unit that sends the image data of the ROI subjected to the shading correction processing as payload data and sends ROI information as embedded data.

(2)

The transmission device according to (1), in which the processing unit uses at least coordinates of an upper-left end portion of the ROI as the coordinate information of the ROI.

(3)

The transmission device according to (2), in which the processing unit generates coordinates of each pixel of the image data of the ROI in the captured image on the basis of the coordinates of the upper-left end portion of the ROI, and amplifies a luminance for each pixel of the image data of the ROI on the basis of the generated coordinates of each pixel.

(4)

The transmission device according to (3), further including:

a first counter that measures X coordinates of the ROI in the captured image starting from the coordinates of the upper-left end portion of the ROI; and a second counter that measures Y coordinates of the ROI in the captured image starting from the coordinates of the upper-left end portion of the ROI, in which the processing unit generates the coordinates of each pixel of the image data of the POI by using the first counter and the second counter.

(5)
The transmission device according to (4), in which
counter values of the first counter and the second counter are updatable to discontinuous values, and
the processing unit generates coordinates of each pixel of image data of a plurality of the ROIs included in the captured image by using the first counter and the second counter.
(6)
The transmission device according to any one of (1) to (5), further including
a correction value table in which a correction value used for the shading correction processing is held, in which
the processing unit amplifies a luminance of the image data of the ROI by using the correction value acquired from the correction value table on the basis of the coordinate information.
(7)
The transmission device according to (6), in which
the processing unit acquires the correction value corresponding to the coordinates of each pixel of the image data of the ROI from the correction value table and performs sensitivity adjustment for each pixel of the image data of the ROI.
(8)
A transmission system including:
a transmission device that includes a processing unit that performs shading correction processing on image data of a region of interest (ROI) in a captured image on the basis of coordinate information of the ROI, and a transmission unit that sends the image data of the ROI subjected to the shading correction processing as payload data and sends ROI information as embedded data; and
a reception device that includes a reception unit that receives a transmission signal in which image data of an image included in the ROI is included in the payload data and the ROI information is included in the embedded data.
(9)
The transmission system according to (8), in which
the transmission device generates, by the processing unit, coordinates of each pixel of the image data of the ROI in the captured image as the coordinate information on the basis of coordinates of an upper-left end portion of the ROI, and amplifies a luminance for each pixel of the generated image data of the ROI.
(10)
The transmission system according to (8) or (9), in which
the transmission device includes a correction value table in which a correction value used for the shading correction processing is held, and amplifies a luminance of the image data of the ROI by using the correction value acquired from the correction value table on the basis of the coordinate information.
(11)
A reception device including:
a reception unit that receives a transmission signal in which image data of a region of interest (ROI) cut from a predetermined captured image is included in payload data and ROI information corresponding to the ROI is included in embedded data; and
a processing unit that performs shading correction processing on the image data of the ROI on the basis of coordinate information of the ROI extracted from the ROI information.

(12)
The reception device according to (11), in which
the processing unit extracts at least coordinates of an upper-left end portion of the ROI from the ROI information as the coordinate information of the ROI.
(13)
The reception device according to (12), in which
the processing unit generates coordinates of each pixel of the image data of the ROI in the captured image on the basis of the coordinates of the upper-left end portion of the ROI, and amplifies a luminance for each pixel of the image data of the ROI on the basis of the generated coordinates of each pixel.
(14)
The reception device according to (13), further including:
a first counter that measures X coordinates of the ROI in the captured image starting from the coordinates of the upper-left end portion of the ROI; and
a second counter that measures Y coordinates of the ROI in the captured image starting from the coordinates of the upper-left end portion of the ROI, in which
the processing unit
generates the coordinates of each pixel of the image data of the ROI by using the first counter and the second counter.
(15)
The reception device according to (14), in which
counter values of the first counter and the second counter are updatable to discontinuous values, and
the processing unit generates coordinates of each pixel of image data of a plurality of the ROIs included in the captured image by using the first counter and the second counter.
(16)
The reception device according to any one of (11) to (15), further including
a correction value table in which a correction value used for the shading correction processing is held, in which
the processing unit amplifies a luminance of the image data of the ROI by using the correction value acquired from the correction value table on the basis of the coordinate information.
(17)
The reception device according to (16), in which
the processing unit acquires the correction value corresponding to the coordinates of each pixel of the image data of the ROI from the correction value table and performs sensitivity adjustment for each pixel of the image data of the ROI.
(18)
A transmission system including:
a transmission device that sends image data of a region of interest (ROI) as payload data and sends POI information as embedded data; and
a reception device that includes a reception unit that receives a transmission signal in which the image data of the region of interest (ROI) cut from a predetermined captured image is included in the payload data and the ROI information corresponding to the ROI is included in the embedded data, and a processing unit that performs shading correction processing on the image data of the ROI on the basis of coordinate information of the ROI extracted from the ROI information.
(19)
The transmission system according to (18), in which
the reception device extracts, by the processing unit, at least coordinates of an upper-left end portion of the ROI from the ROI information as the coordinate information of the ROI, generates coordinates of each pixel of the image data of the ROI in the captured image as the coordinate information on the basis of the extracted coordinates of the upper-left end portion, and amplifies a luminance for each pixel of the generated image data of the ROI.

(20)

The transmission system according to (18) or (19), in which the reception device includes a correction value table in which a correction value used for the shading correction processing is held, and amplifies, by the processing unit, a luminance of the image data of the ROI by using the correction value acquired from the correction value table on the basis of the coordinate information.

REFERENCE SIGNS LIST 1, 10, 20 Video transmission system
3, 100 Video transmission device
4, 200 Video reception device
110 Imaging unit
42 Image processing unit
100A CSI transmitter
100B CCI slave
111 Captured image
112, 112a1, 112a2, 112a3, 112a4, 112b1, 112b4, 123a4, 223A ROI image
112b Compressed image data
113, 114 Position information
115 Priority
116, 116a1, 116a2 Transmission image
118 Image
120, 130 Image processing unit
120A, 120A1, 120A2, 130A, 147B Compressed image data
120B ROI information
120C Frame information
121 ROI cutting unit
122 ROI analysis unit
123 Detection unit
124 Priority setting unit
125, 131 Encoding unit
126 Image processing control unit
140 Transmission unit
141 LINK control unit
142 ECC generation unit
143 PH generation unit
145 ROI data buffer
144 EBD buffer
146 Normal image data buffer
147 Combining unit
147A Transmission data
200A CSI receiver
200B CCI master
210 Reception unit
211 Header separation unit
212 Header interpretation unit
213 Payload separation unit
214 EBD interpretation unit
214A EBD data
215 ROI data separation unit
215A, 215B Payload data
220 Information processing unit
221 Information extraction unit
221A Extracted information
222 ROI decoding unit
222A Image data
223 ROI image generation unit
224 Normal image decoding unit
224A Normal image
Cb Chrominance component
CCI Camera control interface
CL Clock lane

The invention claimed is:

1. A transmission device comprising:
a processor configured to perform shading correction processing on image data of a region of interest (ROI) in a captured image on a basis of coordinate information of the ROI;
transmission circuitry configured to send the image data of the ROI subjected to the shading correction processing as payload data and to send ROI information as embedded data, wherein
the processor uses at least coordinates of an upper-left end portion of the ROI as the coordinate information of the ROI,
generates coordinates of each pixel of the image data of the ROI in the captured image on a basis of the coordinates of the upper-left end portion of the ROI, and
amplifies a luminance for each pixel of the image data of the ROI on a basis of the generated coordinates of each pixel;
a first counter that measures X coordinates of the ROI in the captured image starting from the coordinates of the upper-left end portion of the ROI; and
a second counter that measures Y coordinates of the ROI in the captured image starting from the coordinates of the upper-left end portion of the ROI, wherein
the processor generates the coordinates of each pixel of the image data of the ROI by using the first counter and the second counter.

2. The transmission device according to claim 1, wherein
counter values of the first counter and the second counter are updatable to discontinuous values, and
the processor generates coordinates of each pixel of image data of a plurality of the ROIs included in the captured image by using the first counter and the second counter.

3. A transmission device comprising:
a processor configured to perform shading correction processing on image data of a region of interest (ROI) in a captured image on a basis of coordinate information of the ROI;
transmission circuitry configured to send the image data of the ROI subjected to the shading correction processing as payload data and to send ROI information as embedded data; and
a correction value table in which a correction value used for the shading correction processing is held, wherein
the processor amplifies a luminance of the image data of the ROI by using the correction value acquired from the correction value table on a basis of the coordinate information.

4. The transmission device according to claim 3, wherein
the processor acquires the correction value corresponding to the coordinates of each pixel of the image data of the ROI from the correction value table and performs sensitivity adjustment for each pixel of the image data of the ROI.

5. A transmission system comprising:
a transmission device that includes a processor that performs shading correction processing on image data of a region of interest (ROI) in a captured image on a basis of coordinate information of the ROI, and transmission circuitry that sends the image data of the ROI subjected to the shading correction processing as payload data and sends ROI information as embedded data; and a reception device that includes reception circuitry that receives a transmission signal in which image data of an image included in the ROI is included in the payload data and the ROI information is included in the embedded data, wherein the transmission device generates, by the processor, coordinates of each pixel of the image data of the ROI in the captured image as the coordinate information on a basis of coordinates of an upper-left end portion of the ROI, and amplifies a luminance for each pixel of the generated image data of the ROI, and the transmission device includes a correction value table in which a correction value used for the shading correction processing is held, and amplifies a luminance of the image data of the ROI by using the correction value acquired from the correction value table on a basis of the coordinate information.

6. The transmission system according to claim 5, wherein the reception device comprises:

a reception-processor configured to perform the shading correction processing on the image data of the ROI on a basis of the coordinate information from the ROI information.

7. The transmission system according to claim 6, wherein the reception-processor extracts at least coordinates of an upper-left end portion of the ROI from the ROI information as the coordinate information of the ROI.

8. The transmission system according to claim 7, wherein the reception-processor generates coordinates of each pixel of the image data of the ROI in the captured image on a basis of the coordinates of the upper-left end portion of the ROI, and amplifies a luminance for each pixel of the image data of the ROI on a basis of the generated coordinates of each pixel.

9. The transmission system according to claim 8, wherein the reception device further comprises:

a first counter that measures X coordinates of the ROI in the captured image starting from the coordinates of the upper-left end portion of the ROI; and a second counter that measures Y coordinates of the ROI in the captured image starting from the coordinates of the upper-left end portion of the ROI, wherein the reception-processor generates the coordinates of each pixel of the image data of the ROI by using the first counter and the second counter.

10. The transmission system according to claim 9, wherein counter values of the first counter and the second counter are updatable to discontinuous values, and the reception-processor generates coordinates of each pixel of image data of a plurality of the ROIs included in the captured image by using the first counter and the second counter.

11. The transmission system according to claim 6, wherein the reception-processor amplifies a luminance of the image data of the ROI by using the correction value acquired from the correction value table on a basis of the coordinate information.

12. The transmission system according to claim 11, wherein the reception-processor acquires the correction value corresponding to the coordinates of each pixel of the image data of the ROI from the correction value table and performs sensitivity adjustment for each pixel of the image data of the ROI.

* * * * *